(12) United States Patent
Tu et al.

(10) Patent No.: US 10,303,239 B2
(45) Date of Patent: May 28, 2019

(54) RAISE GESTURE DETECTION IN A DEVICE

(71) Applicant: Apple Inc., Cupertino, CA (US)

(72) Inventors: Xiaoyuan Tu, Sunnyvale, CA (US); Anil K. Kandangath, San Francisco, CA (US); Adam S. Howell, Oakland, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/130,725

(22) Filed: Sep. 13, 2018

(65) Prior Publication Data

US 2019/0011973 A1    Jan. 10, 2019

Related U.S. Application Data

(63) Continuation of application No. 14/796,675, filed on Jul. 10, 2015, now Pat. No. 10,101,793.
(Continued)

(51) Int. Cl.
*G06F 1/32* (2019.01)
*G06F 1/3234* (2019.01)
(Continued)

(52) U.S. Cl.
CPC ............ *G06F 1/3234* (2013.01); *G06F 1/163* (2013.01); *G06F 1/3206* (2013.01); *G06F 1/3218* (2013.01); *G06F 1/3265* (2013.01); *G06F 1/3287* (2013.01); *G06F 1/3296* (2013.01); *G06F 3/014* (2013.01); *G06F 3/017* (2013.01)

(58) Field of Classification Search
CPC ....... G06F 1/163; G06F 1/3206; G06F 1/3218
See application file for complete search history.

(56) References Cited

U.S. PATENT DOCUMENTS 6,619,835 B2   9/2003  Kita
7,301,648 B2   11/2007 Foxlin
(Continued)

FOREIGN PATENT DOCUMENTS

CN   103809725 A    5/2014
EP   1705883 A1    9/2006
(Continued)

OTHER PUBLICATIONS

Notice of Decision to Grant, dated Sep. 6, 2018 in Korean Patent Application No. 10-2017-7001542. 7 pages, includes English translation of allowed claims.
(Continued)

*Primary Examiner* — Chun-Nan Lin
(74) *Attorney, Agent, or Firm* — Kilpatrick Townsend & Stockton LLP

(57) ABSTRACT

A wearable computing device can detect device-raising gestures. For example, onboard motion sensors of the device can detect movement of the device in real time and infer information about the spatial orientation of the device. Based on analysis of signals from the motion sensors, the device can detect a raise gesture, which can be a motion pattern consistent with the user moving the device's display into his line of sight. In response to detecting a raise gesture, the device can activate its display and/or other components. Detection of a raise gesture can occur in stages, and activation of different components can occur at different stages.

20 Claims, 20 Drawing Sheets

Related U.S. Application Data

(60) Provisional application No. 62/026,532, filed on Jul. 18, 2014.

(51) Int. Cl.
*G06F 3/01* (2006.01)
*G06F 1/16* (2006.01)
*G06F 1/3287* (2019.01)
*G06F 1/3206* (2019.01)
*G06F 1/3296* (2019.01)
*G06F 1/3218* (2019.01)

(56) References Cited

U.S. PATENT DOCUMENTS

| | | | |
|---|---|---|---|
| 8,624,836 B1 | 1/2014 | Miller et al. | |
| 8,793,519 B2 | 7/2014 | Hong et al. | |
| 8,832,481 B2* | 9/2014 | Lin | G06F 3/0488 |
| | | | 713/323 |
| 8,892,391 B2 | 11/2014 | Tu et al. | |
| 9,009,516 B1* | 4/2015 | Gabayan | G06F 1/3206 |
| | | | 713/323 |
| 9,436,231 B2* | 9/2016 | Bevilacqua | G06F 1/1694 |
| 2001/0031622 A1 | 10/2001 | Kivela et al. | |
| 2002/0068600 A1 | 6/2002 | Chihara et al. | |
| 2002/0142734 A1 | 10/2002 | Wickstead | |
| 2006/0217104 A1 | 9/2006 | Cho | |
| 2008/0259829 A1 | 10/2008 | Rosenblatt | |
| 2009/0060170 A1 | 3/2009 | Coughlan et al. | |
| 2009/0164219 A1 | 6/2009 | Yeung et al. | |
| 2009/0195497 A1 | 8/2009 | Fitzgerald et al. | |
| 2009/0231960 A1 | 9/2009 | Hutcheson et al. | |
| 2009/0311993 A1 | 12/2009 | Horodezky | |
| 2010/0313050 A1 | 12/2010 | Harrat et al. | |
| 2011/0003665 A1 | 1/2011 | Burton | |
| 2011/0059769 A1 | 3/2011 | Brunolli | |
| 2011/0164045 A1 | 7/2011 | Costa et al. | |
| 2012/0044062 A1 | 2/2012 | Jersa et al. | |
| 2012/0194976 A1 | 8/2012 | Golko et al. | |
| 2012/0305745 A1 | 12/2012 | Chen et al. | |
| 2012/0306745 A1 | 12/2012 | Moore et al. | |
| 2012/0310587 A1 | 12/2012 | Tu et al. | |
| 2013/0027341 A1 | 1/2013 | Mastandrea | |
| 2013/0222270 A1 | 8/2013 | Winkler | |
| 2013/0331118 A1 | 12/2013 | Chhabra et al. | |
| 2013/0332503 A1 | 12/2013 | Bae et al. | |
| 2014/0075226 A1 | 3/2014 | Heo et al. | |
| 2014/0132081 A1 | 5/2014 | Lin | |
| 2014/0135631 A1 | 5/2014 | Brumback et al. | |
| 2014/0139422 A1 | 5/2014 | Mistry et al. | |
| 2014/0168060 A1 | 6/2014 | Lio et al. | |
| 2014/0189397 A1 | 7/2014 | Kanai | |
| 2015/0092520 A1 | 4/2015 | Robison et al. | |
| 2015/0147968 A1* | 5/2015 | Friedman | G06F 3/017 |
| | | | 455/41.2 |
| 2015/0185837 A1* | 7/2015 | Whitney | G06F 3/014 |
| | | | 345/156 |
| 2015/0193111 A1 | 7/2015 | Kauffmann et al. | |
| 2015/0242112 A1 | 8/2015 | Bielitz et al. | |
| 2015/0261318 A1* | 9/2015 | Scavezze | G06F 3/0346 |
| | | | 345/158 |
| 2015/0268714 A1 | 9/2015 | Fu | |
| 2015/0277570 A1 | 10/2015 | Kauffmann et al. | |
| 2016/0018900 A1* | 1/2016 | Tu | G06F 1/3234 |
| | | | 345/156 |
| 2016/0044153 A1* | 2/2016 | Kim | H04M 1/72522 |
| | | | 455/418 |
| 2016/0170490 A1* | 6/2016 | Lee | G06F 3/017 |
| | | | 345/156 |
| 2016/0170616 A1 | 6/2016 | Rosenberg | |

FOREIGN PATENT DOCUMENTS

| | | |
|---|---|---|
| EP | 2741176 A1 | 6/2014 |
| JP | H09257965 A | 10/1997 |
| JP | 2012008772 A | 1/2012 |
| JP | 2013178847 A | 9/2013 |
| JP | 2013539118 A | 10/2013 |
| JP | 2014102840 A | 6/2014 |
| TW | 201303656 A | 1/2013 |
| WO | 2007/142703 A1 | 12/2007 |
| WO | 2007/149731 A1 | 12/2007 |
| WO | 2011/158475 A1 | 12/2011 |
| WO | 2014/081180 A1 | 5/2014 |
| WO | 2014/143776 A2 | 9/2014 |

OTHER PUBLICATIONS

Notice of Decision to Grant, dated Jul. 16, 2018 in Chinese Patent Application No. ZL201510424060.0. 6 pages, includes English translation of allowed claims.
Office Action dated May 14, 2018 in Chinese Patent Application No. 201510424060.0. 10 pages, includes English translation of allowed claims and English translation of Office Action.
Notice of Decision to Grant, dated Sep. 22, 2015 in Chinese Patent Application No. 201520523365.2. 7 pages, includes English translation of the claims.
Invitation to Pay Additional Fees dated Sep. 18, 2015 in International Patent Application No. PCT/US2015/039995. 5 pages.
Notice of Decision to Grant, dated Oct. 15, 2018 in Japanese Patent Application No. 2017-523775. 7 pages, includes English translation of allowed claims.
Kovach, Steve, "Review: Samsung's Galaxy Gear Smart Watch," Galaxy Gear Review-Business Insider, Oct. 5, 2013, 5 pages.
International Search Report and Written Opinion dated Nov. 27, 2015 in PCT/US2015/039995, 19 pages.
International Preliminary Report on Patentability dated Sep. 15, 2015 in PCT/US2014/027882, 8 pages.
International Search Report and Written Opinion dated Feb. 10, 2014 in PCT/US2013/032498, 18 pages.
Office Action dated Dec. 2, 2015 in U.S. Appl. No. 14/863,099, 12 pages.
Office Action dated Oct. 7, 2016 in U.S. Appl. No. 14/796,687, 13 pages.
Notice of Allowance dated Oct. 28, 2016 in U.S. Appl. No. 14/796,718. 8 pages.
Non-Final Office Action dated Jan. 27, 2017 in U.S. Appl. No. 14/796,718. 18 pages.
YouTube, iMessage-send as text message downloaded from https://www.youtube.com/watch?v=hXG-MdIW6FA. Feb. 18, 2013. 1 page.
Non-Final Office Action dated Mar. 7, 2017 in U.S. Appl. No. 14/774,664. 23 pages.
Examination Report No. 1 for Innovation Patent dated Mar. 20, 2017 in Australian Patent No. 2017100061. 3 pages.
Notice of Allowance and Fee(s) dated Jun. 21, 2017 in U.S. Appl. No. 14/796,687. 8 pages.
Non-Final Office Action dated Jul. 12, 2017 in U.S. Appl. No. 14/796,700. 19 pages.
Final Office Action dated Aug. 7, 2017 in U.S. Appl. No. 14/796,718. 21 pages.
Non-Final Office Action dated Nov. 2, 2017 in U.S. Appl. No. 14/796,687. 17 pages.
Notification of the First Office Action dated Sep. 20, 2017 in Chinese Patent Application No. 201510424060.0. 21 pages.
Examination Report No. 2 for Innovation Patent dated Aug. 24, 2017 in Australian Patent Application No. 2017100061. 3 pages.
Notice of Allowance dated Dec. 7, 2017 in U.S. Appl. No. 14/796,718. 8 pages.
Office Action dated Nov. 15, 2017 in Korean Patent Application No. 10-2017-7001542. 15 pages includes English translation.
Final Office Action dated Mar. 22, 2018 in U.S. Appl. No. 14/796,700. 24 pages.
European Office Action dated Mar. 27, 2018 in EP Application No. 15 742 170.2-1221. 7 pages.
Brouet, Rémi et al., "Understanding Hand Degrees of Freedom and Natural Gestures for 3D Interaction on Tabletop." INTERACT—Proceedings of the IFIP TC13 Conference on Human-Computer Interaction. Sep. 2013, Cape Town, South Africa. Springer, 2013.

(56) References Cited

OTHER PUBLICATIONS

Office Action dated May 1, 2018 in Japanese Patent Application No. 2017-523775. 3 pages.
Non-Final Office Action dated Nov. 14, 2016 in U.S. Appl. No. 14/796,675. 21 pages.
Final Office Action dated Jul. 26, 2017 in U.S. Appl. No. 14/796,675. 16 pages.
Non-Final Office Action dated Sep. 13, 2017 in U.S. Appl. No. 14/796,675. 20 pages.
Notice of Allowance dated Apr. 18, 2018 in U.S. Appl. No. 14/796,675. 8 pages.
Notice of Allowance dated May 1, 2018 in U.S. Appl. No. 14/796,675. 2 pages.
Notice of Allowance dated May 8, 2018 in U.S. Appl. No. 14/796,675. 2 pages.
Notice of Allowance dated May 31, 2018 in U.S. Appl. No. 14/796,675. 2 pages.
Notice of Allowance dated Jun. 15, 2018 in U.S. Appl. No. 14/796,675. 2 pages.

* cited by examiner

RAISE GESTURE DETECTION IN A DEVICE

CROSS-REFERENCE TO RELATED APPLICATIONS

This application is a continuation of U.S. patent application Ser. No. 14/796,675, filed Jul. 10, 2015, entitled "Raise Gesture Detection in a Device," which claims the benefit of U.S. Provisional Application No. 62/026,532, filed Jul. 18, 2014, entitled "Raise Gesture Detection in a Device," the disclosure of which is incorporated by reference herein in its entirety.

BACKGROUND

The present disclosure relates generally to electronic devices and in particular to detecting certain categories of gestures made by a user wearing or otherwise operating an electronic device.

Users are increasingly reliant on mobile technology. For instance, many users now carry "smart phones" that integrate mobile telephone technology with a high-powered computing device, with a form factor small enough to allow it to be held in the user's hand during operation. Such devices provide a range of functions including mobile telephony, messaging (e.g., SMS/MMS messaging or similar services), photography using a built-in digital camera, email, World Wide Web access, and a seemingly endless array of special-purpose application programs with functionality ranging from personal information management (e.g., calendar, address book, to-do lists) to location-aware navigation and maps to games. Devices of this kind can put a world of information and entertainment at the user's fingertips.

However, even the smart phone is apparently insufficient to satisfy users' desire for easy access to information. Wearable technology is attracting considerable interest. It is hoped that with a wearable device, a user can enjoy the benefits of mobile technology with increased convenience.

SUMMARY

One obstacle to widespread adoption of wearable technology is that most existing wearable devices are not more convenient to use than a smart phone. For example, wearable devices tend to have a small form factor, which limits the size of battery that can be included in the device. This in turn limits the available operating power. To avoid wasting power, existing wearable devices generally turn off or power down various power-consuming components (e.g., a display) when the user is not actively engaged with the device.

Because the display and/or user input components are not always on, existing wearable devices generally require some sort of preliminary user input, such as touching a button on the wearable device, to indicate that the user wants to engage with the device; this preliminary input can trigger the wearable device to activate its display and/or other power-consuming components. This preliminary interaction can make use of the device feel unnatural or inconvenient, especially in contrast with more natural, intuitive interactions familiar from older technology. For example, anyone who has ever worn a wristwatch is familiar with the gesture of raising and/or rotating a wrist to check the time. For wristwatch-wearers, raising the wrist quickly becomes a natural, automatic motion. But this natural motion only works in a conventional wristwatch because the watch face is "always on," so that all the user has to do to see the displayed information (generally the time) is to bring the watch face into the line of sight. In a more advanced electronic device, such as a wearable computing device, however, an always-on display can limit the battery life to the point of interfering with ordinary all-day wearing of the device.

Accordingly, it may be desirable for a wrist-wearable computing device to detect when a user is raising the wrist on which the device is worn and to automatically activate its display (and/or other components) in response to this motion. This can allow the user to obtain visual information from the wrist-wearable computing device as easily and intuitively as from a conventional wristwatch.

Certain embodiments of the present invention provide computing devices that can detect raise gestures such as wrist-raising gestures. For example, a device can include motion sensors such as an accelerometer and/or gyroscope, which can detect movement of the device in real time and can also infer information about the spatial orientation of the device (e.g., by detecting gravitational acceleration acting on the device). Based on signals from the motion sensors, algorithms executing on the device can detect a "raise gesture," which can be defined as a motion pattern indicating that the user is moving or has moved the device's display into his line of sight. In response to detecting such a gesture, the device can activate its display and/or other components (e.g., a touch screen overlay, speech-processing subsystem, or the like). In some embodiments, the detection of a raise gesture can occur in stages, and activation of different components can occur at different stages.

A variety of techniques can be used to detect raise gestures. In some embodiments, the detection algorithms can be heuristically developed and can take into account both the assumed characteristics of a "focus pose" (which can be an orientation of the wrist-worn computing device that would allow the user wearing the device to look at its display) and the particular starting pose (which can be the orientation of the wrist-worn computing device prior to being brought into the focus pose). Thus, for example, a raise gesture can be detected regardless of whether the user begins from an arm-down position (e.g., when standing or walking) or an arm-lateral position (e.g., when typing). Further, raise-gesture detection algorithms can be optimized for specific user activities. For instance, if a user is running, the natural motion of the user's arms may create noise in the data collected from a low-power motion sensor (e.g., an accelerometer) that can interfere with detecting a raise gesture. An algorithm optimized for running can incorporate data from other sensors (e.g., a gyroscopic sensor) to facilitate reliable detection of a raise gesture, without requiring the user to do anything different.

In some embodiments, raise-gesture detection algorithms can be executed on a low-power coprocessor (e.g., a motion coprocessor) of the device. Accordingly, when the device is not being actively used, a main or central processor (also referred to herein as an applications processor) of the device can be placed into a low-power, or sleep, state to further reduce power consumption of the device. Detection of a raise gesture by algorithms executing on the coprocessor can be used to wake the applications processor. In some embodiments, a separate "preheat" algorithm can be provided for determining whether to wake the applications processor, and this algorithm can operate independently of raise-gesture detection algorithms used to determine whether to activate the display and/or other user interface components.

Further, after the device enters focus pose, the coprocessor can execute algorithms to determine when the device leaves focus pose, indicating that the user has stopped looking at the device. (It should be understood that the device state might not always match the ground truth of whether the user is or is not looking the device, although algorithms described herein can achieve such a match with high, though not necessarily perfect, reliability.) Detecting that the device has left focus pose (also referred to herein as a loss-of-focus event) can trigger various power-saving measures, such as deactivating the display and/or other user interface components, allowing the applications processor to return to sleep state, and so on.

In some embodiments, the coprocessor can execute wake control logic to determine when to begin or end execution of various algorithms for detecting raise gestures, loss of focus, and/or preheat events. The wake control logic can also receive notifications of events detected by the various algorithms and coordinate corresponding notifications to other components of the device, such as the applications processor and/or user interface components. For instance, the wake control logic can notify the applications processor when a raise gesture is detected, and the applications processor can respond by activating the display and/or other user interface components.

The following detailed description together with the accompanying drawings will provide a better understanding of the nature and advantages of the present invention.

DETAILED DESCRIPTION

Certain embodiments of the present invention can provide a natural interaction for users of a device, such as a wrist-wearable device, whose display is not always on. For example, a device can include motion sensors such as an accelerometer and/or gyroscope, which can detect movement of the device in real time and can also infer information about the spatial orientation of the device (e.g., by detecting gravitational acceleration acting on the device). Based on signals from the motion sensors, algorithms executing on the wearable computing device can detect a "raise gesture," which can be defined as a motion pattern indicating that the user is moving or has moved the device's display into his line of sight. (It is understood that the device state might not always match the ground truth of whether the user is or is not looking the device, although algorithms described herein can achieve such a match with high, though not necessarily perfect, reliability.) When such a gesture is detected, the wearable computing device can activate its display. Other components can also be activated based on detection of a raise gesture, such as user input components (e.g., a touch screen overlay, speech-processing subsystem, or the like). In some embodiments, the detection of a raise gesture can occur in stages, and activation of different components can occur at different stages.

As used herein, a "wrist-wearable device" (or "wrist-wearable computing device") refers generally to an electronic device that has a form factor suitable for wearing on the wrist of a user and that can present information to and receive information from the user while being worn on the user's wrist. In some embodiments, a wrist-wearable device can have a touch-screen display that presents information visually and that receives user input in the form of contact gestures made by the user's finger (or other tool operated by the user) with the screen or particular areas on the screen. Other user interface components can be provided in addition to or instead of a touch-screen display. In some embodiments, a wrist-wearable device can be operated as a stand-alone device (e.g., a device that is not communicating with other devices) or as a companion device to another electronic device with which it communicates. For instance, the wrist-wearable device can be paired with the user's mobile phone or another personal electronic device of the user, and the wrist-wearable device can leverage or enhance functionality of the other device, such as notifying the user of incoming calls, messages, or other communications.

Figure 1A:
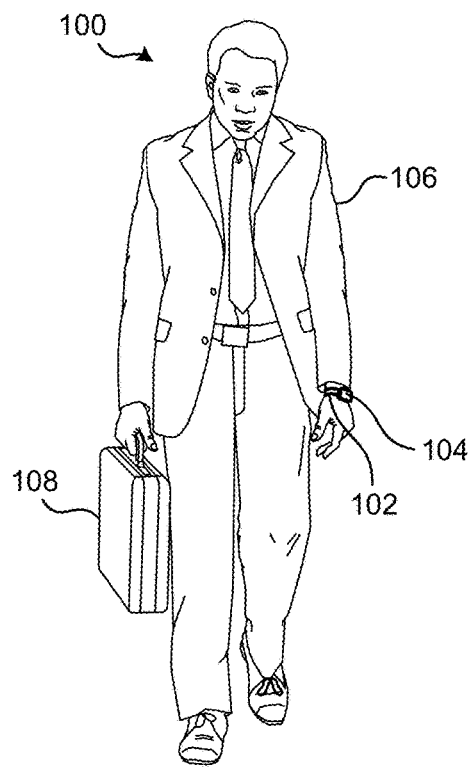
FIGS. 1A-1D show examples of typical use cases for an embodiment of the present invention.
Figure 1B:
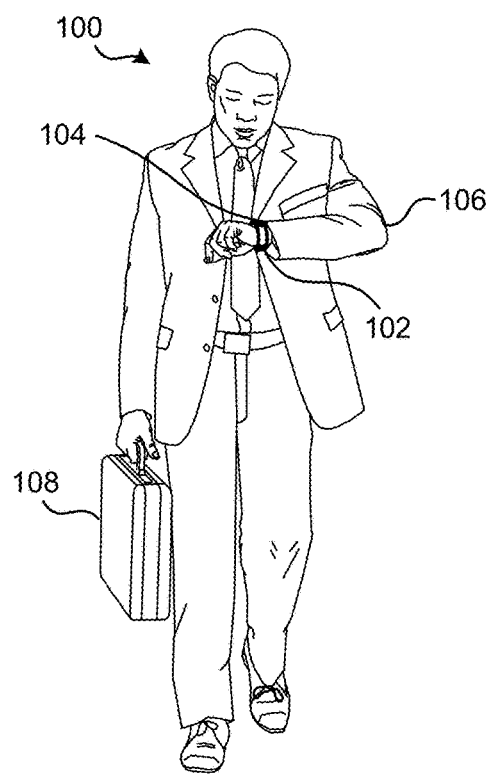

Wrist-wearable devices can be convenient for users. The device can interfere minimally or not at all with the user's ordinary activities, and locating the device on the wrist can make it easily accessible. The user can simply raise and/or rotate the wrist to bring the device's display into the user's line of sight. FIGS. 1A and 1B show a typical use case, in which a user 100 is wearing a wrist-wearable device 102, which has a display 104. In FIG. 1A, the user's arm 106 is in a natural position at the user's side, and display 104 is not in the user's line of sight. In this position, display 104 can be inactive (e.g., powered off or in a low-power state such that information is not visible) without affecting the user experience. In FIG. 1B, user 100 has raised and rotated arm 106 to a position in which display 104 is now in the user's line of sight. In this position, it is desirable for display 104 to be active (e.g., powered up and illuminated so that the user can view displayed information).

Figure 1C:
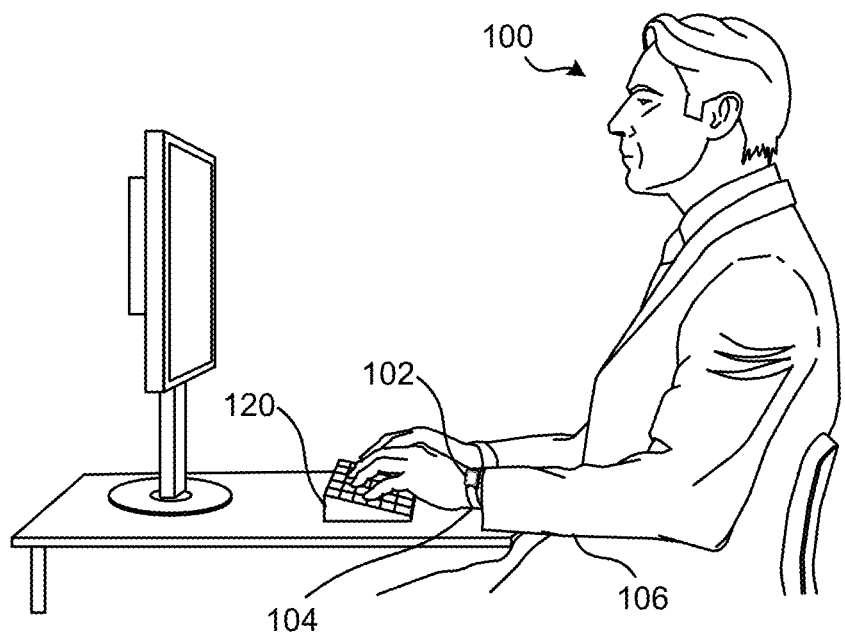
Figure 1D:
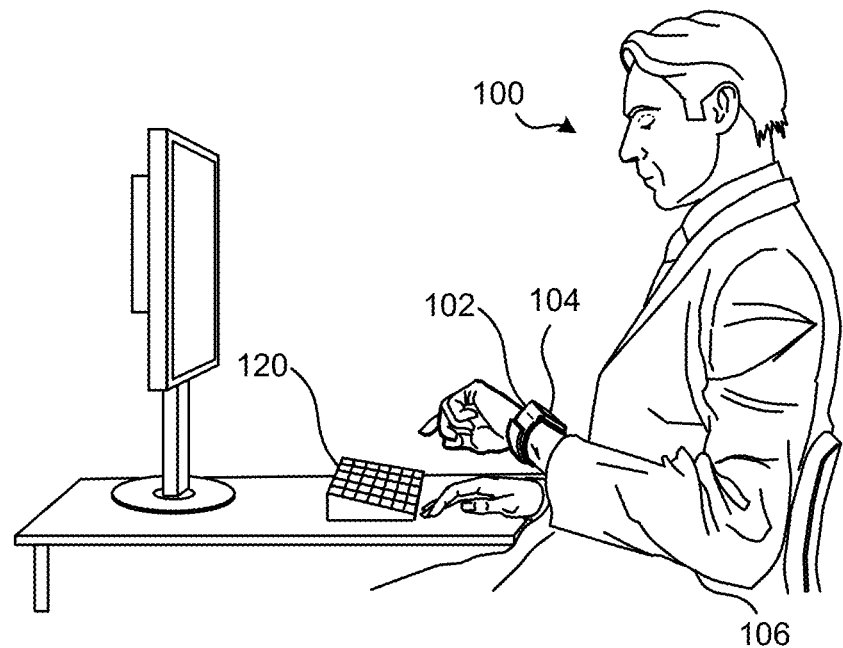

FIGS. 1C and 1D show another typical use case, in which user 100 is wearing wrist-wearable device 102 while engaged in an activity such as typing. In FIG. 1C, the user's arm 106 is positioned for typing on keyboard 120, with the forearm approximately parallel to the ground and the wrist slightly pronated to allow the fingers to reach keys. In this position, as in FIG. 1A, display 104 can be inactive without affecting the user experience. In FIG. 1D, user 100 has lifted arm 106 only slightly (enough to move the fingers out of contact with keyboard 120) and further pronated the wrist to bring display 104 into the line of sight. In this position, as in FIG. 1B, it is desirable for display 104 to be active.

One option is to have display 104 be active at all times. However, assuming that display 104 consumes more power when active than when inactive, having display 104 remain active when not in use can create unnecessary drain on a battery that powers device 102. Another option is to activate display 104 only in response to a user input; for instance, the user might press a button on device 102 to wake display 104. This, however, may make device 102 less convenient to use. For instance, as shown in FIGS. 1A and 1B, the user's other hand is holding bag 108, which may make pressing a button on wrist-wearable device 102 inconvenient.

In accordance with certain embodiments of the present invention, a device such as wrist-wearable device 102 can automatically detect when the user is preparing to look at the device. Based on such detection, the device can activate its display and/or other power-consuming components. In some embodiments, detection of a user preparing to look at the device can use motion analysis algorithms executed on a low-power coprocessor (e.g., a motion coprocessor) within the device. This can allow a main processor (e.g., applications processor) of the device to sleep at least some of the time, further conserving power. In some embodiments, a motion analysis algorithm can detect a category of motions (referred to herein as "raise gestures") associated with a user preparing to look at a device, such as raising and/or rotating the arm and/or wrist (e.g., the difference in arm position between FIGS. 1A and 1B or between FIGS. 1C and 1D), and detection of a raise-gesture or related motion can trigger various actions, such as activating the display. The raise-gesture-detection algorithms can be sensitive to a "starting" pose of the user, and the particular starting pose may affect or alter the expected raise gesture. For instance, the expected raise gesture may be different depending on whether the user's arm is initially hanging down (as shown in FIG. 1A) or in an elbow-bent position (e.g., as shown in FIG. 1B). The algorithms can also be modified to operate in a highly dynamic environment, such as where a user is running, which can affect the type of data that is useful, the starting pose, and/or the nature of the motion that constitutes the raise gesture.

In instances where a raise gesture can be detected based on natural motions associated with looking at the device, a user can naturally raise and/or rotate the wrist to bring the device's display into the line of sight (e.g., as shown in FIG. 1B or 1D), and immediately (or after negligible delay) see information displayed without providing express input to the device. However, in some situations, detecting such a "natural" raise gesture may not be practical. Accordingly, a "deliberate" raise gesture can be defined, and detection of the deliberate raise gesture can result in activating the display and/or other components. The deliberate raise gesture can be defined as a specific gesture that a user can execute with the intent of activating the display of the device; the gesture can be defined based on assumptions about arm or wrist movements that the user would be relatively unlikely to execute when not intending to activate the display. For example, as described below, a deliberate raise gesture can be defined as corresponding to a double oscillation of the wrist within a short time interval, after which the device stabilizes in a final pose; other definitions can also be used.

Once the user is determined to be looking at the device—whether via detection of a natural raise gesture, a deliberate raise gesture, or some other user interaction with the device—the device's user interface can be activated, allowing the user to interact with the device. For instance, the user can view information displayed on the device, operate input controls to provide information and/or instructions to the device, and so on. The user is likely to hold the device in a relatively constant orientation while viewing and interacting with it. When the user is done with the interaction, it is likely that the user's arm will return to its starting position or to another position in which the device's display is no longer oriented toward the user's line of sight. In some embodiments, a motion that would remove the device form the user's line of sight can be detected as a "loss-of-focus" gesture and can trigger various operations to conserve power, such as deactivating the display and/or other power-consuming components.

In addition or alternatively, in some embodiments, a main processor of the device (also referred to as an "applications processor") can enter a low-power, or "sleep," state when the device is not in active use in order to reduce power consumption. Completing a transition from sleep state to a "wake" state suitable for active use of the device (also referred to as "waking" the main processor) may have some associated latency. Accordingly, it may be desirable to start waking the main processor before the user is actually looking at the device, without also waking the display or other user interface components. Some embodiments provide a "preheat" detection algorithm that can detect the probable beginning of a raise gesture and initiate waking of the main processor before the raise gesture is completed. This operation can provide a faster response time where the user does look at the device. A preheat detection algorithm can operate concurrently with and generally independently of a raise-gesture detection algorithm; for instance, the algorithms can perform different analyses on the same received motion-sensor data.

Figure 2A:
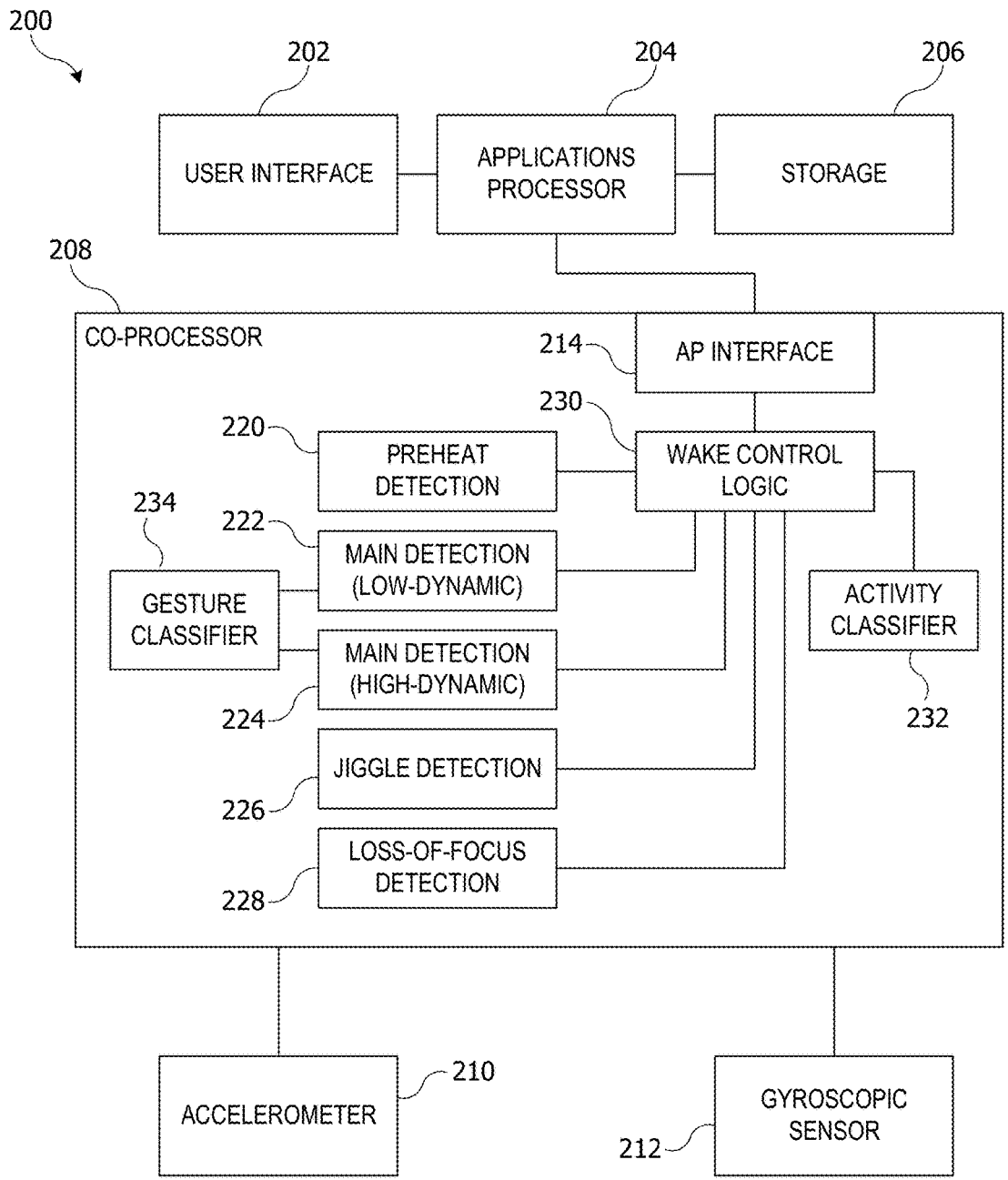
FIG. 2A is a block diagram showing components of a device according to an embodiment of the present invention.

Detection of raise gestures (including natural and/or deliberate raise gestures) and loss-of-focus gestures can be implemented in a variety of electronic devices. FIG. 2A is a block diagram showing components of a device 200 according to an embodiment of the present invention. Device 200 can be, e.g., an implementation of wrist-wearable device 102 of FIGS. 1A-1D. Device 200 can include a user interface 202, an application processor 204, a storage subsystem 206, a co-processor 208, an accelerometer 210, and a gyroscope 212.

User interface 202 can incorporate hardware and software components that facilitate user interaction with device 200. Such components can be of generally conventional or other designs. For example, in some embodiments, user interface 202 can include a touch-screen interface that incorporates a display (e.g., LED-based, LCD-based, OLED-based, or the like) with a touch-sensitive overlay (e.g., capacitive or resistive) that can detect contact by a user's finger and/or other objects. By touching particular areas of the screen, the user can indicate actions to be taken, respond to visual prompts from the device, etc. In addition or instead, user interface 202 can include audio components (e.g., speakers, microphone); buttons; knobs; dials; haptic input or output devices; and so on.

Applications processor 204, which can be implemented using one or more integrated circuits of generally conventional or other designs (e.g., a programmable microcontroller or microprocessor with one or more cores), can be the primary processing subsystem of device 200. Storage subsystem 206 can be implemented using memory circuits (e.g., DRAM, SRAM, ROM, flash memory, or the like) or other computer-readable storage media and can store program instructions for execution by applications processor 204 as well as data generated by or supplied to device 200 in the course of its operations. In operation, applications processor 204 can execute program instructions stored by storage subsystem 206 to control operation of device 200. For example, processor 204 can execute an operating system as well as various application programs specific to particular tasks (e.g., displaying the time, presenting information to the user, obtaining information from the user, communicating with a paired device, etc.). It is to be understood that applications processor 204 can execute any processing tasks desired, and embodiments of the present invention can function independently of any particular applications.

In embodiments described herein, applications processor 204 can have at least one "sleep" state in which activity (and power consumption) by applications processor 204 can be reduced or minimized, and a "wake" state in which applications processor 204 is fully operational. For example, applications processor 204 can suspend execution of application and/or operating system programs while applications processor 204 is in the sleep state and resume execution upon reentering the wake state.

Coprocessor 208, like applications processor 204, can be implemented using one or more integrated circuits of generally conventional or other designs (e.g., a microprocessor and/or microcontroller). Coprocessor 208 can execute program code instructions stored as firmware within or otherwise accessible to coprocessor 208, independently of whether applications processor 204 is in the sleep or wake state. In some embodiments, coprocessor 208 can have significantly lower power consumption during active operation than applications processor 204. In examples described herein, coprocessor 208 can perform operations related to motion detection and analysis, including detection of raise gestures and/or loss-of-focus gestures. In some embodiments, coprocessor 208 can also perform other operations not described herein.

Coprocessor 208 can communicate notifications based on motion analysis to applications processor 204 via an applications processor interface 214, which can be a communication interface of conventional or other design (e.g., a communication bus). In some embodiments, the notifications can include signals that wake applications processor 204 from the sleep state and/or that activate user interface 202. In some embodiments, applications processor interface 214 can also deliver unprocessed or partially processed data from accelerometer 210 and/or gyroscope 212 to applications processor 204.

To facilitate motion detection and analysis, coprocessor 208 can receive input from on-board motion sensors of device 200, such as accelerometer 210 and gyroscopic sensor (also referred to as gyroscope) 212. Accelerometer 210 can be implemented using conventional or other designs and can be sensitive to accelerations experienced by device 200 (including gravitational acceleration as well as acceleration due to user motion) along one or more axes. In some embodiments, accelerometer 210 can incorporate a 3-axis low-power MEMS accelerometer and can provide acceleration data at a fixed sampling rate (e.g., 100 Hz). Gyroscope 212 can also be implemented using conventional or other designs and can be sensitive to changes in the orientation of device 200 along one or more axes. Gyroscope 212 can also provide orientation data at a fixed sampling rate (e.g., 100 Hz).

Figure 3:
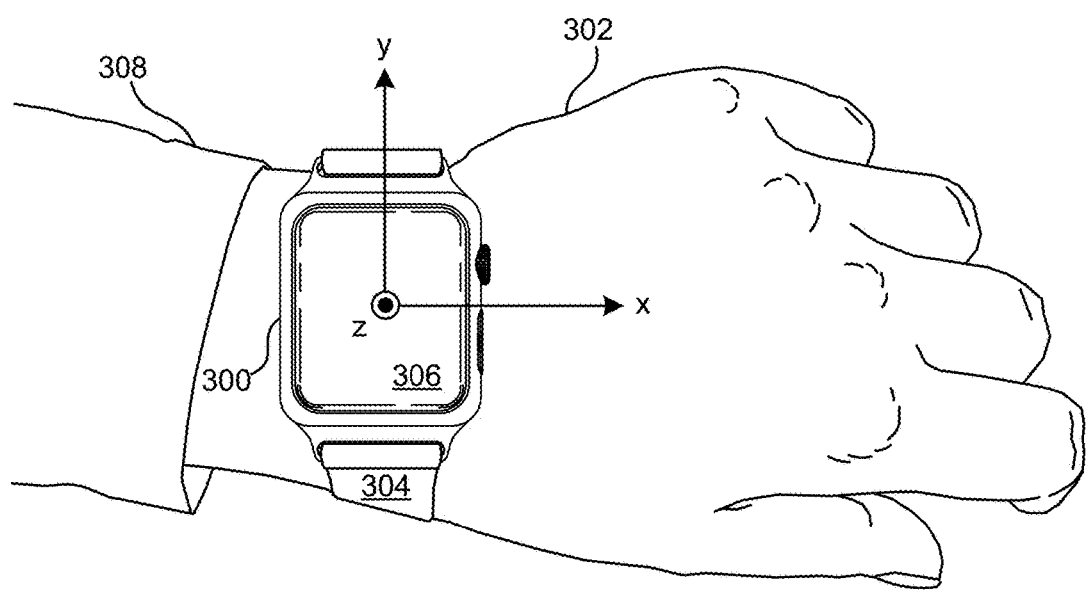
FIG. 3 shows an example of a device-relative coordinate system for a wrist-wearable device.

In examples described herein, accelerometer 210 and gyroscope 212 can be oriented within a device to define a device-relative coordinate system. FIG. 3 shows an example of a device-relative coordinate system for a wrist-wearable device 300 (which can be, e.g., wrist-wearable device 102 of FIGS. 1A-1B). Wrist-wearable device 300 can be secured to a user's wrist 302 by a strap or band 304 such that display 306 can be visible to the user. As shown, an x axis can be defined substantially parallel to the user's forearm 308 when the user is wearing device 300, a y axis can be defined orthogonal to the x axis and in the plane of display 306, and a z axis can be defined orthogonal to the plane of display 306 (pointing toward the viewer). In some embodiments, an accelerometer can detect acceleration due to gravity as well as motion by the user. For example, if forearm 308 is held horizontally, an accelerometer can detect rotation of a user's wrist (or rotation of wrist-wearable device 300 about the x axis) as a change in the y-component of acceleration between a start time and an end time as the angle of the y axis relative to the direction of gravity changes. Wrist rotation can also be detected using a gyroscope as a rotation about the x axis. The coordinate system shown in FIG. 3 is used throughout this disclosure; it is to be understood that other coordinate systems can be substituted.

Referring again to FIG. 2A, in some embodiments, coprocessor 208 can include various modules that implement operations and algorithms (e.g., using software or firmware program code) to analyze signals from accelerometer 210 and/or gyroscope 212. Some of these modules (referred to variously as "gesture modules" or "gesture-detection modules") can implement operations and algorithms pertaining to detection raise gestures and/or loss-of-focus gestures. For example, coprocessor 208 can include a "preheat" detection module 220 to detect the possible initiation of a raise gesture, a first "main" detection module 222 to detect a natural raise gesture in "low-dynamic" environments, a second main detection module 224 to detect a natural raise gesture in "high-dynamic" environments, a "jiggle" detection module 226 to detect a deliberate raise gesture, and a loss-of-focus module 228 to detect when the user moves the device out of an assumed line of sight. Examples of algorithms that can be implemented in modules 220, 222, 224, 226, and 228 are described below.

Wake control logic 230 can control operation of analysis modules 220-228 and can receive gesture-state determinations reported by modules 220-228. For example, wake control logic can determine, based on the current gesture-state, which of modules 220-228 should be enabled at any given time and can selectively enable or disable various algorithms. Selectively disabling an algorithm can reduce power consumption by coprocessor 208. In addition, based on gesture-state determinations, wake control logic 230 can communicate notifications to applications processor 204 and/or user interface 202 via application processor interface 214.

In some embodiments, wake control logic 230 and/or motion analysis modules 220-228 can make use of additional supporting modules that can execute algorithms or operations selectively or on an ongoing basis. For example, activity classifier 232 can receive data from accelerometer 210 and/or gyroscope 212 (as well as other sensors, such as physiological sensors, that may be present in device 200) and can analyze the data to determine the type of activity in which the user is engaged, e.g., walking, sitting or standing still, jogging, running, cycling, riding in a motor vehicle and so on. Activity classifier 232 can implement machine learning algorithms that identify characteristic features associated with various types of activity, and the algorithms can be trained by gathering sensor data during known user activities prior to deploying activity classifier 232.

In some embodiments, wake control logic 230 can use the output of activity classifier 232 to determine whether device 200 is in a "low-dynamic" environment (e.g., sitting, walking, or other relatively slow movement), in which case low-dynamic main detection module 222 can be used, or in a "high-dynamic" environment (e.g., running), in which case high-dynamic main detection module 224 should be used instead. Wake control logic 230 can selectively enable or disable module 222 or 224 depending on the type of environment indicated by activity classifier 232.

In some embodiments, gesture classifier 234 can be used to confirm detection of a natural raise gesture detected by main detection module 222 or 224. As described below, main detection modules 222 and 224 can analyze device position as a function of time to detect a raise gesture in a power-efficient manner. However, these algorithms may sometimes generate false positives as a result of user actions that involve a motion similar to raising device 200 into the line of sight but do not actually have that effect. For example, the user may be twisting a door handle to open a door or raising a drinking glass to take a drink. Gesture classifier 234 can implement machine learning algorithms that have been trained to reliably distinguish a raise gesture from other similar motions. In some embodiments, gesture classifier 234 can be trained by collecting accelerometer and/or gyroscope data while the user performs specific actions (including the raise gesture as well as other similar actions) in circumstances where the specific action performed can be recorded along with the accelerometer and/or gyroscope data. This information can be used to train the algorithm to generate an output that reliably discriminates between a raise gesture and other similar actions. Accordingly, when main detection module 222 or 224 detects a gesture, the detection algorithm (or wake control logic 230) can provide relevant feature data to gesture classifier 234 for further confirmation or disconfirmation. Examples of the use of gesture classifier 234 are described below in connection with embodiments of main detection module 222. In some embodiments, gesture classifier 234 can execute on applications processor 204 when applications processor 204 is in its wake state.

Figure 2B:
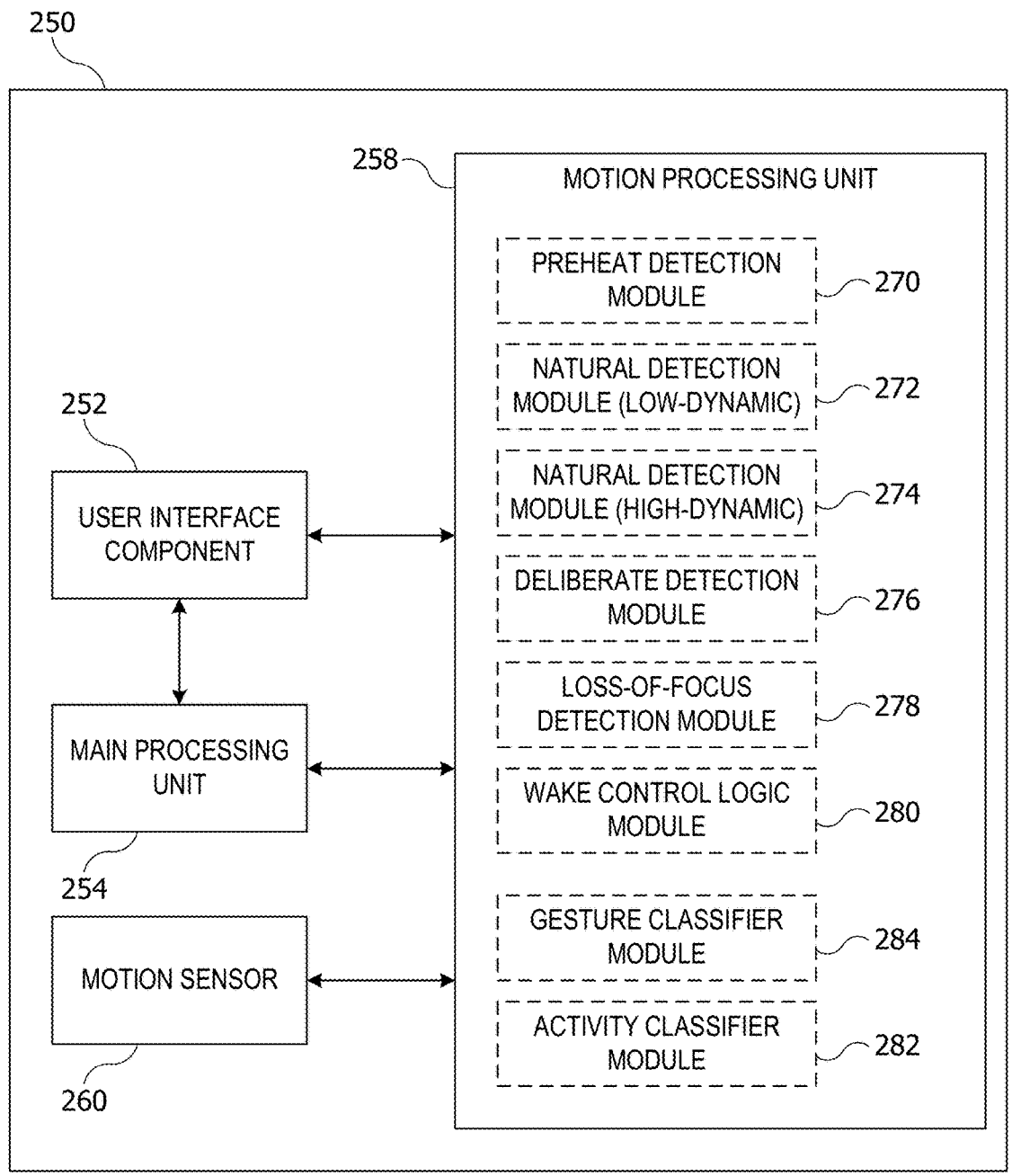
FIG. 2B is a block diagram showing components of a device according to an embodiment of the present invention.

FIG. 2B is a block diagram showing components of a device 250 according to an embodiment of the present invention. Device 250 can be, e.g., an implementation of wrist-wearable device 102 of FIGS. 1A-1D. Device 250 can include a user interface component 252, an applications processing unit 254, a motion processing unit 258, and a motion sensor 260. User interface component 252 can be similar or identical to user interface 202 of FIG. 2A (or to components thereof, such as a touch-screen display). Main processing unit 254 can be similar or identical to applications processor 204 of FIG. 2A. Motion sensor 260 can include one or more motion sensors that can be similar or identical to accelerometer 210 and/or gyroscopic sensor 212 of FIG. 2A. Other user interface components and/or motion sensors can also be used.

Motion processing unit 258 can be similar or identical to co-processor 208 of FIG. 2A. Motion processing unit 258 can incorporate various gesture-detection modules. For instance, preheat detection module 270 can be similar or identical to preheat detection module 220 of FIG. 2A. Natural detection module (low dynamic) 272 and natural detection module (high dynamic) 274 can be similar or identical to main detection module (low dynamic) 222 and main detection module (high dynamic) 224 of FIG. 2A. Deliberate detection module 276 can be similar or identical to jiggle detection module 226 of FIG. 2A. Loss-of-focus detection module 278 can be similar or identical to loss-of-focus detection module 228 of FIG. 2A. Activity classifier module 282 can be similar or identical to activity classifier 232 of FIG. 2A. Gesture classifier module 284 can be similar or identical to gesture classifier 234 of FIG. 2A. Additional or different modules can be included, and some embodiments can include more or fewer modules than those shown.

It will be appreciated that devices 200 and 250 are illustrative and that variations and modifications are possible. Embodiments of devices 200 or 250 can include other components in addition to or instead of those shown. For example, device 200 or 250 can include a power source (e.g., a battery) and power distribution and/or power management components. Device 200 or 250 can include other sensors, such as a compass, a thermometer or other external temperature sensor, a Global Positioning System (GPS) receiver or the like to determine absolute location, camera to capture images, physiological sensors (e.g., pulse sensor, blood pressure sensor, skin conductance sensor, skin temperature sensor), and so on. Device 200 or 250 can include communication components to enable communication with other devices, including personal devices and/or network-access devices. For example, device 200 or 250 can include an RF transceiver and associated protocol stack implementing one or more wireless communication standards (e.g., Bluetooth standards; IEEE 802.11 family standards; cellular data network standards such as 3G, LTE, etc.) In addition or instead, device 200 or 250 can include a wired communication interface such as a receptacle connector (e.g., supporting USB, UART, Ethernet, or other wired communication protocols).

Further, while devices 200 and 250 are described with reference to particular blocks, it is to be understood that these blocks are defined for convenience of description and are not intended to imply a particular physical arrangement of component parts. Further, the blocks need not correspond to physically distinct components, and the same physical components can be used to implement aspects of multiple blocks. Blocks can be configured to perform various operations, e.g., by programming a processor or providing appropriate control circuitry, and various blocks might or might not be reconfigurable depending on how the initial configuration is obtained. Embodiments of the present invention can be realized in a variety of apparatus including electronic devices implemented using any combination of circuitry and software. Further, devices 200 and 250 are fully interchangeable, and it is to be understood that any description referencing device 200 (or components thereof) can also apply to device 250.

In operation, coprocessor 208 can be "always-on" (e.g., whenever device 200 is being worn), and wake control logic 230 can selectively activate (or enable) any or all of modules 220, 222, 224, 226, 228, e.g., depending on whether the user is looking at the device. These algorithms can detect and report various gesture-state events including raise gestures, preheat events, loss-of-focus events, etc. Specific examples are described below. When an algorithm reports an event, wake control logic 230 can notify applications processor 204 of the event via applications processor interface 214. Depending on the event, applications processor 204 can take various actions, such as transitioning from a sleep state to a wake state and/or transitioning components of user interface 202 between active and inactive states.

Examples of specific algorithms to detect gesture-related events will now be described. As used herein, a "gesture-related event" refers generally to any gesture-related transition detected by a module or algorithm such as modules 220, 222, 224, 226, 228. Examples of such events include raise gestures (including identification of "possible," "detected," and/or "confirmed" raise gestures as described below), preheat gestures, and/or loss-of-focus gestures. Algorithms of the kind described below can be implemented, e.g., by providing suitable program code to a programmable processor (e.g., coprocessor 208) and/or by providing dedicated logic circuitry to perform the operations described.

In some embodiments, a raise gesture detection algorithm can progress through a series of states of increasing confidence that a raise gesture has been performed. For example, an raise-gesture detection algorithm can select a set of motion-sensor data samples (including accelerometer and/or gyroscopic sensor data) corresponding to a time interval of interest (e.g., the amount of time it would likely take a user to execute a raise gesture). By considering the oldest sample (s) in the set, the algorithm can define a "starting pose," which can reflect the spatial orientation of the device at the beginning of the time interval. The orientation can be defined relative to an assumed vertical axis of gravity. Based on the starting pose, the algorithm can determine the amount and/or direction(s) of motion that would likely occur to bring the device's display into the user's line of sight (also referred to as the device being brought into a "focus pose"). The likely amount and/or direction(s) of motion can be expressed as criteria for identifying a "possible" raise gesture, and these criteria can be used to identify, based on some or all of the motion-sensor data samples in the set, whether a possible raise gesture has occurred. The possible raise gesture can be further identified as a "detected" raise gesture by determining whether the device, having reached a focus pose, dwells in a focus pose for at least a minimum period of time. A further confirmation can be performed, if desired, using a gesture classifier. The raise gesture detection algorithm can notify other components of the device each time it identifies a possible, detected, and/or confirmed raise gesture.

Figure 4:
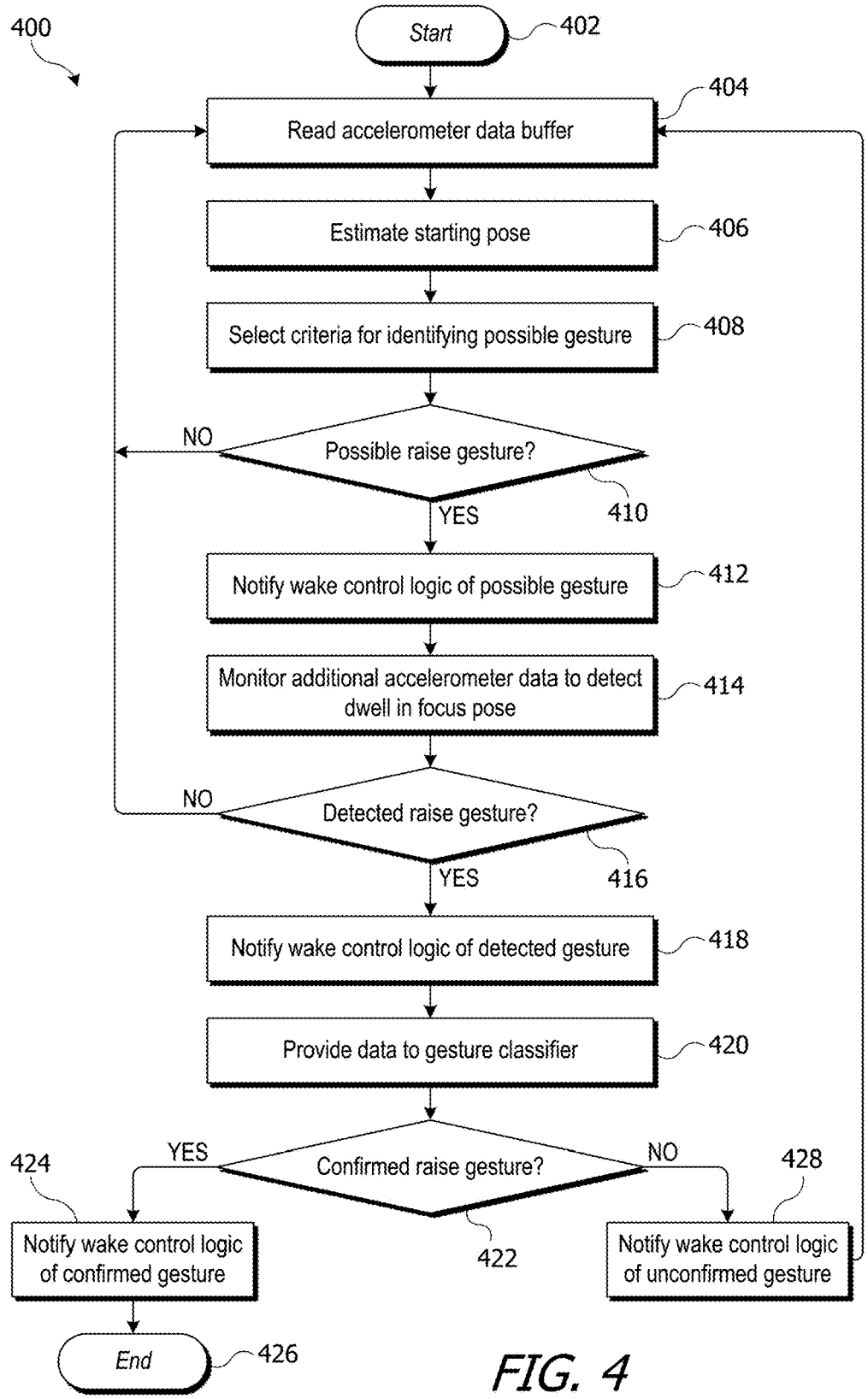
FIG. 4 is flow diagram for a raise-gesture detection process according to an embodiment of the present invention.

By way of specific example of a staged approach to raise-gesture detection, FIG. 4 is flow diagram for a raise-gesture detection process 400 according to an embodiment of the present invention. Process 400 can be executed, e.g., in main detection (low-dynamic) module 222 of FIG. 2A. Raise-gesture detection process 400 can progress through a series of gesture states (possible, detected, confirmed) and can report each state transition, e.g., to wake control logic 230 of FIG. 2A. As described below, wake control logic 230 can use the gesture-state transitions to determine whether and when to wake applications processor 204 and/or whether and when to instruct applications processor 204 to activate user interface 202.

Process 400 can start (block 402) when user interface 202 is in an inactive state. At this time, applications processor 204 can be in a sleep state or wake state as desired. Accelerometer 210 can be providing updated data at a regular sampling rate (e.g., 100 Hz), and the data can indicate vector components of acceleration ($a_x$, $a_y$, $a_z$) using device-relative coordinates as shown in FIG. 3. Received data can be buffered, e.g., using a circular buffer or FIFO or the like.

At block 404, process 400 can read data samples from the accelerometer data buffer. The amount of data can depend on the sampling rate and desired interval of time for analyzing motion. For example, process 400 can read data corresponding to a fixed interval, or window, of time, e.g., 0.5 seconds, 1 second, or the like.

At block 406, process 400 can estimate a starting pose for the device, e.g., based on the oldest samples read from the buffer, which can correspond to the beginning of the interval. In some embodiments, the accelerometer readings include gravitational acceleration (1 g, in a direction that depends on the orientation of the device). Accordingly, when other accelerations are relatively small, the orientation of the device relative to gravity can be determined based on accelerometer data. For instance, in the hanging-arm position of FIG. 1A, accelerometer 210 may detect $a_x$ of approximately 1 g, and $a_y$ and $a_z$ of approximately zero. In the typing position of FIG. 1C, accelerometer 210 may detect $a_x$ of approximately 0, $a_y$ between 0 and 1 g, and $a_z$ between 0 and −1 g. Thus, block 406 can include comparing the oldest samples (e.g., average over 5-10 samples) to sample patterns associated with particular "canonical" starting poses. The canonical starting poses can be defined prior to deployment of the device, for example, based on accelerometer measurements collected under conditions in which a device-wearer is known to be in a specific pose (e.g., the pose of FIG. 1A or FIG. 1C). In some embodiments, the starting pose can be defined as a blend of multiple canonical starting poses. For instance, the blend can be defined as a weighted average of the canonical starting poses, with the weight for each canonical start pose being based on a measure of the degree of similarity of the measured device orientation to a device orientation associated with the canonical starting pose.

At block 408, based on the estimated starting pose, process 400 can select criteria for identifying a "possible" raise gesture executed from that starting pose. Different criteria can be defined for different starting poses. For instance, if the starting pose is arm-down (e.g., as shown in FIG. 1A), a raise gesture would be expected to involve lifting the forearm and rotating the wrist, both of which can be detected primarily by reference to changes in $a_x$ and $a_y$, although some effect on $a_z$ may also be expected. If the starting pose is a typing pose (e.g., as shown in FIG. 1C), there might be little or no lifting of the forearm (and consequently little change in $a_x$), but there would likely be a change in tilt, which may be most reliably detectable as a change in $a_y$. Other criteria derivable from the accelerometer data in the buffer can also be employed, such as a parameter quantifying smoothness of the motion (assuming that an intentional gesture would be executed smoothly, as opposed to accidental jarring or other random movements a user might experience). In some embodiments, a set of criteria for identifying a possible raise gesture given a starting pose can be established heuristically. For instance, a number of users can be asked to make raise gestures from a particular starting pose, and the resulting accelerometer data can be collected throughout the movement from starting pose to completion of the raise gesture.

Statistical algorithms can be applied to analyze this data in order to identify particular criteria (e.g., thresholds on change in $a_y$, smoothness of motion, etc.) for recognizing a possible raise gesture performed from that particular starting pose. The criteria at this stage can be coarse, such that some false positives can occur while false negatives are kept relatively low. The heuristic exercise can be repeated for any number of canonical starting poses to establish pose-dependent threshold criteria. In some embodiments, the results of the analysis can be used to generate a table of criteria such that, given a starting pose estimated at block 406, a corresponding set of criteria for identifying a possible raise gesture can be selected at block 408 via table lookup. In some embodiments, the starting pose can be defined as a blend of multiple canonical starting poses, and where this is the case, block 408 can include blending selection criteria defined for the multiple canonical starting poses.

At block 410, process 400 can determine whether a possible raise gesture is identified, e.g., whether the criteria selected at block 408 are satisfied. In some embodiments, the determination can include comparing particular accelerometer data samples and/or other parameters computed from the accelerometer data samples to the threshold criteria selected at block 408, with a possible raise gesture being detected if the threshold criteria are satisfied.

Further, it may be expected that if a raise gesture is being performed, upon completion of the gesture, the device will come to rest in an orientation consistent with its display being in the user's line of sight. Accordingly, block 410 can include estimating an ending pose for the device, e.g., based on the newest samples read from the buffer, which can correspond to the end of the interval. The ending pose can be compared to a range of poses consistent with the display being in the user's line of sight (e.g., a range of tilt angles in the y and/or x directions relative to horizontal), with a possible raise gesture being detected if the ending pose is within this range. The term "focus pose" is used herein to refer generally to any pose within the range poses deemed consistent with the device being in the user's line of sight (e.g., based on tilt angles).

If a possible raise gesture is not detected, process 400 can return to block 404 to read additional accelerometer data. As noted above, the data read at block 404 can be a fixed-length window that corresponds to a fixed interval of real time. Successive windows of data read during successive iterations of block 404 can overlap. For instance, if the window corresponds to 1 second of real time, successive iterations can happen every 0.1 second or the like (or at a faster rate; as long as the window shifts by at least one sample between iterations, the analysis at successive iterations of blocks 406 and 408 will not be redundant). This can make it less likely that a false negative would occur due to windowing effects.

If, at block 410, a possible raise gesture is detected, then at block 412, process 400 can notify wake control logic 230 that a possible raise gesture was detected. As described below, wake control logic 230 can take action in response to this notification, such as notifying applications processor 204 and/or user interface 202. At block 414, process 400 can monitor additional accelerometer data samples (e.g., including newly received samples outside the original window) to detect whether the device dwells (e.g., holds an approximately constant position) in a focus pose or continues to move. For example, as noted above, focus pose can be defined based on a particular range of tilt angles expected while a user is looking at the device. Tilt angles can be inferred from accelerometer data, and if the tilt angle reaches and remains within this range, that condition can correspond to dwell in the focus pose.

In some embodiments, the range of accelerometer data values corresponding to focus pose can depend at least in part on the starting pose. For instance, the transition from a starting pose to a focus pose can involve accruing a certain amount of tilt along the y axis (also referred to herein as "y-tilt"). For instance, accrued y-tilt can be measured as a net change from a starting $a_y$ component that is greater than or equal to zero (while the user's wrist is turned away) to an ending $a_y$ component that is less than zero (when the wrist is turned to orient the display toward the user's eyes). Block 414 can include monitoring whether the y-tilt remains constant, continues to accrue, or reverses direction, and a loss of accrued y-tilt can indicate moving out of focus pose.

Process 400 can monitor dwell time at block 414 until the dwell time reaches or exceeds a threshold (e.g., 0.1 seconds, 0.5 seconds, or the like) or until the accelerometer data indicates that the focus pose has been lost. At block 416, if the focus pose is lost before the dwell time reaches the threshold, process 400 can return to block 404 to determine a new starting pose and attempt to detect another possible raise gesture.

If, at block 416, the dwell time in focus pose exceeds a threshold, a previously-detected possible raise gesture can be reclassified as a detected raise gesture. At block 418, process 400 can notify wake control logic 230 that a detected raise gesture has occurred. As described below, wake control logic 230 can take action in response to this notification, such as activating user interface 202, notifying applications processor 204, etc.

In some embodiments, further confirmation of a raise gesture to reduce false positives may be desired. Accordingly, at block 420, after detecting a raise gesture, process 400 can invoke a further analysis process, e.g., gesture classifier 234 of FIG. 2A. As described above, gesture classifier 234 can be a machine-learning algorithm that has been previously trained to distinguish a raise gesture from other similar gestures. Gesture classifier 234 can analyze data provided by process 400 at block 420 to either confirm or disconfirm the detected raise gesture. At block 422, if the raise gesture is confirmed, process 400 can so notify wake control logic 230 at block 424, after which process 400 can end (block 426). If, at block 422, the raise gesture is not confirmed, process 400 can so notify wake control logic 230 at block 428, after which process 400 can return to block 404 to attempt to detect another possible raise gesture. In some embodiments, after ending at block 426, process 400 can be restarted (at block 402) at any time, e.g., when loss of focus is detected (as described below) or when user interface 202 becomes inactive for any reason.

Figure 5:
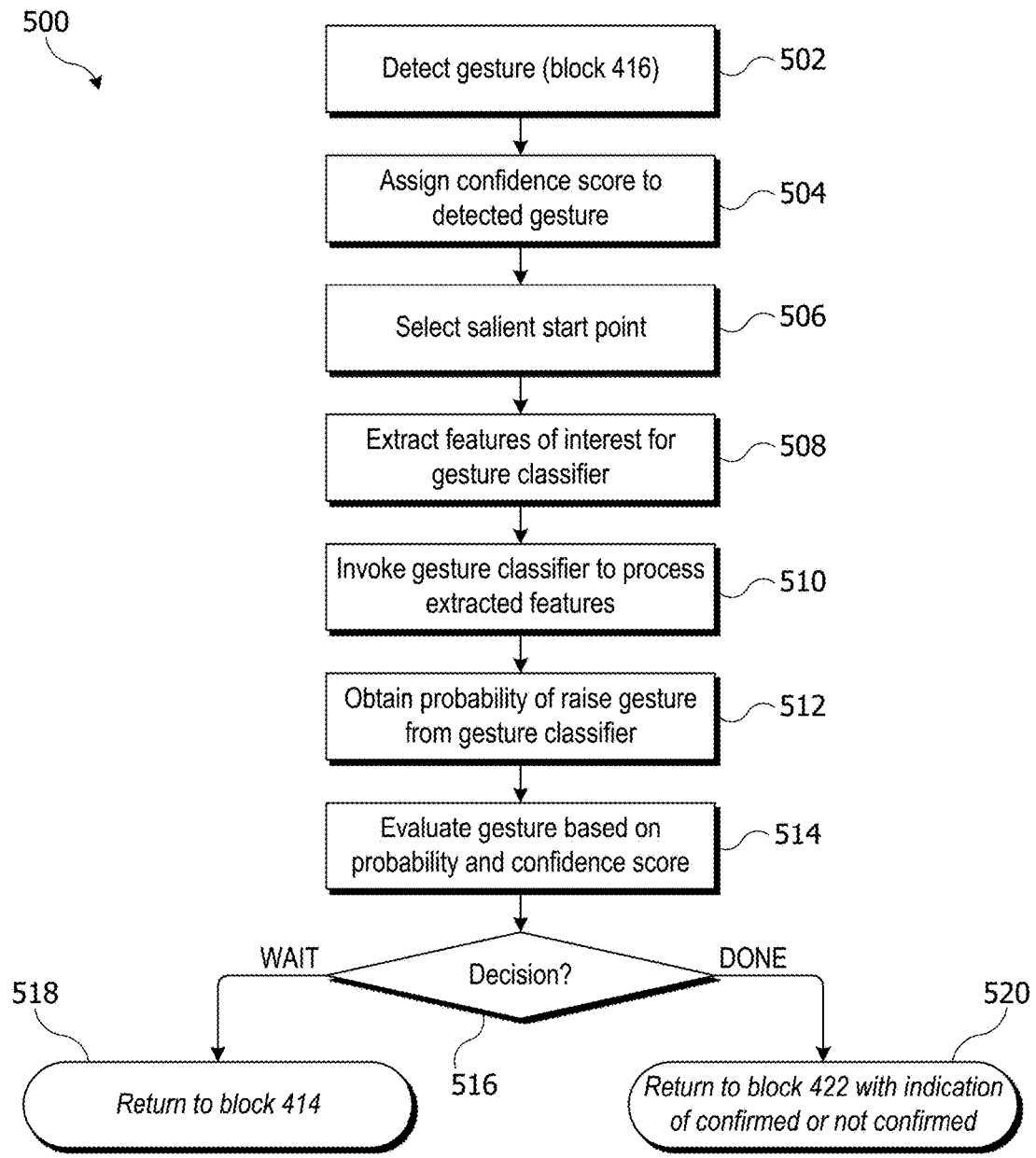
FIG. 5 is a flow diagram of a process for confirming a raise gesture using a gesture classifier according to an embodiment of the present invention.

FIG. 5 is a flow diagram of a process 500 for confirming a gesture using a gesture classifier according to an embodiment of the present invention. Process 500 can be used in connection with process 400 of FIG. 4 described above. Process 500 can be executed, e.g., by main gesture detection module 222, which can invoke gesture classifier 234.

Process 500 can begin at block 502, when main gesture detection module 222 detects a raise gesture, e.g., at block 416 of process 400. At block 504, main gesture detection module 222 can assign a confidence score to the detected raise gesture. In some embodiments, the confidence score can be based on a combination of how well the device pose matches expected features of a focus pose (e.g., whether the device pose is near the edge or center of the range of accelerometer data values and/or tilt values expected for a focus pose) and the length of dwell time in the focus pose.

At block 506, process 500 can select a salient start point (in time) for the gesture classifier. The salient start point can be selected based on a trend of accelerometer data samples leading to the focus pose. For instance, process 500 can identify the point in time at which accelerometer data samples began to change in a manner indicative of the raise gesture. This allows process 500 to account for the fact that a user can execute a raise gesture at different speeds. If the user moved quickly, the salient start point will be closer to the present (i.e., most recent sample) than if the user moved slowly. Thus, the window of data relevant to gesture classification can be variable.

At block 508, process 500 can extract features of interest for the gesture classifier from a window of data extending from the salient start point to the present. The features of interest for a raise gesture can depend on how the gesture classifier has been trained. In some embodiments where the gesture classifier operates on accelerometer data, features of interest can include: the actual accelerometer samples ($a_x$, $a_y$, $a_z$); a smoothness parameter (e.g., based on a standard deviation of the changes between consecutive accelerometer samples); an accrued tilt (e.g., y-tilt) as a function of time; and the starting and ending device orientation or attitude (e.g., starting and ending tilt values). In some embodiments where the gesture classifier operates on gyroscope data, features of interest can include: the actual gyroscope samples ($r_x$, $r_y$, $r_z$); an arc length traversed in the horizontal plane (i.e., the plane normal to the direction of gravity); and a smoothness parameter (e.g., based on a standard deviation of the changes between consecutive gyroscope samples).

At block 510, process 500 can invoke gesture classifier 234 to process the extracted features. In some embodiments, gesture classifier 234 can be a Bayesian classifier that performs a linear discriminant analysis. As described above, the linear discriminant analysis algorithm can be trained in advance of deployment, allowing gesture classifier 234 to quickly compute a probability that the features correspond to a raise gesture. At block 512, process 500 can receive output from gesture classifier 234. The output can include, for example, a probability (between 0 and 1) that a raise gesture was performed.

At block 514, process 500 can determine whether the raise gesture is confirmed or not.

In some embodiments, the determination can be based on a threshold on the probability output of gesture classifier 234, and the threshold can be set, e.g., at 0.5, 0.75, 0.85 or some other threshold as desired. Higher thresholds generally provide fewer false positives but more false negatives, and the optimum threshold can be selected based on acceptable levels of false positives and/or false negatives in a given implementation. In some embodiments, the threshold can be selected as a function of the confidence score assigned at block 504. For instance, a higher confidence score at block 514 may result in a lower threshold on the probability assigned by the gesture classifier while a lower confidence score may result in a higher threshold on the probability assigned by the gesture classifier.

At block 516, process 500 can determine whether to issue a decision or wait for more data. For instance, if the gesture is not confirmed but the probability output from the gesture classifier is close to the threshold, it may be preferable to wait for additional data. In that case, process 500 can end at block 518 without either confirming or disconfirming the raise gesture, and control can be returned to block 414 of process 400 described above. Alternatively, process 500 can end at block 520 with either a confirmation or disconfirmation, and control can be returned to block 422 of process 400 described above.

It will be appreciated that process 500 is illustrative and that variations and modifications are possible. Steps described as sequential may be executed in parallel, order of steps may be varied, and steps may be modified, combined, added or omitted. For instance, other confirmation algorithms can be used. In some embodiments, process 500 can always result in a decision to confirm or disconfirm, without an option to wait.

In some embodiments, a confirmation or disconfirmation by gesture classifier 234 can alter device behavior. For example, activation of some or all user-interface components can be deferred until a detected raise gesture is confirmed. As another example, if a user-interface component is activated in response to a detected raise gesture, a subsequent disconfirmation by gesture classifier 234 can result in inactivating that user-interface component.

Figure 6:
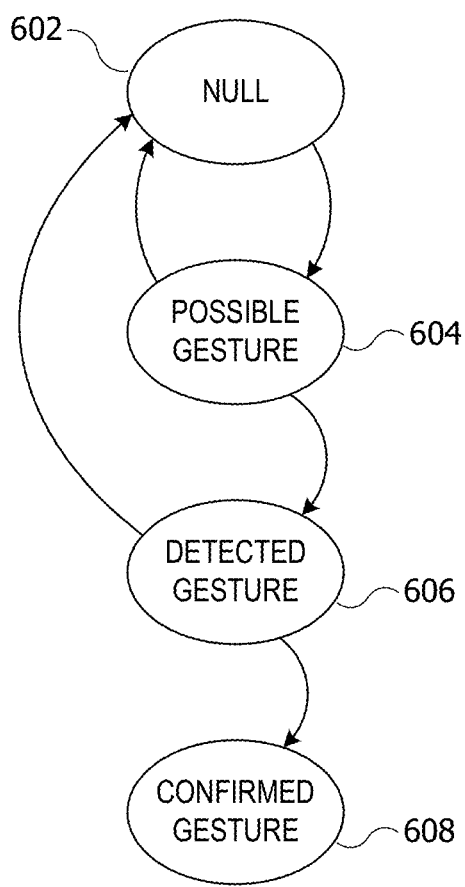
FIG. 6 is a state diagram showing states of a raise gesture detection algorithm according to an embodiment of the present invention.

FIG. 6 is a state diagram showing gesture states for raise gesture detection module 222 executing process 400) according to an embodiment of the present invention. Transitions between these states can be reported to wake control logic 230 or otherwise used to affect the status of user interface 202 and/or other components of device 200.

State 602 can be a "null" state, in which raise gesture detection module 222 has not detected a possible raise gesture. This can be, e.g., the initial state of process 400 of FIG. 4, and module 222 can remain in this state until a possible raise gesture is detected (e.g., at block 410 of FIG. 4). State 604 can be a "possible gesture" state, in which module 222 has detected a possible raise gesture (e.g., at block 410 of FIG. 4). If the possible raise gesture is subsequently rejected, module 222 can return to null state 602. If the possible raise gesture becomes a detected raise gesture (e.g., at block 416 of FIG. 4), module 222 can transition to a "detected gesture" state 606. This reflects an increasing degree of confidence that a raise gesture has occurred. While in state 606, further analysis can be performed (e.g., at blocks 420 and 422 of process 400) to confirm the detected raise gesture. If the detected raise gesture is not confirmed, module 222 can return to null state 602. If the detected raise gesture is confirmed, then module 222 can transition to confirmed gesture state 608. At this point, raise gesture detection is complete, and further execution of module 222 can be stopped. As noted above, module 222 can be restarted when detecting a raise gesture becomes useful again (e.g., when loss of focus is detected or user interface 202 otherwise becomes inactive). Further, as described below, when confirmed gesture state 608 is reached, other algorithms, such as loss-of-focus detection module 228, can be used to continue monitoring the gesture state and detect a transition from confirmed gesture state 608 to null state 602. It is to be understood that process 400 provides an example of module 222 that provides the states and transitions of FIG. 6, but other algorithms can be substituted.

Figure 7:
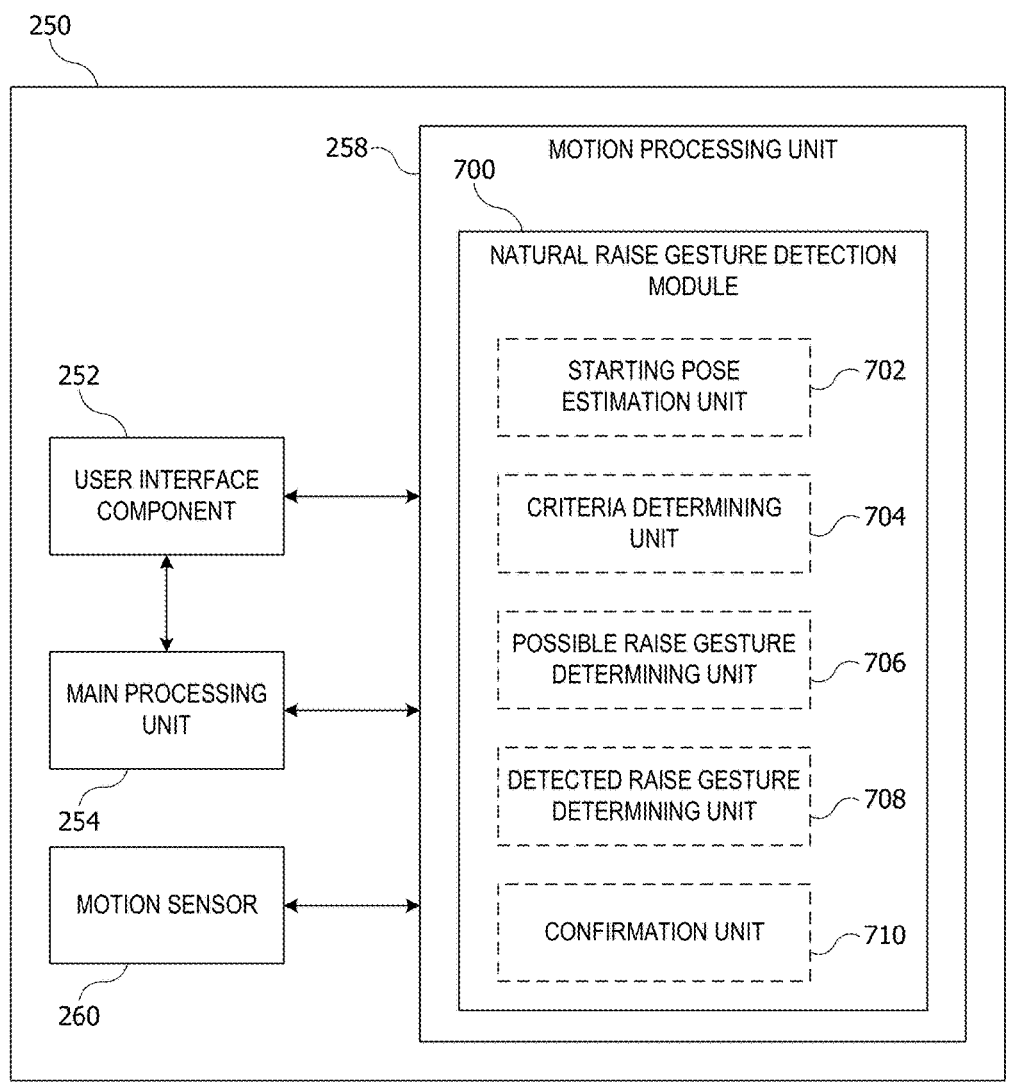
FIG. 7 is a functional block diagram of a natural raise gesture detection module according to an embodiment of the present invention.

FIG. 7 is a functional block diagram of a natural raise gesture detection module 700 according to an embodiment of the present invention. As shown, natural raise gesture detection module 700 can be implemented in motion processing unit 258 of FIG. 2B, for instance, as natural raise gesture detection module 272. Natural raise gesture detection module 700 can also be implemented as main (low dynamic) detection module 222 of FIG. 2A. Natural raise gesture detection module 700 can include a starting pose estimation unit 702, a criteria determining unit 704, a possible raise gesture determining unit 706, a detected raise gesture determining unit 708, and a confirmation unit 710. Each unit can be implemented, for example, using program code executable on a processor and/or dedicated logic circuits.

Starting pose estimation unit 702 can receive motion sensor data and estimate a starting pose based on the motion sensor data. For instance, starting pose estimation unit 702 can implement block 406 of process 400 described above. Starting pose estimation unit 702 can provide an estimated starting pose to criteria determining unit 704.

Criteria determining unit 704 can determine criteria for detecting a possible raise gesture based at least in part on the starting pose estimated by starting pose estimation unit 702. For instance, criteria determining unit 704 can implement block 408 of process 400 described above. Criteria determining unit 704 can provide criteria for detecting a possible raise gesture to possible raise gesture determining unit 706.

Possible raise gesture determining unit 706 can receive motion sensor data and determine whether the received data satisfy the criteria determined by criteria determining unit 704. For instance, possible raise gesture determining unit 706 can implement block 410 of process 400 described above. If the criteria are satisfied, possible raise gesture determining unit 706 can notify other system components (e.g., wake control logic 230 of FIG. 2A or wake control logic module 280 of FIG. 2B). For instance, possible raise gesture determining unit 706 can implement block 412 of process 400 described above. Possible raise gesture determining unit 706 can also notify detected raise gesture determining unit 708 if the criteria are satisfied.

Detected raise gesture determining unit 708 can receive the notification of a possible raise gesture from possible raise gesture determining unit 706 and can monitor additional accelerometer data to determine whether a minimum dwell time in occurs and/or other conditions are met for a detected raise gesture. For instance, detected raise gesture determining unit 708 can implement blocks 414 and 416 of process 400 described above. If the conditions for a detected raise gesture are met, detected raise gesture determining unit 708 can notify other system components (e.g., wake control logic 230 of FIG. 2A or wake control logic module 280 of FIG. 2B). For instance, detected raise gesture determining unit 708 can implement block 418 of process 400. Detected raise gesture determining unit 708 can also notify confirmation unit 710 if the conditions for a detected raise gesture are met.

Confirmation unit 710 can perform gesture confirmation based on motion sensor data associated with a detected raise gesture. For instance, confirmation unit 710 can implement blocks 420 and 422 of process 400 and/or blocks 504-520 of process 500 described above. In some embodiments, confirmation unit 710 can invoke gesture classifier 234 of FIG. 2A or gesture classifier module 284 of FIG. 2B. Confirmation unit 710 can notify other system components (e.g., wake control logic 230 of FIG. 2A or wake control logic module 280 of FIG. 2B) as to whether the detected raise gesture is confirmed or disconfirmed.

It will be appreciated that natural raise gesture detection module 700 is illustrative and that variations and modifications are possible. For instance, while natural raise gesture detection module 700 is described with reference to particular blocks or units, it is to be understood that these blocks are defined for convenience of description and are not intended to imply a particular physical arrangement of component parts. Further, the blocks need not correspond to physically distinct components, and the same physical components can be used to implement aspects of multiple blocks. Blocks can be configured to perform various operations, e.g., by programming a processor or providing appropriate control circuitry, and various blocks might or might not be reconfigurable depending on how the initial configuration is obtained. Embodiments of the present invention can be realized in a variety of apparatus including electronic devices implemented using any combination of circuitry and software.

Another example of an algorithm for detecting a natural raise gesture is high-dynamic main detection module 224 of FIG. 2A, which can be adapted for detecting natural raise gestures when the user is engaged in a high-dynamic activity, such as running. "High-dynamic activity" as used herein can refer to any activity that inherently involves significant arm or wrist motion such that the accelerometer data can become unreliable for detecting a raise gesture. Where the user is engaged in a high-dynamic activity, high-dynamic detection module 224 can supplement or replace accelerometer data with data from other sensors, such as gyroscopic sensor 212.

Whether to use low-dynamic detection module 222 or high-dynamic detection module 224 can be determined, e.g. by wake control logic 230. For example, wake control logic 230 can receive information from activity classifier 232 indicating whether the user is currently engaged in a high-dynamic activity (e.g., running) or other activity (e.g., walking) or no activity. As another example, in some embodiments the user may provide a direct indication that a high-dynamic activity is about to begin. For instance, the user may indicate that he is about to begin running (e.g., by interacting with a workout-tracking application program on the device), and from this, it can be inferred that high-dynamic detection module 222 should be used until the workout ends. Any combination of available input including inputs from activity classifier 232 and/or direct user input can be used by wake control logic 230 to infer whether the user is engaged in high-dynamic activity. Responsive to this inference, wake control logic 230 can select either low-dynamic detection module 222 (if the user is not performing a high-dynamic activity) or high-dynamic detection module 224. In some embodiments, different algorithms can be provided for use during different types of activities; for instance there can be multiple high-dynamic detection algorithms (e.g., for running versus rowing and so on).

Figure 8:
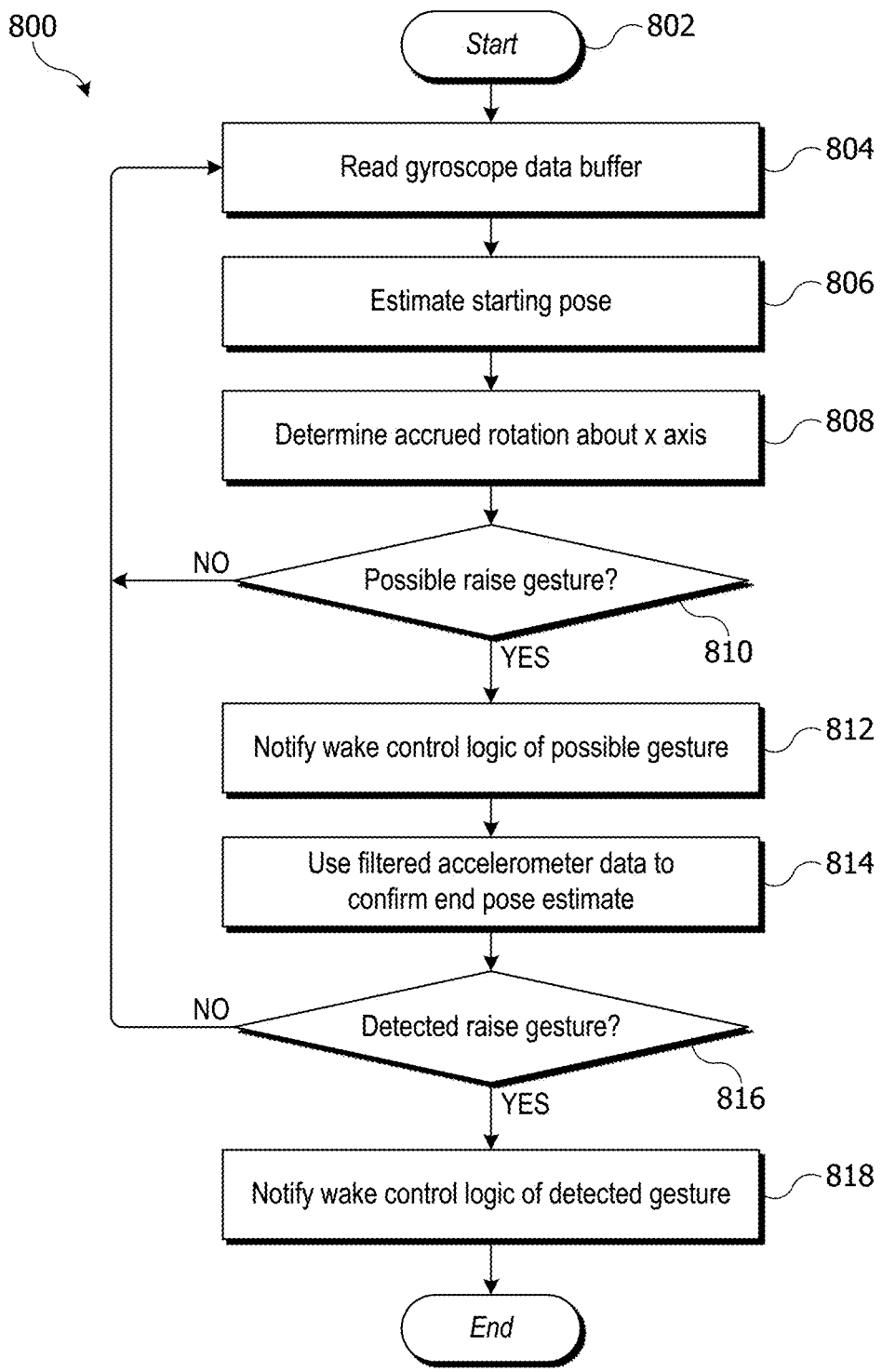
FIG. 8 is a flow diagram of another raise-gesture detection process according to an embodiment of the present invention.

FIG. 8 is a flow diagram of a process 800 for detecting a natural raise gesture during a high-dynamic activity (e.g., running) according to an embodiment of the present invention. Process 800 can be implemented, e.g., in high-dynamic detection module 224 in device 200 of FIG. 2A. In this example, high-dynamic detection process 800 can progress through a series of gesture states (which can be similar or identical to the states shown in FIG. 6) and can report each state transition, e.g., to wake control logic 230 of FIG. 2A. As described below, wake control logic 230 can use the gesture-state transitions to determine whether and when to wake applications processor 204 and/or whether and when to instruct applications processor 204 to activate user interface 202. In this example, process 800 can rely primarily on gyroscope data (e.g., from gyroscopic sensor 212 of FIG. 2A), supplemented with filtered accelerometer data (e.g., from accelerometer 210 of FIG. 2A).

Like process 400, process 800 can start (block 802) when user interface 202 is in an inactive state. At this time, applications processor 204 can be in a sleep state or wake state as desired. Gyroscopic sensor 212 can be activated and can provide updated data samples (referred to as "gyroscope data") at a regular sampling rate (e.g., 100 Hz), and each gyroscope data sample can indicate components of rotation ($r_x$, $r_y$, $r_z$) using device-relative coordinates as shown in FIG. 3, with $r_x$ denotes rotation about the x axis of FIG. 3 and so on. Received gyroscope data can be buffered, e.g., using a circular buffer or FIFO or the like.

At block 804, process 800 can read data samples from the gyroscope data buffer. The amount of data can depend on the sampling rate, buffer size, and desired interval of time for analyzing motion. For example, process 800 can read a fixed-length window of data corresponding to a fixed interval of real time, e.g., 0.3 seconds, 0.5 seconds, 1 second, or the like.

Figure 10A:
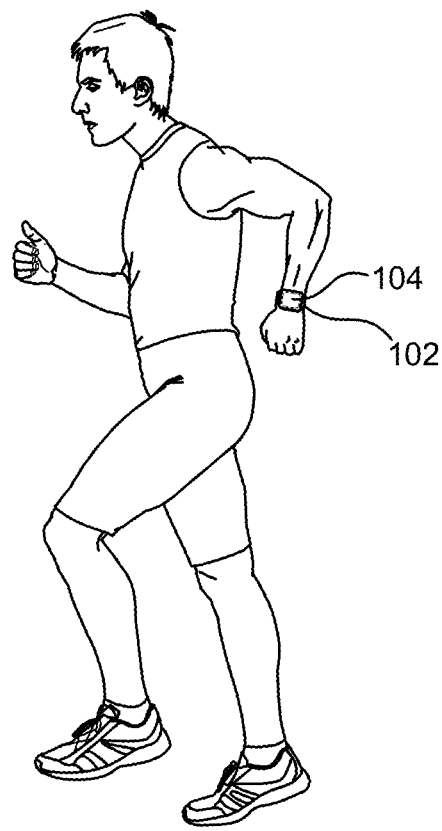
FIGS. 10A and 10B show an example of a use case for an embodiment of the present invention.
Figure 10B:
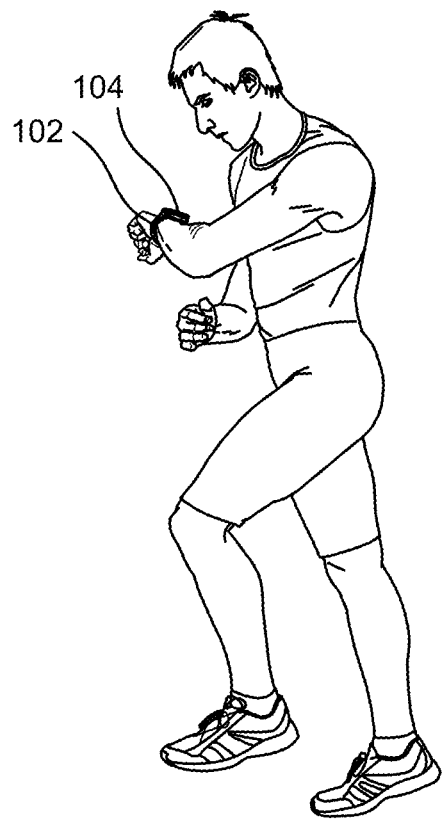

At block 806, process 800 can estimate a starting pose for the device. In the context of running, for example, it can be assumed that the user's arms would be held in a natural bent position with the palm turned inward (toward the user's body). FIGS. 10A and 10B show an example of a running user wearing wrist-wearable device 102. As shown in FIG. 10A, in a common natural running position, display 104 faces outward (away from the user's body). The exact angle will vary depending on the user, and there may be a small oscillatory rotation about the x axis (as defined in FIG. 3) due to the natural swing of the user's arms. To look at the device while running, the user can pronate the wrist (rotate the palm downward) and perhaps raise the arm, as shown in FIG. 10B, to bring display 104 into the line of sight. Such a gesture involves a larger rotation about the x axis than the typical arm swing of a runner. Accordingly, accrued rotation about the x axis can be a good first indicator of a possible raise gesture, and at block 808, process 800 can analyze the buffered gyroscope data to determine the accrued rotation about the x axis.

At block 810, based on the accrued rotation, process 800 can determine whether a possible raise gesture has been detected. In some embodiments, this determination can also include determining whether rotational motion has slowed significantly or stopped at the end of the time interval, which would suggest that the user is holding the arm steady enough to look at the device. If a possible raise gesture is not detected, process 800 can return to block 804 to read additional data. As noted above, the data read at block 804 can be a fixed-length window. Successive windows of data read on successive iterations of block 804 can overlap. For instance, if the window corresponds to 0.5 second of real time, successive iterations can happen every 0.1 seconds or the like (or at a faster rate; as long as the window shifts by at least one sample between iterations, the analysis at successive iterations of blocks 806 and 808 will not be redundant). Overlapping windows can make it less likely that a false negative would occur due to windowing effects.

If, at block 810, a possible raise gesture is detected, then at block 812, process 800 can notify wake control logic 230 that a possible raise gesture was detected. In the state diagram of FIG. 6, this can correspond to a transition from null state 602 to possible gesture state 604. As described below, wake control logic 230 can take action in response to this notification, such as notifying applications processor 204. At block 814, process 800 can use filtered accelerometer data to confirm an end pose estimate. The accelerometer data can be heavily filtered to remove artifacts of arm motions associated with running and can be used to confirm that the pose corresponds to one in which the display of the device is likely visible to the user. Based on the end pose estimate, at block 816, process 800 can determine whether to reclassify the possible raise gesture as a detected raise gesture. If not, process 800 can return to block 804 to attempt to detect another possible raise gesture.

If, at block 816, the raise gesture is detected, then at block 818, process 800 can notify wake control logic 230 that a detected raise gesture has occurred. As described below, wake control logic 230 can take action in response to this notification, such as notifying applications processor 204 and/or activating user interface 202. Process 800 can end at this state (block 820). Alternatively (not shown in FIG. 8), gesture classifier 234 can be used to confirm the detected raise gesture. As described above, gesture classifier 234 can be trained to distinguish natural raise gestures from other similar actions that a user might perform while running (e.g., drinking water from a water bottle, wiping sweat off forehead), and the results can be similar to the confirmation portion of process 400 described above.

It will be appreciated that raise-gesture detection processes 400 and 800 are illustrative and that variations and modifications are possible. Steps described as sequential may be executed in parallel, order of steps may be varied, and steps may be modified, combined, added or omitted. Different thresholds, criteria, and sensor inputs can be used, and different sets of states can be defined as desired. In some embodiments, processes 400 and 800 can be invoked in the alternative, depending on what the user is doing. For example, a gyroscopic sensor may consume more power than an accelerometer. Accordingly, it may be desirable to power down the gyroscopic sensor and inactivate process 800 (which uses gyroscopic sensor data as input) in situations where accelerometer data is sufficiently reliable that process 400 can be used, such as where the user is sitting, standing, or walking. As described above, wake control logic 230 can determine which gesture-detection algorithm(s) should be active at a given time based on information from activity classifier 232 and can activate (or enable) the desired algorithm(s). Other sources of activity information can also be used. For instance, in some embodiments, wake control logic 230 can perform a data-quality analysis on received accelerometer data to determine whether process 400 is likely to be reliable. Process 400 can be preferred when it is likely to be reliable, and process 800 can be used when process 400 is not likely to be reliable.

Figure 9:
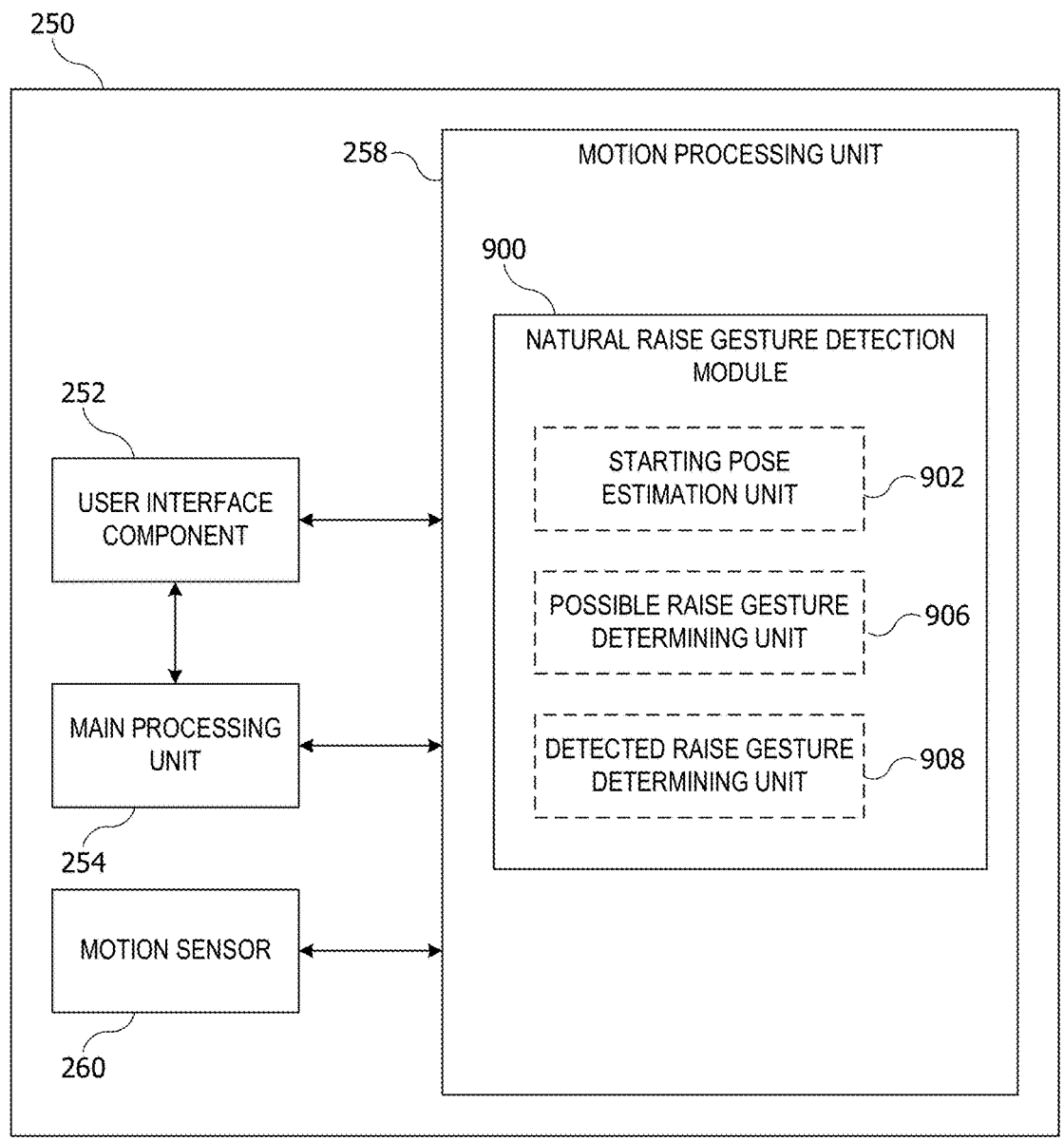
FIG. 9 is a functional block diagram of a natural raise gesture detection module according to an embodiment of the present invention.

FIG. 9 is a functional block diagram of a natural raise gesture detection module 900 according to an embodiment of the present invention. As shown, natural raise gesture detection module 900 can be implemented in motion processing unit 258 of FIG. 2B, for instance, as natural raise gesture detection module 274. Natural raise gesture detection module 900 can also be implemented as main (high dynamic) detection module 224 of FIG. 2A. Natural raise gesture detection module 900 can include a starting pose estimation unit 902, a possible raise gesture determining unit 906, and a detected raise gesture determining unit 908. Each unit can be implemented, for example, using program code executable on a processor and/or dedicated logic circuits.

Starting pose estimation unit 902 can receive motion sensor data and estimate a starting pose based on the motion sensor data. For instance, starting pose estimation unit 902 can implement block 806 of process 800 described above. Starting pose estimation unit 902 can provide an estimated starting pose to possible raise gesture determining unit 906.

Possible raise gesture determining unit 906 can receive the estimated starting pose and motion sensor data and can determine whether the received data satisfy criteria for a possible raise gesture. For instance, possible raise gesture determining unit 906 can implement blocks 808 and 810 of process 800 described above. If the criteria are satisfied, possible raise gesture determining unit 906 can notify other system components (e.g., wake control logic 230 of FIG. 2A or wake control logic module 280 of FIG. 2B). For instance, possible raise gesture determining unit 906 can implement block 812 of process 800 described above. Possible raise gesture determining unit 906 can also notify detected raise gesture determining unit 908 if the criteria are satisfied.

Detected raise gesture determining unit 908 can receive the notification of a possible raise gesture from possible raise gesture determining unit 906 and can monitor additional motion sensor data to determine whether conditions are met for a detected raise gesture. For instance, detected raise gesture determining unit 908 can implement blocks 814 and 816 of process 800 described above. If the conditions for a detected raise gesture are met, detected raise gesture determining unit 908 can notify other system components (e.g., wake control logic 230 of FIG. 2A or wake control logic module 280 of FIG. 2B). For instance, detected raise gesture determining unit 908 can implement block 818 of process 800.

It will be appreciated that natural raise gesture detection module 900 is illustrative and that variations and modifications are possible. For instance, while natural raise gesture detection module 900 is described with reference to particular blocks or units, it is to be understood that these blocks are defined for convenience of description and are not intended to imply a particular physical arrangement of component parts. Further, the blocks need not correspond to physically distinct components, and the same physical components can be used to implement aspects of multiple blocks. Blocks can be configured to perform various operations, e.g., by programming a processor or providing appropriate control circuitry, and various blocks might or might not be reconfigurable depending on how the initial configuration is obtained. Embodiments of the present invention can be realized in a variety of apparatus including electronic devices implemented using any combination of circuitry and software. Additional blocks can be added (e.g., a block similar to confirmation unit 710 if confirmation is desired).

Used individually or in combination, processes 400 and 800 can detect natural raise gestures under a variety of conditions. However, it may still be possible for a user to execute a raise gesture that goes undetected. For example, depending on details of the algorithms, natural raise gesture detection may be less reliable if the user is lying down (which might violate assumptions about the orientation relative to gravity that places the device in the user's line of sight), if the user wears the device such that the display is on the inside of the wrist (which might violate assumptions about the amount and/or direction of rotation needed to bring the device into the user's line of sight), if the user is in an accelerated environment (such as a roller coaster), etc.

Accordingly, some embodiments can provide additional algorithms for detecting a deliberate raise gesture. This can allow the user to activate the display by performing a predefined gesture that the user would be unlikely to perform except when desiring to activate the display. For example, the deliberate raise gesture can be defined as a double oscillation of the wrist, which "twists" the device back and forth about the x axis (as defined in FIG. 3). The user can perform an oscillation, for example, by quickly rotating the wrist away from an original position and then releasing the rotation so the wrist returns to the original position. A double oscillation can follow the sequence: rotate; release; rotate; release. Oscillations can be detected as impulse peaks in motion-sensor data (e.g., accelerometer or gyroscope data). By requiring a minimum amount of rotation to be accrued and lost during each oscillation and a maximum time between oscillations, a deliberate raise gesture can be distinguished from most other motions a user might routinely perform (e.g., opening a door or operating a screwdriver), making it unlikely that the deliberate raise gesture would be detected in cases where the user does not intend to activate the display. Other gestures can be substituted.

Figure 11:
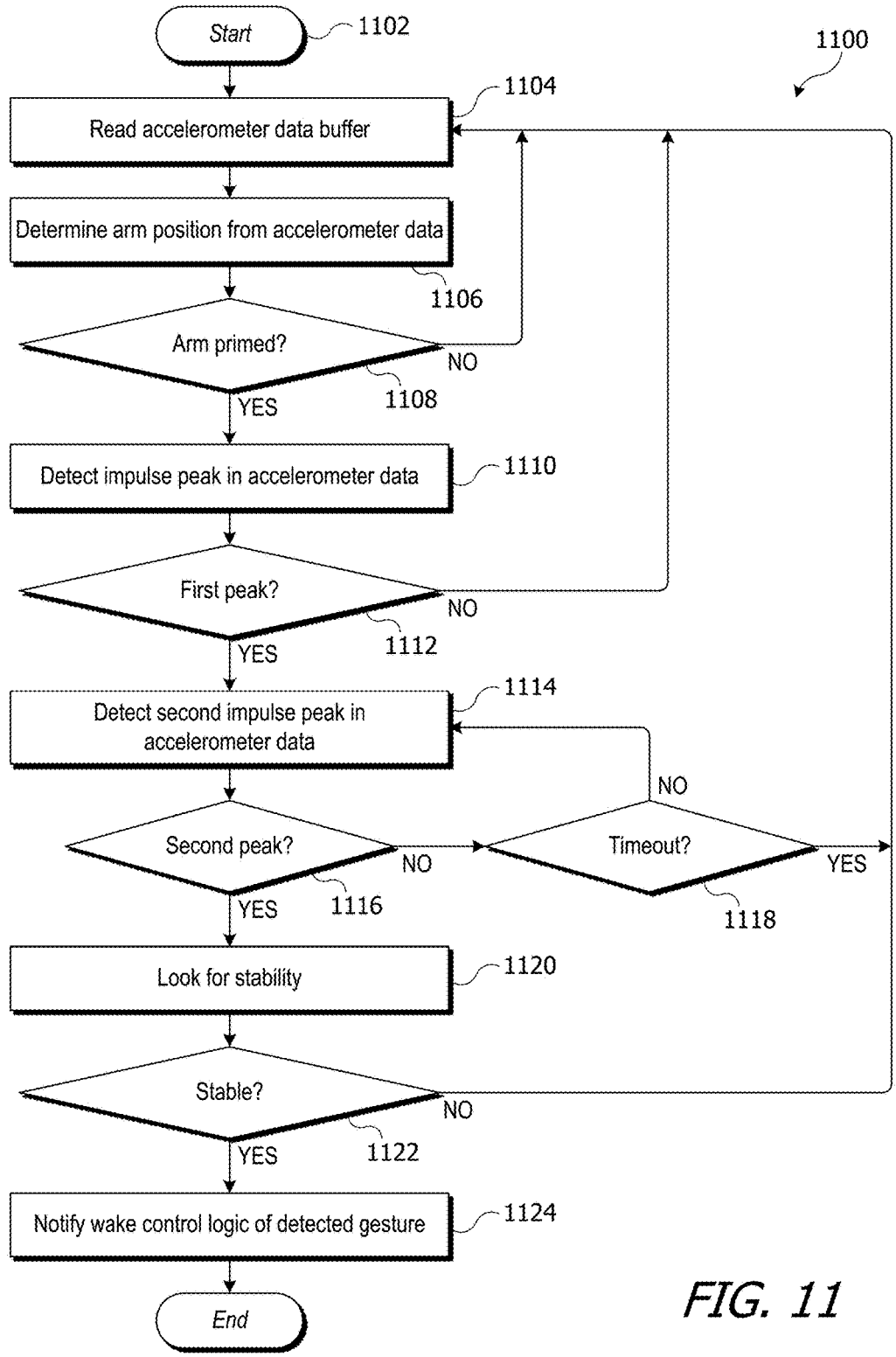
FIG. 11 is a flow diagram of a process for detecting a deliberate raise gesture according to an embodiment of the present invention.

FIG. 11 is a flow diagram of a process 1100 for detecting a deliberate raise gesture according to an embodiment of the present invention. In this example, the deliberate raise gesture is defined as a "jiggle" gesture in which the user performs a double oscillation of the wrist (rotating the device away from and then toward the line of sight twice) within a short period of time. Process 1100 can be executed, e.g., in jiggle detection module 226 of FIG. 2A. In this example, jiggle detection process 1100 can progress from a null state (no gesture detected) directly to a detected state without an intervening possible-gesture state. Other states can also be defined if desired. Process 1100 can report the state transition, e.g., to wake control logic 230 of FIG. 2A. As described below, wake control logic 230 can use the gesture-state transitions to determine whether and when to wake applications processor 204 and/or whether and when to instruct applications processor 204 to activate user interface 202.

Process 1100 can start (block 1102) when user interface 202 is in an inactive state. At this time, applications processor 204 can be in a sleep state or wake state as desired. Accelerometer 210 can be providing updated data at a regular sampling rate (e.g., 100 Hz), and the data can indicate vector components of acceleration ($a_x$, $a_y$, $a_z$) using device-relative coordinates as shown in FIG. 3. Received data can be buffered, e.g., using a circular buffer or FIFO or the like.

At block 1104, process 1100 can read data samples from the accelerometer data buffer. The amount of data can depend on the sampling rate, buffer size, and desired period of time for analyzing motion. For example, process 1100 can read a fixed-length window of data corresponding to a fixed interval of real time, e.g., 0.1 seconds, 0.5 seconds, 1 second, or the like.

At block 1106, process 1100 can determine an arm position from the accelerometer data. Accordingly, block 1106 can include determining an orientation of the device (relative to gravity) based on accelerometer data, from which an arm position can be inferred.

At block 1108, process 1100 can determine whether the user's arm is "primed" for performing a jiggle gesture. For instance, it may be assumed that a user would only execute a deliberate raise gesture when the device is already positioned in the line of sight. As used herein, the user's arm can be considered primed if the device is being held relatively still for a short period (e.g., 0.2 seconds, 0.5 seconds, 1.0 seconds), suggesting that the user might be trying to look at the device. Determining whether the user's arm is primed can include analyzing some or all of the data samples in the buffer. For instance, the oldest samples can be analyzed. Additional criteria can also be applied, such as criteria based on the spatial orientation of the device. For instance, if gravitational acceleration is primarily along the z axis (as defined in FIG. 3) and there is little or no acceleration along the x axis, this can suggest that the device display is approximately parallel to the ground, a common position for a user checking a wrist-wearable device (or many other devices). Accordingly, additional criteria can be defined based on the direction of gravity. Requiring that a priming criterion be satisfied can reduce false positives that might result from incidental movement of the wrist, thereby saving power. In some embodiments, the priming criterion may be relaxed to account for situations where the user's head might not be in a normal vertical orientation (e.g., if the user is lying down), although relaxing the criteria can increase the rate of false positives. In some embodiments, other information may be available to suggest whether the user's head is vertical or not (e.g., it may be possible to determine via physiological sensors such as a heart-rate monitor that the user is lying down), and such information can be incorporated into the priming criterion.

If, at block 1108, the arm is not primed, process 1100 can return to block 1104 to read additional accelerometer data. As noted above, the data read at block 1104 can be a fixed-length window. Successive windows of data read during successive iterations of block 1104 can overlap. For instance, if the window corresponds to 1 second of real time, successive iterations can happen every 0.1 second or the like (or at a faster rate; as long as the window shifts by at least one sample between iterations, the analysis at successive iterations of blocks 1106 and 1108 will not be redundant). This can make it less likely that a false negative would occur due to windowing effects.

If, at block 1108, the user's arm is primed, process 1100 can attempt to detect a jiggle gesture. The jiggle gesture in this example requires two oscillations about the x-axis. Since initiating or stopping a rotational motion about the x-axis entails acceleration along the y-axis (see FIG. 3), the oscillatory motion of interest in this example can be detected based on impulse peaks in the y-component of acceleration. Accordingly, at block 1110, process 1100 can analyze the accelerometer data to detect such a peak. In some embodiments, a peak or spike in the y-component of jerk (time derivative of acceleration) can be used to detect the oscillation. Given that the gesture to be detected is intentional, the peak is expected to stand out against any background of sample-to-sample variation due to random motions that may be occurring (e.g., due to the user walking, riding in a vehicle, jogging, etc.). Accordingly, the criteria for detecting a twist or oscillation can be defined relative to a background of sample-to-sample variations measured at around the same time. Particular criteria for peak detection can be defined heuristically, e.g., by having a number of users perform the jiggle gesture and analyzing the accelerometer data to identify specific thresholds on acceleration and/or jerk. The thresholds can be defined based on absolute values or values relative to the current level of background variation.

At block 1112, if a first peak is not detected, process 1100 can return to block 1104 to continue monitoring accelerometer data. If a first peak is detected, then at block 1114, process 1100 can attempt to detect a second peak. In this example, the second peak should be in the same direction as the first, indicating that the user repeated the oscillatory motion, and the criteria can be the same as or similar to those used at block 1112.

If, at block 1116, a second peak is not detected, then at block 1118, process 1100 can determine whether a timeout period has elapsed since detecting the first peak at block 1112. The timeout period can be used to distinguish a deliberate jiggle gesture from other wrist-rotation motions and can be selected based on measurement of the time required for various individuals to intentionally execute a double oscillation. For instance, the timeout period can be 0.2 seconds, 0.5 seconds, or the like.

Process 1100 can continue to search for the second peak until a second peak is detected or the timeout period expires. If, at block 1118, the timeout period expires, process 1100 can return to block 1104 to collect additional accelerometer data and again search for two peaks.

If, at block 1116, a second peak is detected, then at block 1120, process 1100 can analyze additional accelerometer data to determine whether the position of the device has stabilized. If, at block 1122, the position has not stabilized, this can indicate that the oscillation occurred for some other reason not related to looking at the device, and process 1100 can return to block 1104 to collect additional accelerometer data and again search for two peaks.

If, at block 1122, the position has stabilized, this can correspond to detecting the jiggle gesture, and at block 1124, process 1100 can notify wake control logic 230 that the jiggle gesture has been detected. As described below, wake control logic 230 can take action in response to this notification, such as activating user interface 202 and/or waking applications processor 204.

It will be appreciated that process 1100 is illustrative and that variations and modifications are possible. Steps described as sequential may be executed in parallel, order of steps may be varied, and steps may be modified, combined, added or omitted. Different thresholds, criteria, and sensor inputs can be used, and different sets of states can be defined as desired. In some embodiments, detection of the first peak can be reported as a possible raise gesture, or detection of two peaks can be reported as a possible raise gesture prior to determining whether the device position has stabilized. Other deliberate raise gestures can be detected by defining different criteria (e.g., more or fewer impulse peaks, accelerations in different directions, etc.). In some embodiments, process 1100 can be executed concurrently with either process 400 or process 800, so that the user can activate the display at any time when it is inactive by performing either a natural or deliberate raise gesture.

Figure 12:
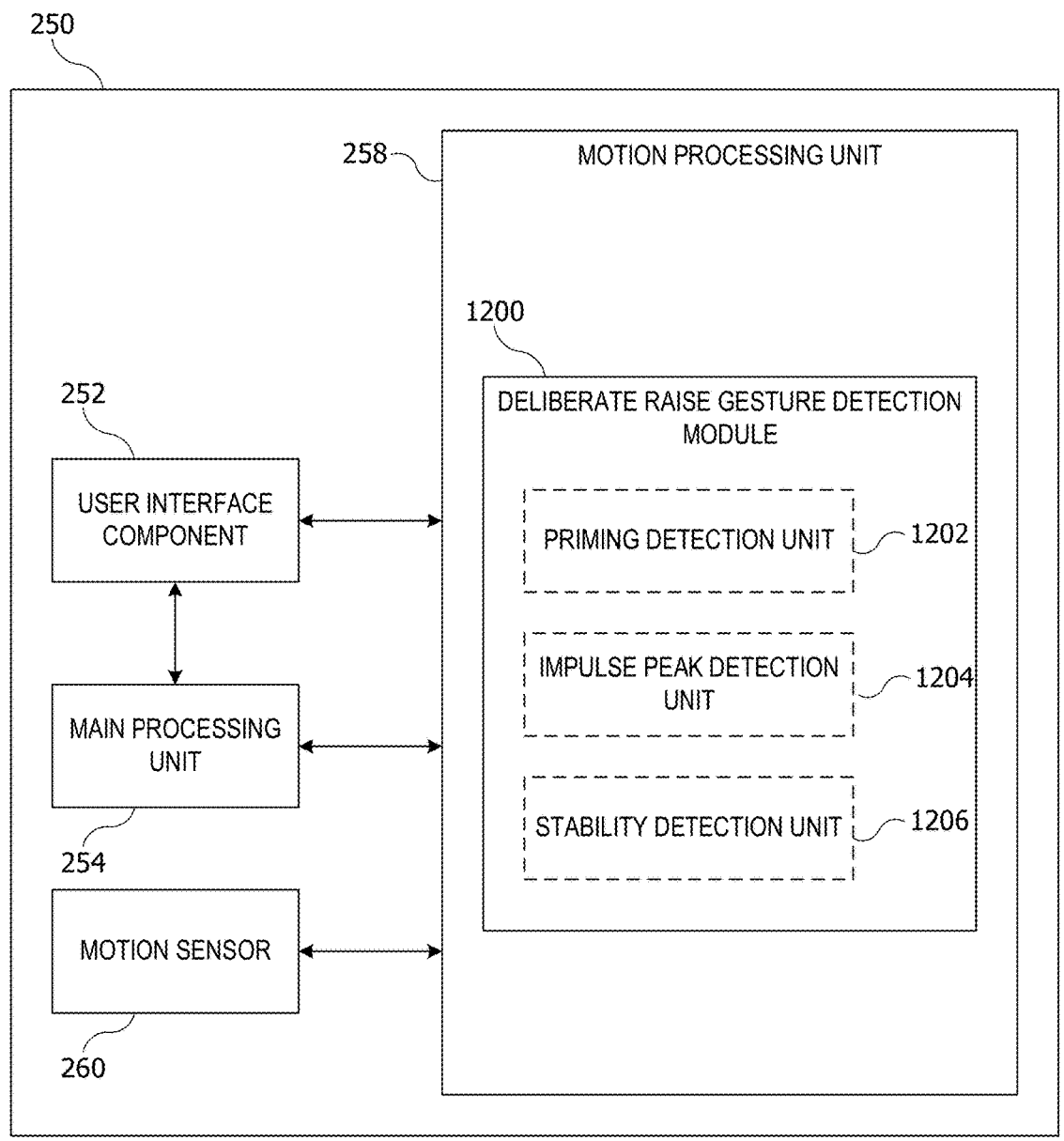
FIG. 12 is a functional block diagram of a deliberate raise gesture detection module according to an embodiment of the present invention.

FIG. 12 is a functional block diagram of a deliberate raise gesture detection module 1200 according to an embodiment of the present invention. As shown, deliberate raise gesture detection module 1200 can be implemented in motion processing unit 258 of FIG. 2B, for instance, as deliberate raise gesture detection module 276. Natural raise gesture detection module 700 can also be implemented as jiggle detection module 226 of FIG. 2A. Deliberate raise gesture detection module 1200 can include a priming detection unit 1202, an impulse peak detecting unit 1204, and a stability detection unit 1206. Each unit can be implemented, for example, using program code executable on a processor and/or dedicated logic circuits.

Priming detection unit 1202 can receive motion sensor data and determine from the data whether the user's arm is primed to execute a deliberate raise gesture. For instance, priming detection unit 1202 can implement blocks 1106 and 1108 of process 1100 described above. When priming detection unit 1202 determines that the user's arm is primed, priming detection unit 1202 can provide a notification to impulse peak detection unit 1204.

Impulse peak detection unit 1204 can receive additional motion sensor data and detect the presence of a target number (e.g., one, two, or three) of impulse peaks based on the data. For instance, impulse peak detection unit 1204 can implement blocks 1110-1118 of process 1100 described above. When the number of impulse peaks indicative of a raise gesture (e.g., two in the example above) has been detected, impulse peak detection unit 1204 can provide a notification to stability detection unit 1206.

Stability detection unit 1206 can receive additional motion sensor data and determine whether the data indicates that the device position has stabilized following the detected impulse peak(s). For instance, stability detection unit 1206 can implement blocks 1120 and 1122 of process 1100 described above. If stability is detected, stability detection unit 1206 can notify other system components (e.g., wake control logic 230 of FIG. 2A or wake control logic module 280 of FIG. 2B). For instance, stability detection unit 1206 can implement block 1124 of process 1100 described above.

It will be appreciated that deliberate raise gesture detection module 1200 is illustrative and that variations and modifications are possible. For instance, while deliberate raise gesture detection module 1200 is described with reference to particular blocks or units, it is to be understood that these blocks are defined for convenience of description and are not intended to imply a particular physical arrangement of component parts. Further, the blocks need not correspond to physically distinct components, and the same physical components can be used to implement aspects of multiple blocks. Blocks can be configured to perform various operations, e.g., by programming a processor or providing appropriate control circuitry, and various blocks might or might not be reconfigurable depending on how the initial configuration is obtained. Embodiments of the present invention can be realized in a variety of apparatus including electronic devices implemented using any combination of circuitry and software.

Once a raise gesture (natural or deliberate) has been detected, it can be assumed that the user is now focused on the device and may be interacting with it. Any type of user interaction can be supported, and the duration of interaction can be as long as the user desires. It is expected that at some point, the interaction will end. When the interaction ends, it may be desirable to return the display to its inactive state in order to conserve power.

In some embodiments, a user can expressly indicate the end of an interaction, e.g., by pressing a button on the device to inactivate the display. In addition or instead, a device can infer that the interaction has ended based on lack of user input over a sufficiently long period of time, although such an inference might not be accurate if the user is still looking at presented information. Accordingly, in some embodiments, a device can automatically detect when the user loses focus on the device, based on motion-sensor data. For example, if the user moves the device's display out of the line of sight, this can indicate that the user has lost focus. Such motion is referred to herein as a "loss-of-focus gesture."

Figure 13:
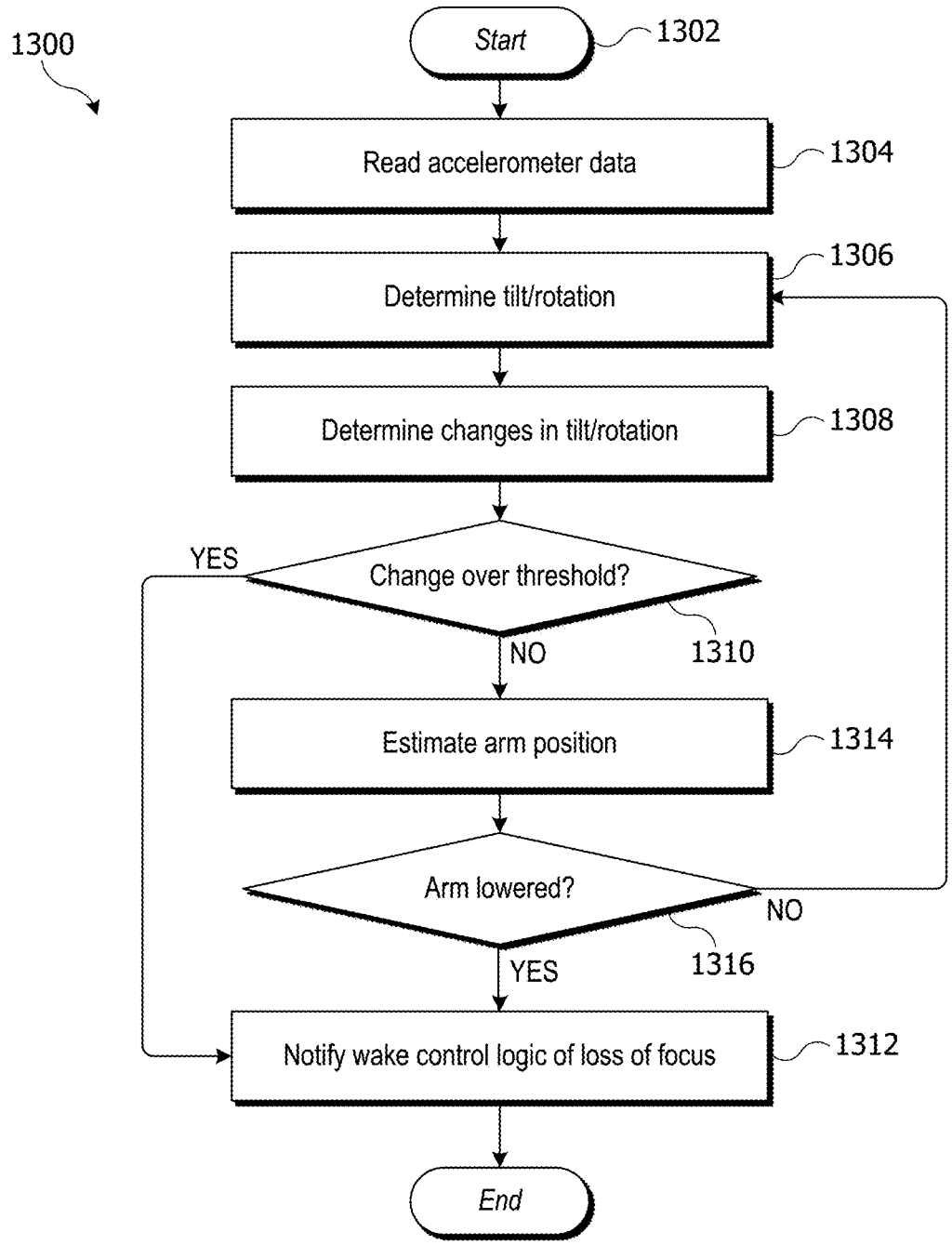
FIG. 13 is a flow diagram of a process for detecting a loss-of-focus event according to an embodiment of the present invention.

Automatic detection of loss-of-focus gestures (also referred to herein as "loss-of-focus events") can be facilitated using motion-based algorithms. FIG. 13 is a flow diagram of a process 1300 for detecting a loss-of-focus event according to an embodiment of the present invention. Process 1300 can be executed, e.g., in loss-of-focus detection module 228 of FIG. 2A. In this example, process 1300 can be performed while the device is in a focus state (e.g., after detecting and/or confirming a raise gesture using any of processes 400, 800, or 1100 described above). Loss of focus can be detected based on changes in tilt angle or rotation of the device, particularly changes in y-tilt. Process 1300 can report a detected loss-of-focus event, e.g., to wake control logic 230 of FIG. 2A. As described below, wake control logic 230 can use the reported event to determine whether to inactivate user interface 202.

Process 1300 can start (block 1302) when user interface 202 is in an active state. The active state can be achieved as a result of any of the gesture-detection processes described above, as a result of other gesture-detection processes, or in response to a manual indication from the user (e.g., touching a button on device 200). At this time, applications processor 204 can also be in a wake state. Accelerometer 210 can be providing updated data at a regular sampling rate (e.g., 100 Hz), and the data can indicate vector components of acceleration ($a_x$, $a_y$, $a_z$) using device-relative coordinates as shown in FIG. 3. Received data can be buffered, e.g., using a circular buffer or FIFO or the like.

At block 1304, process 1300 can read data samples from the accelerometer data buffer. The amount of data can depend on the sampling rate, buffer size, and desired period of time for analyzing motion. For example, process 400 can read a fixed-length window of data corresponding to a fixed interval of real time, e.g., 0.5 seconds, 1 second, or the like.

At block 1306, process 1300 can determine an initial tilt, e.g., based on the measured x-component and/or y-component of acceleration or rotation angles for samples near the beginning of the buffer. During time periods when the user is holding the device in the line of sight, it is expected that tilt (or at least y-tilt) will remain approximately constant, and when process 1300 starts, a reference tilt can be defined. In some embodiments, automatically detecting a raise gesture can include detecting accrual of tilt (e.g., y-tilt), and the initial tilt or reference tilt can be defined based on the accrued tilt that was detected at block 1306.

At block 1308, process 1300 can detect a change in tilt, e.g., relative to the initial tilt or reference tilt. In some embodiments, the change can be ignored unless the change is in a direction that would move the display away from the user's line of sight. For instance, a user looking at device 300 of FIG. 3 may tend to hold his arm such that device 300 is parallel to the ground or tilted such that gravitational acceleration would impart a negative acceleration component along the y axis. A change from zero or negative $a_y$ to positive $a_y$ can suggest that the user has rotated device 300 out of the line of sight. In some embodiments, automatically detecting a raise gesture can include detecting accrual of tilt (e.g., as described above with reference to FIG. 4), and block 1308 can include detecting a negation of the accrued tilt (e.g., y-tilt), indicating that the user is returning the device to its unraised position.

If, at block 1310, a sufficiently large change in tilt has been detected, then at block 1312, process 1300 can notify wake control logic 230 that a loss-of-focus event has been detected. As described below, wake control logic 230 can take action in response to this notification, such as inactivating user interface 202 and/or notifying applications processor 204.

If, at block 1310 a large change in tilt is not detected, then at block 1314, process 1300 can estimate an arm position for the user based on the accelerometer data. For instance, it is possible that the user could lower the arm without rotating the wrist. Arm position can be estimated based on accelerometer data and assumptions about how the user is wearing the device, as described above. At block 1316, process 1300 can determine whether the user's arm has been lowered. For example, in the coordinate system of FIG. 3, a lowered arm can be detected based on gravitational acceleration aligning approximately with the x-axis. In some embodiments, block 1316 can include comparing starting and ending arm positions to detect a change indicative of the user moving the arm to a lowered position. If arm lowering is detected, then at block 1312, process 1300 can notify wake control logic 230 of a loss-of-focus event. Once a loss-of-focus event is detected, process 1300 can end.

It will be appreciated that process 1300 is illustrative and that variations and modifications are possible. Steps described as sequential may be executed in parallel, order of steps may be varied, and steps may be modified, combined, added or omitted. Different thresholds, criteria, and sensor inputs can be used; for instance, gyroscope data can be used in addition to or instead of accelerometer data. In some embodiments, the sensors to be used (e.g., accelerometer and/or gyroscope) can be selected dynamically based on the user's current activity as reported by activity classifier 232. For example, if the user is running, gyroscope data may be more reliable; if the user is sitting still, it may be more power-efficient to use accelerometer data and power down gyroscopic sensor 212. In addition, the criteria for detecting loss-of-focus can be varied based on the user's current activity. For instance, the criteria may be modified to make loss of focus less likely to be detected while the user is running, since the arm would be expected to be less steady.

Further, in some embodiments, it may be desirable to avoid a false loss-of-focus detection due to transitory motions. Accordingly, loss-of-focus detection can incorporate hysteresis, such that loss of focus is not detected until the device goes out of the focus pose and remains there for some minimum time period. If the device re-enters focus pose before the time expires, the loss-of-focus detection algorithm can reset. The minimum time period can depend on how long the device has been in the focus pose, with a longer dwell time in focus pose correlating with a longer required time out of focus to trigger a loss-of-focus event. It should be noted that delayed detection of a loss-of-focus event (and deactivating the display) is expected to be less disruptive to the user than prematurely detecting a loss-of-focus event (and deactivating the display) when the user is, in fact, still looking at the display. Accordingly, the loss-of-focus algorithm can be tuned to err on the side of being slow to detect loss of focus.

Figure 14:
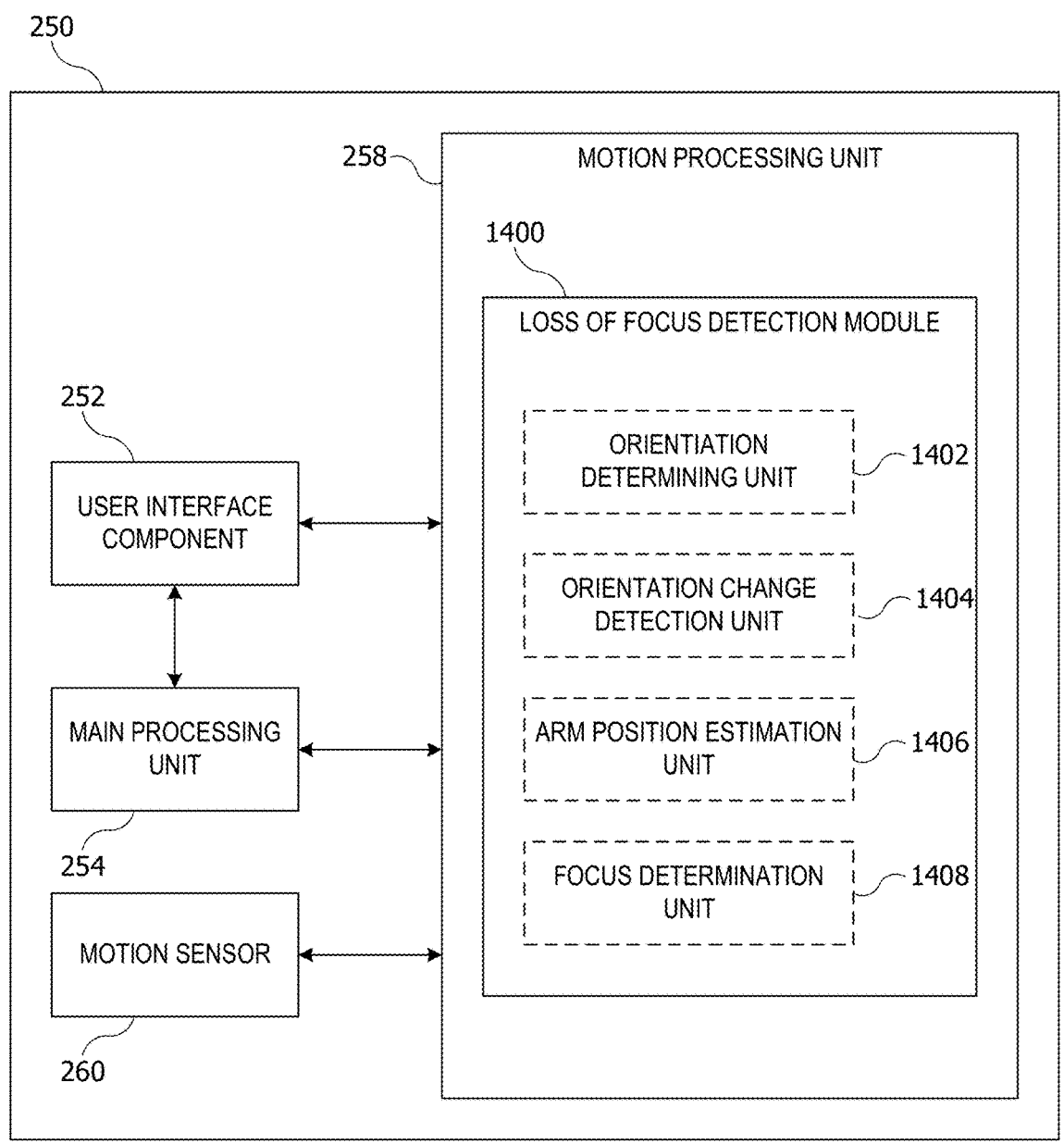
FIG. 14 is a functional block diagram of a loss-of-focus detection module according to an embodiment of the present invention

FIG. 14 is a functional block diagram of a loss-of-focus detection module 1400 according to an embodiment of the present invention. As shown, loss-of-focus detection module 1400 can be implemented in motion processing unit 258 of FIG. 2B, for instance, as loss-of-focus detection module 278. Loss-of-focus detection module 1400 can also be implemented as loss-of-focus detection module 228 of FIG. 2A. Loss-of-focus detection module 1400 can include an orientation determining unit 1402, an orientation change detection unit 1404, an arm position estimation unit 1406, and a focus determination unit 1408. Each unit can be implemented, for example, using program code executable on a processor and/or dedicated logic circuits.

Orientation determining unit 1402 can receive motion sensor data and determine from the data an orientation for the device. For instance, orientation determining unit 1402 can implement block 1306 of process 1300 described above, with the orientation being characterized by tilt (which can be determined from accelerometer data, gyroscope rotation angles, or the like). Orientation determining unit 1402 can provide the determined orientation to orientation change detection unit 1404.

Orientation change detection unit 1404 can determine, e.g., based on data received over time from orientation determining unit 1402, whether a change in orientation has occurred. For instance, orientation change detection unit 1404 can implement block 1308 of process 1300 described above. Orientation change detection unit 1404 can provide orientation change information (e.g., a quantitative measurement of the change) to focus determination unit 1408.

Arm position estimation unit 1406 can receive motion sensor data and determine from the data an estimated arm position of an arm on which the device is presumed to be worn. For instance, arm position estimation unit 1406 can implement block 1314 of process 1300 described above. Arm position estimation unit 1406 can provide information about the arm position (e.g., an estimated arm position or a change in arm position) to focus determination unit 1408.

Focus determination unit 1408 can receive orientation change information from orientation change detection unit 1404 and arm position information from arm position estimation unit 1406. Based on the received information, focus determination unit 1408 can determine whether loss of focus has occurred. For instance, focus determination unit 1408 can implement blocks 1310 and/or 1316 of process 1300 described above. When focus determination unit 1408 determines that loss of focus has occurred, focus determination unit 1408 can notify other system components (e.g., wake control logic 230 of FIG. 2A or wake control logic module 280 of FIG. 2B). For instance, focus determination unit 1408 can implement block 1312 of process 1300 described above.

It will be appreciated that loss of focus detection module 1400 is illustrative and that variations and modifications are possible. For instance, while loss of focus detection module 1400 is described with reference to particular blocks or units, it is to be understood that these blocks are defined for convenience of description and are not intended to imply a particular physical arrangement of component parts. Further, the blocks need not correspond to physically distinct components, and the same physical components can be used to implement aspects of multiple blocks. Blocks can be configured to perform various operations, e.g., by programming a processor or providing appropriate control circuitry, and various blocks might or might not be reconfigurable depending on how the initial configuration is obtained. Embodiments of the present invention can be realized in a variety of apparatus including electronic devices implemented using any combination of circuitry and software.

Used together, processes and modules such as those described above can allow a device to detect when the user starts looking at the device and stops looking at the device. The user interface can be activated or inactivated depending on whether the user is currently looking or not. In some embodiments, the same or similar processes can be used to wake applications processor 204 and/or other components of the device from a low-power (sleep) state, in preparation for user interaction. However, depending on implementation, waking applications processor 204 may have a longer latency than activating user interface 202, and having applications processor 204 awake for a given period of time may consume less power than having user interface 202 active. Accordingly, it may be desirable to start waking applications processor 204 (without also activating user interface 202) at an earlier stage rather than waiting for a raise gesture to be detected or confirmed as described above.

Figure 15:
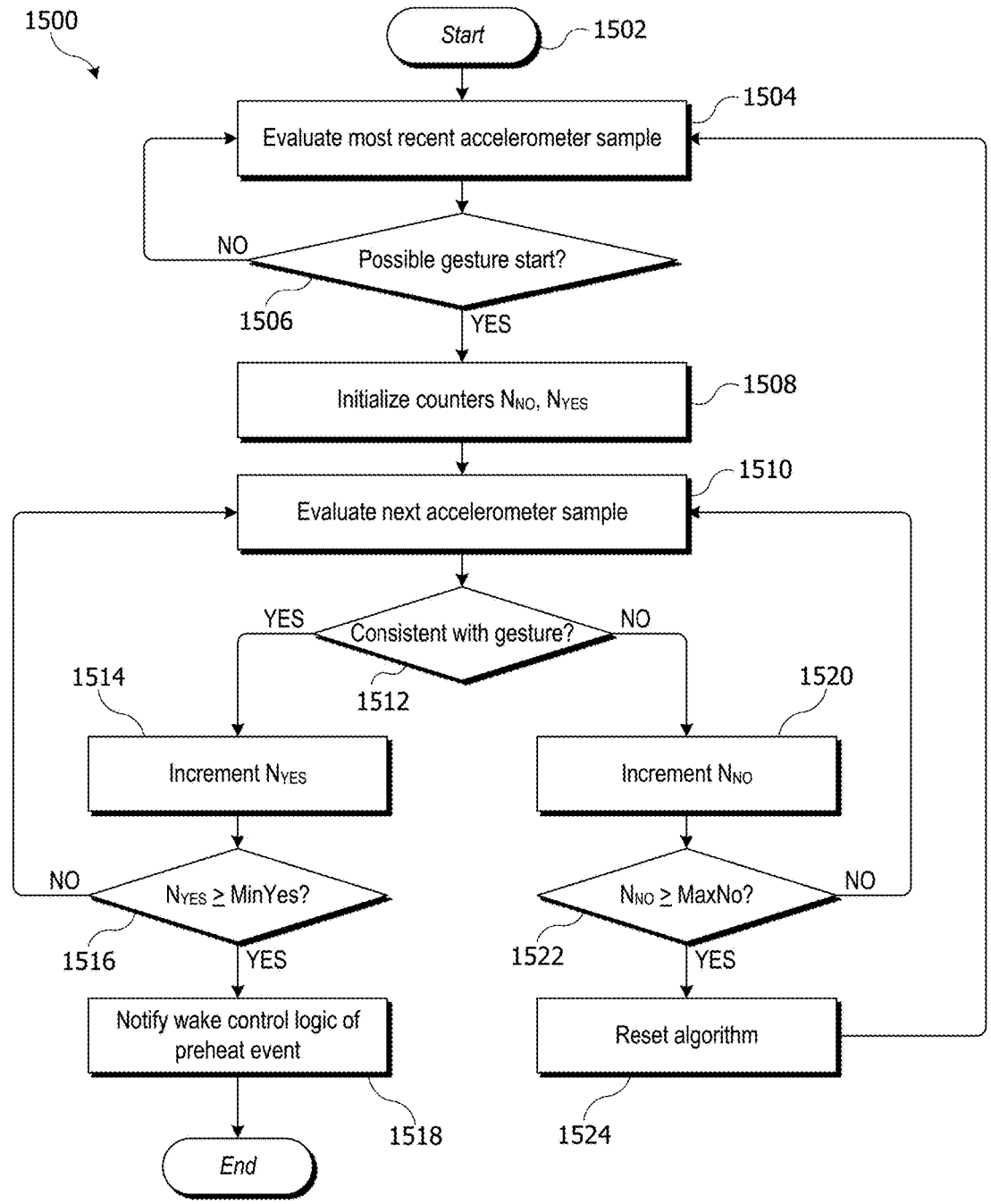
FIG. 15 is a flow diagram of a process for determining whether to wake applications processor according to an embodiment of the present invention.

FIG. 15 is a flow diagram of a process 1500 for determining whether to wake applications processor 204 according to an embodiment of the present invention. Process 1500 can be executed, e.g., in preheat detection module 220 of FIG. 2A. In this example, process 1500 can detect a sequence of accelerometer samples consistent with early stages of a natural (or deliberate) raise gesture and can notify wake control logic 230 when such a sequence is detected. Process 1500 can operate concurrently with but independently of other gesture detection algorithms (e.g., processes 400, 800, 1100 described above). For instance, process 1500 can be used to determine whether to wake applications processor 204 while a different algorithm (e.g., process 400 or process 800) is used to determine whether to activate user interface 202.

Process 1500 can start (block 1502) when applications processor 204 is in its sleep state. Accelerometer 210 can be providing updated data at a regular sampling rate (e.g., 100 Hz), and the data can indicate vector components of acceleration ($a_x$, $a_y$, $a_z$) using device-relative coordinates as shown in FIG. 3. Received data can be buffered, e.g., using a circular buffer or FIFO or the like.

At block 1504, process 1500 can evaluate a most recent accelerometer sample (or a short window of samples) to determine a current pose. At block 1506, process 1500 can determine whether the samples satisfy a condition indicative of a possible start of a raise gesture. In some embodiments, the determination can depend on a change in measured acceleration between consecutive samples. For instance, as the user rotates the wrist to bring the device into the line of sight, one can expect the $a_y$ component to decrease from a zero or positive (due to gravity) starting state. In addition, if the user's arm is initially down, the $a_x$ component may also change from positive (due to gravity) toward zero as the user raises his arm. Accordingly, the condition at block 1506 can depend on a weighted sum of change in $a_x$ and change in $a_y$ between consecutive samples, with the $a_y$ component being given greater weight. In some embodiments, the condition can depend on the starting pose (e.g., the relative weight of $a_x$ can be larger for an arm-down starting pose than for an arm-horizontal starting pose). Process 1500 can continue to monitor accelerometer data until a possible initiation of a raise gesture is detected at block 1506. For instance, blocks 1504 and 1506 can be performed for each new accelerometer data sample as it is received.

Once a possible initiation of a raise gesture is detected at block 1506, process 1500 can monitor subsequent samples to determine whether the raise gesture continues to progress. For instance, at block 1508, process 1500 can initialize two counters, referred to as $N_{NO}$ and $N_{YES}$. The counters can be initialized, e.g., to zero. At block 1510, process 1500 can evaluate the next accelerometer sample, and at block 1512, process 1500 can determine whether the sample is or is not consistent with a raise gesture in progress. The determination can be based on various criteria such as whether the change in device position (e.g., tilt and arm angle) is consistent with continuing a raise gesture, smoothness of the motion (on the assumption that a random motion will not be as smooth as a raise gesture), and so on. In some embodiments, the criteria can depend on the start pose. For instance, from an arm-down starting pose (e.g., as in FIG. 1A), a larger change in $a_x$ would be expected than if the forearm is initially horizontal (e.g., as in FIG. 1C). Accordingly, the decision can incorporate the current accelerometer sample as well as a device trajectory inferred from previous samples.

If, at block 1512, the next sample is consistent with the gesture, then at block 1514, counter $N_{YES}$ can be incremented. At block 1516, $N_{YES}$ can be compared to a threshold "MinYes" (e.g., ten samples, eleven samples, fourteen samples or the like) to determine whether enough samples consistent with a raise gesture have been detected. If $N_{YES}$ has reached the threshold MinYes, then at block 1518, process 1500 can notify wake logic 230 of a preheat event (also referred to herein as a "preheat gesture"). In response, wake logic 230 can, for example, wake applications processor 204. In this embodiment, a preheat event does not result in activating user interface 202, and the user need not know when or whether preheat events occur. If the threshold is not exceeded at block 1516, process 1500 can return to block 1510 to continue to accumulate and evaluate accelerometer data samples.

If, at block 1512, the next accelerometer data sample is not consistent with a raise gesture, then at block 1520, counter $N_{NO}$ can be incremented. At block 1522, $N_{NO}$ can be compared to a threshold "MaxNo" (e.g., two samples, four samples, five samples, or the like) to determine whether too many samples inconsistent with a raise gesture have been detected. If $N_{NO}$ reaches the threshold MaxNo, then at block 1524, process 1500 can reset, returning to block 1504 to look for a new possible beginning of a raise gesture.

In this manner, whether process 1500 detects a preheat event can depend on whether threshold MinYes is reached before threshold MaxNo is reached. For example, in one embodiment, threshold MinYes can be set to 11 and threshold MaxNo can be set to 5. If, after a possible initiation of a raise gesture is detected at block 1506, eleven samples consistent with the gesture are received before five samples inconsistent with the gesture are received, process 1500 will generate a preheat event. If eleven samples consistent with the gesture are not received before five samples inconsistent with the gesture are received, then process 1500 will not generate a preheat event and will instead return to block 1504 to, in effect, start over. If new samples are received at 100 Hz, then process 1500 can detect initiation of a raise gesture within 150 ms after its beginning.

It will be appreciated that process 1500 is illustrative and that variations and modifications are possible. Steps described as sequential may be executed in parallel, order of steps may be varied, and steps may be modified, combined, added or omitted. For instance, sampling rates and decision criteria can be varied. The sensitivity of the preheat detection can be tuned depending on how much time is required for the applications processor to transition from sleep state to wake state. The preheat event can be detected early enough that, by the time the user completes the raise gesture, the applications processor is in the wake state and ready to process user input. In some embodiments, early detection of preheat and waking of the applications processor can help to reduce or eliminate user-perceptible delay in the device's response to a natural raise gesture. Earlier detection may result in more false positives, and the sensitivity can be tuned such that a preheat event is detected as late in the gesture as possible while still allowing sufficient time for the applications processor to transition to the wake state.

In some embodiments, a specific algorithm to detect loss of preheat is not implemented. For example, applications processor 204 can automatically revert to the sleep state if no user input, raise-gesture detection or other activity indicating that the user is interacting with device 200 occurs within a certain time interval after waking. Alternatively, wake control logic 230 can notify applications processor 204 if a possible raise gesture is not received within a certain time interval after a preheat event, and applications processor 204 can use this information to determine whether to revert to sleep state. Some embodiments can provide a loss-of-preheat algorithm, e.g., detecting whether received samples continue to be consistent with a raise gesture and indicating loss of preheat if they do not continue to be consistent with a raise gesture or if the preheat event is not followed by a detected raise gesture within a specified time period.

Figure 16:
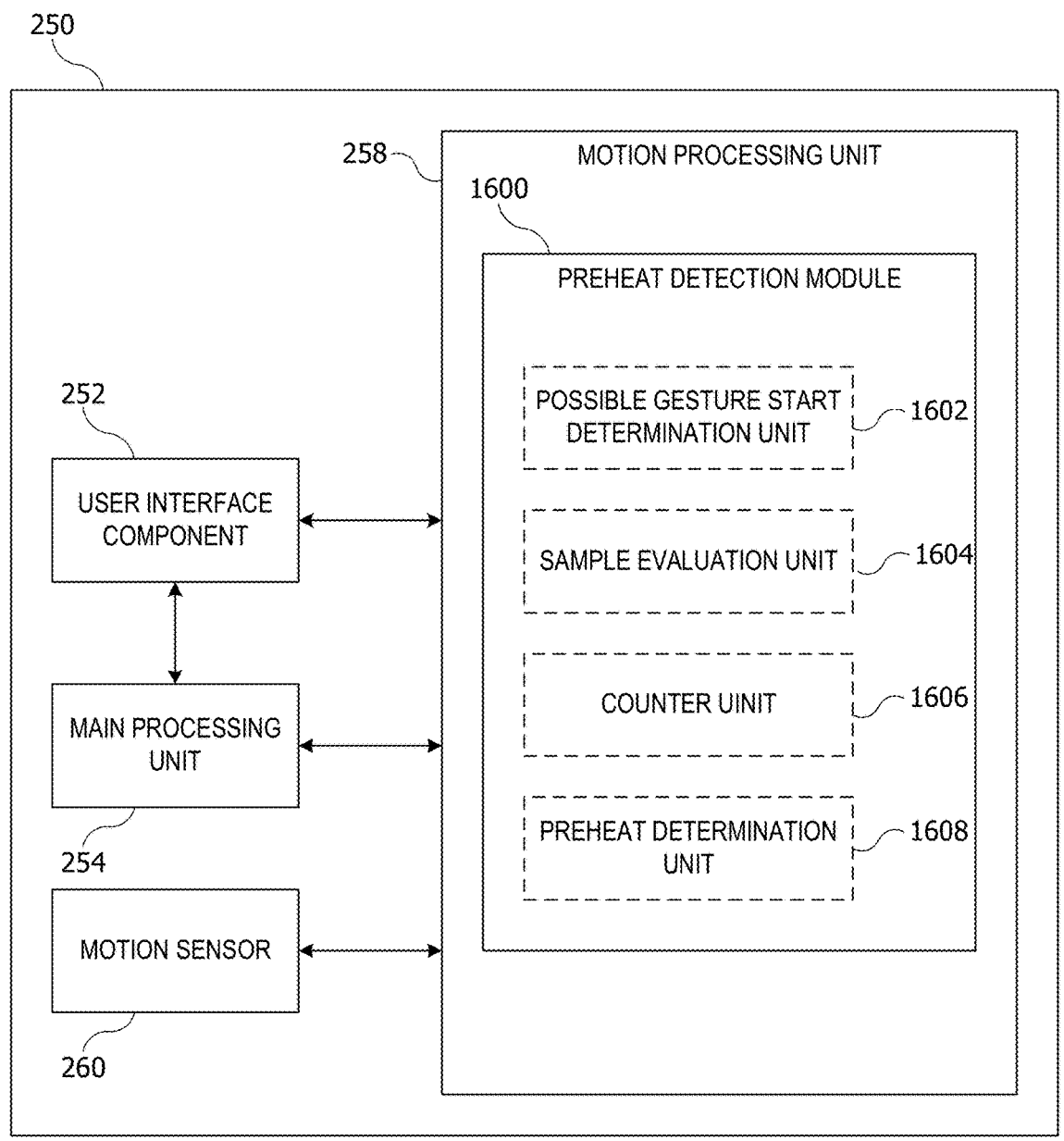
FIG. 16 is a functional block diagram of a preheat detection module according to an embodiment of the present invention.

FIG. 16 is a functional block diagram of a preheat detection module 1600 according to an embodiment of the present invention. As shown, preheat detection module 1600 can be implemented in motion processing unit 258 of FIG.

2B, for instance, as preheat detection module 270. Preheat detection module 1600 can also be implemented as preheat detection module 220 of FIG. 2A. Preheat detection module 1600 can include a possible gesture start determination unit 1602, a sample evaluation unit 1604, a counter unit 1606, and a preheat determination unit 1608. Each unit can be implemented, for example, using program code executable on a processor and/or dedicated logic circuits.

Possible gesture start determination unit 1602 can receive motion sensor data samples and determine from the data samples whether a possible gesture start has occurred. For instance, possible gesture start determination unit 1602 can implement block 1504 of process 1500 described above. When a possible gesture start is determined to have occurred, possible gesture start determination unit can notify sample evaluation unit 1604 and counter unit 1606.

Sample evaluation unit 1604 can receive motion sensor data samples and evaluate each sample as it is received to determine whether it is consistent or inconsistent with a continuation of a possible raise gesture. For instance, sample evaluation unit 1604 can implement blocks 1510 and 1512 of process 1500 described above. Sample evaluation unit 1604 can provide, to counter unit 1606, a decision output indicating whether the sample is consistent or inconsistent with a continuation of a possible raise gesture.

Counter unit 1606 can maintain a first counter to count samples that are determined by sample evaluation unit 1604 to be consistent with a continuation of a possible raise gesture and a second counter to count samples that are determined by sample evaluation unit 1604 to be inconsistent with a continuation of a possible raise gesture. These counters can correspond to the $N_{YES}$ and $N_{NO}$ counters described above. Counter unit 1606 can initialize the two counters (e.g., to zero) in response to being notified of a possible gesture start by possible gesture start determination unit 1602. For instance, counter unit 1606 can implement block 1508 of process 1500 described above. After initializing the two counters, counter unit 1606 can increment one of the two counters in response to each decision output received from sample evaluation unit 1604, with the first counter being incremented if the decision output indicates that the sample is consistent with a continuation of a possible raise gesture and the second counter being incremented if the decision output indicates that the sample is inconsistent with a continuation of a possible raise gesture. For instance, counter unit 1606 can implement blocks 1540 and 1520 of process 1500 described above. Counter unit 1606 can provide the first and second counter values to preheat determination unit 1608.

Preheat determination unit 1608 can receive the first and second counter values from counter unit 1606 and can determine whether either a preheat event or a reset event has occurred. For instance, preheat determination unit 1608 can implement blocks 1516 and 1522 of process 1500 described above. If a preheat event has occurred (e.g., if the first counter has exceeded the value MinYes as described above), preheat determination unit 1608 can notify other system components (e.g., wake control logic 230 of FIG. 2A or wake control logic module 280 of FIG. 2B). For instance, preheat determination unit 1608 can implement block 1518 of process 1500 described above. If a reset event has occurred (e.g., if the second counter has exceeded the value MaxNo as described above), preheat determination unit 1608 can notify possible gesture start determination unit 1602, and possible gesture start determination unit 1602 can begin again to determine whether a possible gesture start has occurred. In addition, preheat determination unit 1608 can also notify sample evaluation unit 1604 and/or counter unit 1606 of a preheat or reset event, and the notified units can respond accordingly; for instance, sample evaluation unit 1604 can stop evaluating samples after either a preheat or reset event, until such time as a next possible gesture start occurs. It should be understood that not every sample evaluated by sample evaluation unit 1604 needs to result in either a preheat or reset event, as it may take several samples for one or the other counter to reach the relevant threshold.

It will be appreciated that preheat detection module 1600 is illustrative and that variations and modifications are possible. For instance, while preheat detection module 1600 is described with reference to particular blocks or units, it is to be understood that these blocks are defined for convenience of description and are not intended to imply a particular physical arrangement of component parts. Further, the blocks need not correspond to physically distinct components, and the same physical components can be used to implement aspects of multiple blocks. Blocks can be configured to perform various operations, e.g., by programming a processor or providing appropriate control circuitry, and various blocks might or might not be reconfigurable depending on how the initial configuration is obtained. Embodiments of the present invention can be realized in a variety of apparatus including electronic devices implemented using any combination of circuitry and software.

Figure 17:
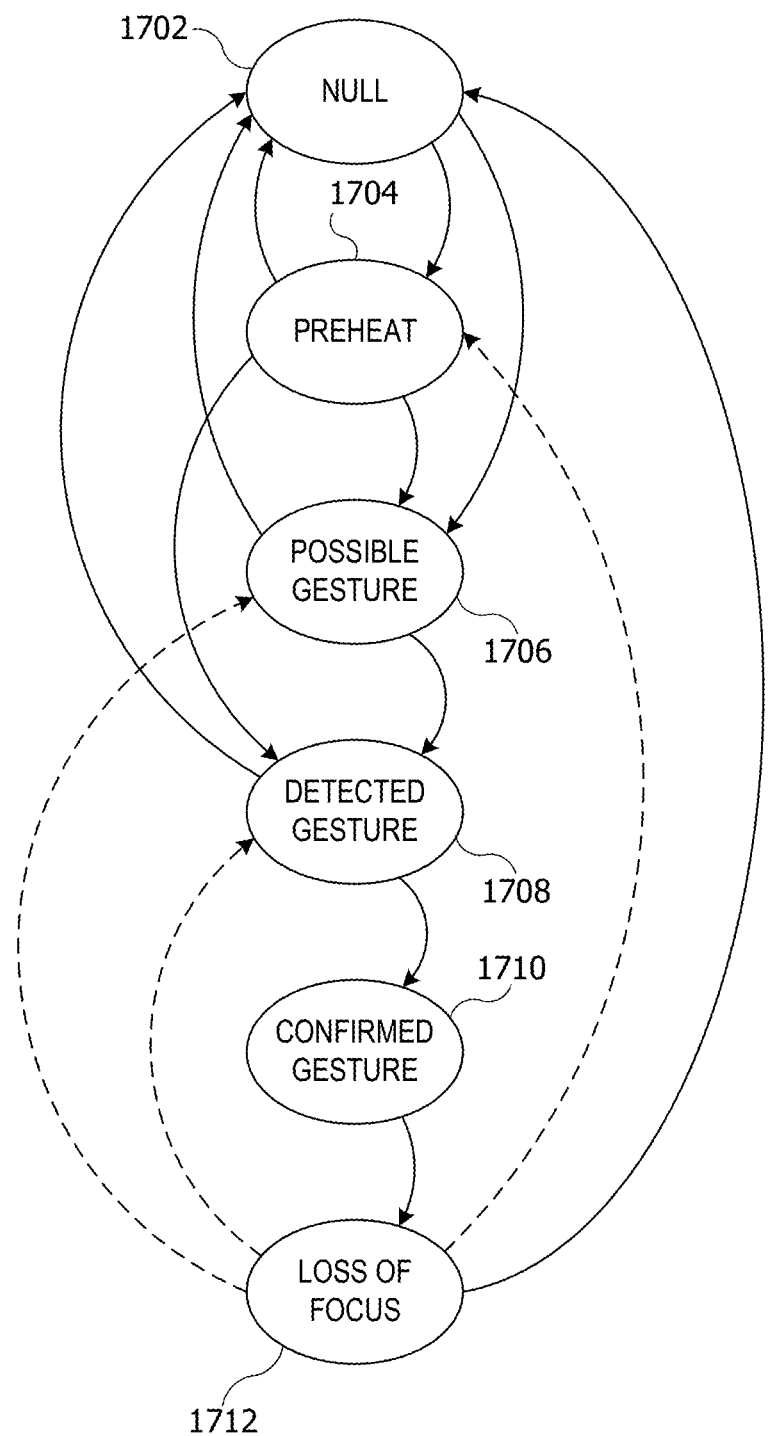
FIG. 17 is a state diagram showing states of wake control logic according to an embodiment of the present invention.

Using the various gesture detection modules and/or processes described above, wake control logic 230 of FIG. 2A (or wake control logic module 280 of FIG. 2B) can implement state machine behavior as shown in FIG. 17, which is a state diagram showing states of wake control logic 230 according to an embodiment of the present invention. Transitions between states can occur in response to notifications from preheat detection module 220 (e.g., executing process 1500), low-dynamic main detection module 222 (e.g., process 400), high-dynamic main detection module 224 (e.g., process 800), jiggle detection module 226 (e.g., process 1100), and loss-of-focus detection module 228 (e.g., process 1300).

State 1702 can be a "null" state, in which device 200 is idle, with applications processor 204 in the sleep state and user interface 202 in an inactive state. In some embodiments, state 1702 can be entered based on inactivity, loss of focus, and/or other criteria.

State 1704 can be a "preheat" state that can be entered in response to a preheat event reported by preheat detection module 220 (e.g., at block 1518 of FIG. 15). Upon entering preheat state 1704, wake control logic 230 can signal applications processor 204 to start waking from its sleep state. In some embodiments, waking of applications processor 204 has no user-discernible effects (other than perhaps an increase in power consumption); the user need not be alerted to whether applications processor 204 is awake or asleep.

State 1706 can be a "possible gesture" state that can be entered in response to notification of a possible raise gesture (e.g., at block 412 of FIG. 4 or block 812 of FIG. 8). State 1706 can be entered from preheat state 1704 or directly from null state 1702. Upon entering possible gesture state 1706, wake control logic 230 can wake applications processor 204 (if this was not already done in preheat state 1704) and can also activate user interface 202.

State 1708 can be a "detected gesture" state that can be entered in response to notification of a detected raise gesture (e.g., at block 418 of FIG. 4, block 818 of FIG. 8, or block 1124 of FIG. 11). State 1708 can be entered from possible gesture state 1706 or directly from null state 1702 or from preheat state 1704. For instance, in the embodiment described above, process 1100 for detecting a deliberate raise gesture only notifies wake control logic 230 of a detected raise gesture, which can occur either from null state 1702 or preheat state 1704. In this case, the possible gesture state 1706 might be skipped. In other embodiments, process 1100 can notify wake control logic 230 of a possible wake gesture (e.g., upon detecting a first or second peak), and a direct transition from null state 1702 or preheat state 1704 to detected gesture state 1708 might not occur. Upon entering detected gesture state 1708, wake control logic 230 can wake applications processor 204 and/or activate user interface 202 if either or both has not previously occurred.

State 1710 can be a "confirmed gesture" state that can be entered in response to notification of a confirmed raise gesture (e.g., at block 424 of FIG. 4). In some embodiments, wake control logic 230 need not do anything in response to a transition to confirmed raise gesture state 1710. However, wake control logic 230 can, if desired, take various actions, such as sending a notification of the confirmation to applications processor 204, and various applications or other processes executing on applications processor 204 can, if desired, behave differently in response to a confirmed raise gesture as opposed to a detected (but not confirmed) raise gesture.

State 1712 can be a "loss of focus" state that can be entered in response to notification of a loss-of-focus event (e.g., at block 1312 of FIG. 13). Upon entering loss-of-focus state 1712, wake control logic 230 can inactivate user interface 202 and can notify applications processor 204 of the loss of focus. In some embodiments, applications processor 204 might not immediately enter its sleep state in response to a loss of focus. For instance, applications processor 204 might continue to execute a process that started while device 200 was in a focus state (e.g., any of states 1706, 1708, 1710) until that process completes, then enter the sleep state.

From loss-of-focus state 1712, wake control logic 230 can transition back to null state 1702 if applications processor 204 subsequently returns to sleep state. In some embodiments, another focus-related event (e.g., preheat, possible raise gesture, detected raise gesture) might occur before applications processor 204 returns to its sleep state, in which case wake control logic 230 can return to the appropriate one of states 1704, 1706, 1708 without first retuning to null state, as indicated by the dashed arrows.

It is to be understood that the states shown in FIG. 17 are illustrative and that other embodiments can define more, fewer, or different states.

In some embodiments, wake control logic 230 can selectively enable or disable various gesture-detection algorithms or modules, including any or all of preheat detection module 220 (e.g., implementing process 1500), low-dynamic main detection module 222 (e.g., implementing process 400), high-dynamic main detection module 224 (e.g., implementing process 800), jiggle detection module 226 (e.g., implementing process 1100), and loss-of-focus detection module 228 (e.g., implementing process 1300), depending on the current state of wake control logic 230.

Figure 18:
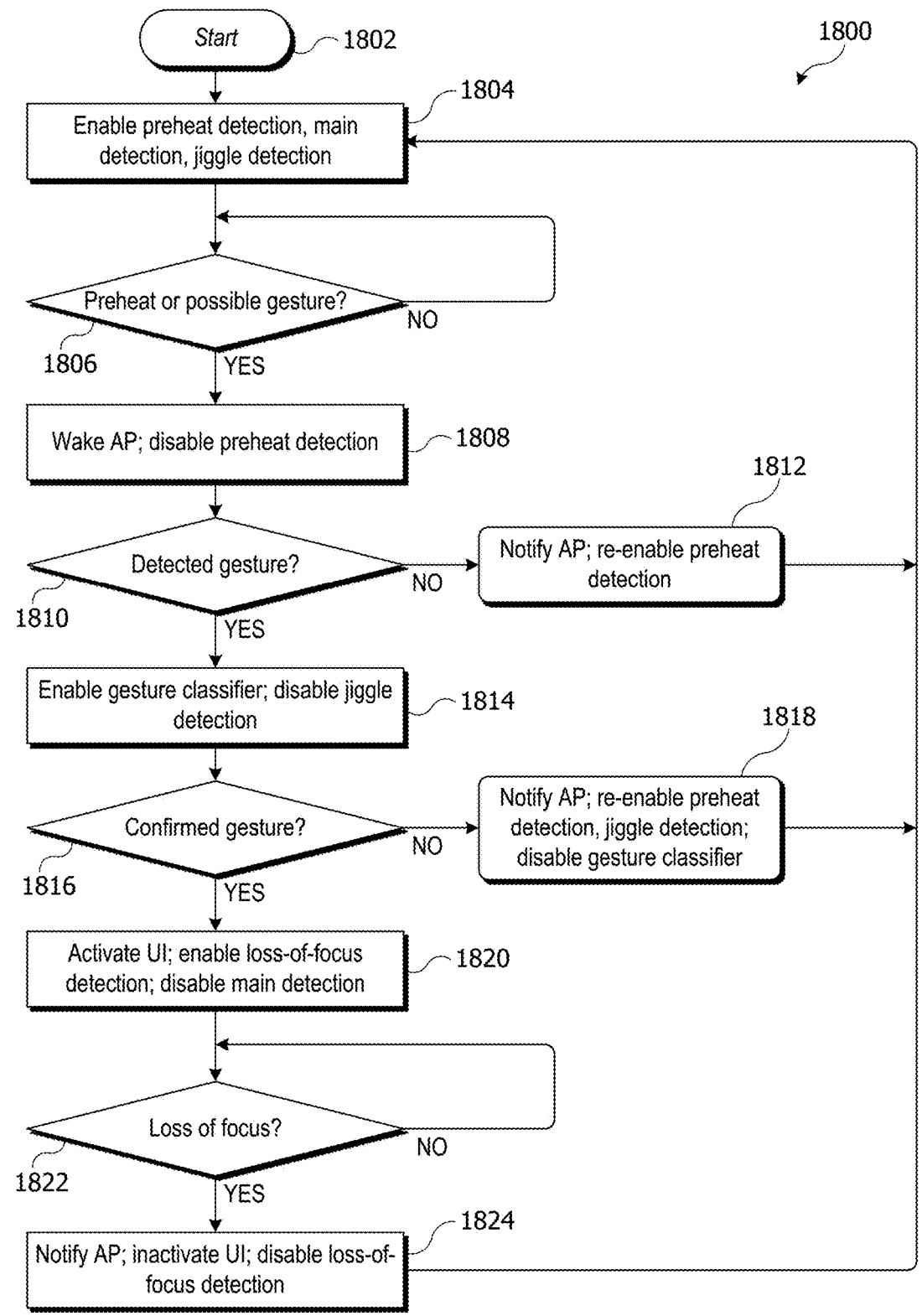
FIG. 18 is a flow diagram of a process that can be implemented in wake control logic according to an embodiment of the present invention.

FIG. 18 is a flow diagram of a process 1800 that can be implemented in wake control logic 230 according to an embodiment of the present invention. Process 1800 can start (block 1802) in the null state of FIG. 17. For purposes of description, it is assumed that at this stage, applications processor 204 is in its sleep state and user interface 202 is inactive.

At block 1804, wake control logic 230 can enable one or more gesture-detection algorithms or modules to detect a raise gesture. For example, wake control logic 230 can enable preheat detection module 220, jiggle detection module 226, and one or the other of low-dynamic main detection module 222 or high-dynamic main detection module 224. In some embodiments, high-dynamic main detection module 224 is enabled only when the user is engaged in high-dynamic activity, which can be determined as described above, and low-dynamic main detection module 222 is enabled when the user is not engaged in high-dynamic activity. If the user's activity changes, wake control logic 230 can change which algorithm is enabled.

At block 1806, process 1800 can wait until one of the gesture-detection algorithms or modules provides a notification of an event. For example, preheat detection module 220 can notify wake control logic 230 of a preheat event, or low-dynamic main detection module 222 or high-dynamic main detection module 224 can notify wake control logic 230 of a possible raise gesture. If such a notification is received, then at block 1808, process 1800 can wake applications processor 204 (assuming it is not already awake) and disable preheat detection module 220. Other raise-gesture detection algorithms or modules can continue to run. Depending on implementation, applications processor 204 might or might not activate user interface 202. For instance, in some embodiments, applications processor 204 activates user interface 202 in response to a possible raise gesture event but not in response to a preheat event.

At block 1810, wake control logic 230 can determine whether a notification of a detected raise gesture has been received. Such a notification can be received, e.g., from jiggle detection module 226 or either of low-dynamic motion detection module 222 or high-dynamic motion detection module 224. In some embodiments, if a notification of a detected raise gesture is not received within a timeout period after a preheat or possible raise gesture event, wake control logic 230 can infer that the preheat or possible raise gesture was a false positive. Accordingly, at block 1812, wake control logic 230 can notify applications processor 204 of the false positive, re-enable preheat detection module 220, and return to block 1804. In some embodiments, if a threshold number of false-positive preheat events occur within a short period of time, preheat detection module 220 can enter a "back-off" state, in which it can stop sending preheat notifications (or wake control logic 230 can ignore preheat notifications) until the frequency of false positives drops below a threshold. This can help reduce unnecessary power consumption by the applications processor.

If, at block 1810, a notification of a detected raise gesture is received, then at block 1814, process 1800 can enable gesture classifier 234 to confirm the detected raise gesture and can disable jiggle detection module 226. In some instances, a notification of a detected raise gesture can precede a notification of preheat or possible raise gesture (e.g., where jiggle detection module 226 generates the notification of the detected raise gesture). Although not specifically shown in FIG. 18, it should be understood that if this occurs, process 1800 can perform operations of block 1808 together with those of block 1814.

At block 1816, process 1800 can determine whether the detected raise gesture was confirmed. In some instances, confirmation at block 1816 can be assumed (e.g., if the detected-raise-gesture notification at block 1810 was received from jiggle detection module 226), and use of gesture classifier 234 or the like to confirm a raise gesture is not required. In other instances, confirmation can be required in at least some circumstances (e.g., if the detectedraise-gesture notification at block 1810 was received from low-dynamic main detection module 222). If confirmation is not received (and not assumed), or if disconfirmation is received, then at block 1818, wake control logic 230 can notify applications processor 204 of the unconfirmed or disconfirmed raise gesture, re-enable preheat detection module 220 and jiggle detection module 226, and disable gesture classifier 234. Process 1800 can return to block 1804 to continue to wait for a confirmed raise gesture.

If, at block 1816, the gesture is confirmed, then at block 1820, process 1800 can instruct applications processor 204 to activate user interface 202 (if it is not already active), enable loss-of-focus detection module 228, and disable low-dynamic main detection module 222 or high-dynamic main detection module 224. If jiggle detection module 226 or preheat module 220 are still enabled, these modules can also be disabled at block 1820.

Process 1800 can wait at block 1822 until a notification of a loss-of-focus gesture is received, e.g., from loss-of-focus detection module 228. During this time, device 200 can be considered to be in focus. Applications processor 204 can remain in its wake state, and user interface 202 can remain active.

Once focus is lost, at block 1824, process 1800 can notify applications processor 204, inactivate user interface 202, and disable loss-of-focus detection module 228. Process 1800 can return to block 1804 to re-enable various raise-gesture detection modules (e.g., jiggle detection module 226 and one or the other of low-dynamic main detection module 222 and high-dynamic main detection module 224). If applications processor 204 returns to the sleep state, process 1800 can re-enable preheat detection module 220.

It will be appreciated that process 1800 is illustrative and that variations and modifications are possible. Steps described as sequential may be executed in parallel, order of steps may be varied, and steps may be modified, combined, added or omitted. Activation of user interface 202 can be controlled by wake control logic 230 or by a process in applications processor 204, as desired. Preheat detection module 220 can run continuously while applications processor 204 is in its sleep state and can be disabled whenever applications processor 204 is in its wake state. In some embodiments, loss of focus does not cause applications processor 204 to immediately return to sleep state. For example, any processing tasks that are in progress on applications processor 204 can continue to execute, and applications processor 204 can return to sleep state when such tasks are completed (assuming no further raise gesture or preheat event has occurred). Applications processor 204 can notify wake control logic 230 each time it transitions between wake and sleep states, and wake control logic 230 can also be notified of state changes in user interface 202 (e.g., between inactive and active states). Wake control logic 230 can enable or disable gesture detection modules or algorithms based on notifications from applications processor 204, in addition to the notifications received from the gesture detection modules or algorithms.

In the example shown in FIG. 18, the user interface is not activated until a raise gesture has been detected and confirmed. In some embodiments, it may be desirable to activate the user interface at an earlier stage (e.g., when a possible raise gesture or detected raise gesture is reported); this can result in more false positives but fewer false negatives and may provide a more responsive and satisfying user experience. In addition, activation of the user interface can occur in stages. For instance, the interface might be partially enabled (e.g., display on but dimmed, touch overlay disabled or enabled at reduced resolution) when a notification of a possible raise gesture is received, then fully enabled when a notification of a detected raise gesture is received.

While the invention has been described with respect to specific embodiments, one skilled in the art will recognize that numerous modifications are possible. For instance, although various algorithms or modules are described above as being executed in a coprocessor on the device, those skilled in the art will recognize that a main processor (e.g., applications processor) can also execute any or all of the gesture detection algorithms or modules described above. As one example, in the embodiments described above, the gesture classifier can be invoked selectively, at times when the applications processor is in its wake state, and the gesture classifier can be executed on the applications processor rather than the coprocessor. Other algorithms can also be executed entirely or partially on the applications processor, provided that the applications processor is in a wake state. In other embodiments, the applications processor can have multiple power states. For example, the sleep state can include a state in which one section of the processor can execute gesture detection algorithms such as those described above while other sections of the processor are inactive to conserve power. (For instance, in a multi-core applications processor, one core might be active while the others are inactive.)

Adaptive control can be provided for the parameters used to detect possible or actual raise gestures, to confirm detected raise gestures, and/or to detect preheat events or loss-of-focus events. Adaptive control can allow the parameters to be tuned for more lenient or more strict detection criteria. More lenient criteria can provide faster response and earlier triggering, while more strict criteria can provide fewer false positives (and therefore additional power saving). Parameters that can be tuned include the required amount of accrued y-tilt, the focus pose range of the device, and criteria on the device trajectory during execution of the raise gesture. In some embodiments, the tunable parameters can be modified via a configuration data block, and new configuration data can be downloaded to the device from time to time. A user interface can also be provided to adjust the tunable parameters (e.g., on a sliding scale from lenient to strict).

As another example, a raise gesture algorithm described above may require that the device remain in a focus pose for a minimum dwell time before detecting a gesture. In some embodiments, dwell time can be traded off against accuracy of the focus pose. For instance, if the device remains close to but not in the range defined for focus pose (e.g., satisfying three of four criteria) and accrues enough dwell time in its position, this can be detected as a raise gesture. For example, a significant rotation followed by holding an ending pose may be recognized even if the y-tilt is positive rather than zero or negative, assuming the ending pose is held long enough. Where dwell time is used in this manner to "offset" failure to fully meet all focus-pose criteria, more strict focus-pose criteria can be specified.

Processes described herein can be used to determine when to activate a user interface for a device. Once activated, the user interface can be presented in any state desired. For instance, the user interface can be presented in a default "home" state, in the last state it was in prior to becoming inactive, in a state presenting a most recent notification or information about notifications received since the user interface was last active, or in any other state.

In some embodiments, a user interface or component thereof can be activated in stages. For instance, when a possible raise gesture is detected (e.g., as described above), the user interface can be transitioned to partial activation. Such partial activation may include activating a display but only dimly lighting it (where "dimly lighting" can include any light level lower than the normal operating brightness of the display, which may depend, e.g., on ambient light, user preferences, or the like), or activating a display but not a touch-sensitive overlay, activating a display but not a voice input circuit, etc. When the possible raise gesture becomes a detected raise gesture, the user interface can be transitioned to full activation, e.g., display on at standard brightness, touch-sensitive overlay active, voice input circuit activated, etc. As another example, different components of a user interface can be activated at different stages of raise gesture detection. For example, when a possible raise gesture is detected (e.g., as described above), one or more user interface component (e.g., a microphone or a display) can be activated while other user interface components (e.g., a touch-sensitive overlay on the display, a speaker, a voice recognition coprocessor, or the like) remain inactive. When the possible raise gesture becomes a detected raise gesture, one or more other user interface components (e.g., touch-sensitive overlay) can be activated. Further, one or more other user interface components (e.g., voice recognition coprocessor) can remain inactive until the detected raise gesture becomes a confirmed raise gesture. Other activation sequences can also be implemented, with different user interface components transitioning to the active state in response to different gesture state transitions.

In some embodiments, wake control logic 230 can provide information to applications processor 204 indicating how long device 200 has been in a focus state (e.g., the time elapsed since the most recent detected or confirmed raise gesture event). Additionally or instead, applications processor 204 can infer the duration of a focus state based on time elapsed since wake control logic 230 indicated a transition to focus state (e.g., by notifying applications processor 204 of a detected or confirmed raise gesture) and/or other information available to applications processor 204. The duration of the focus state can be used to affect the user experience. For example, suppose that device 200 comes into focus displaying a notification (e.g., "New text message from Fred"). Depending on how long the user looks at the notification, applications processor 204 can choose to display additional information about the notification (e.g., content of the text message) without the user having to operate a control. As another example, applications processor 204 can infer that the notification has been read if the user looks for longer than a prescribed period of time and can automatically hide or dismiss the notification without the user having to operate a control. Other actions based on how long the user continues to hold the focus pose can be implemented, such as scrolling or paging through a list of notifications or other items, or through content of a message.

Detecting a loss-of-focus gesture can have various consequences. For example, a user interface can be inactivated as described above. Additionally, any notification that was being displayed at the time of loss of focus can be dismissed, or the read/unread state of a notification can be maintained.

Further, as described above, applications processor 204 can be notified by wake control logic 230 of gesture-state transitions or gesture events (e.g., possible raise gesture, detected raise gesture, confirmed raise gesture, loss of focus). In some embodiments, applications processor 204 can also notify its clients (e.g., any applications and/or operating system processes that may be executing on the applications processor) of these transitions, and the clients can take responsive action as desired.

It should be understood that some embodiments of the invention can use fewer than all of the gesture detection modules described herein. For instance, some embodiments might include only a preheat detection module. Some embodiments might include only a single natural raise gesture detection module (which can be, e.g., either a low-dynamic or high-dynamic detection module as described above), or multiple natural raise gesture detection modules with no other modules. Some embodiments might include only a deliberate raise gesture detection module (e.g., a jiggle detection module as described above). Some embodiments might include only a loss-of-focus detection module. Some embodiments might include preheat and one or more natural raise gesture detection modules. Some embodiments might include preheat and deliberate raise gesture detection modules. Some embodiments might include preheat and loss-of-focus detection modules. Some embodiments might include a preheat detection module, one or more natural raise gesture detection modules, and a deliberate raise gesture detection module. Some embodiments might include one or more natural raise gesture detection modules and a deliberate raise gesture detection module. Some embodiments might include one or more natural raise gesture detection modules, a deliberate raise gesture detection module, and a loss-of-focus detection module. Some embodiments might include a deliberate raise gesture detection module and a loss-of-focus detection module. In addition, some embodiments might include additional gesture detection modules not specifically described above.

It should also be understood that a device that implements automated detection of a raise gesture and/or loss of focus gesture as described above might also provide a user-operable manual control (e.g., a physical button, touch sensor, or the like) that can be used to activate and/or inactivate the user interface. Where such a control is provided, wake control logic 230 can receive notifications of changes in the state of the user interface resulting from user operation of the manual control and can adjust its own state accordingly (e.g., enabling or disabling various algorithms descried above). Thus, while the automated processes described herein can facilitate user interaction, the device (and the user) need not rely on them exclusively.

Various algorithms and parameters (e.g., weights, thresholds, other criteria) described herein can be tuned heuristically, e.g., using machine learning and/or other techniques as described above. It is contemplated that a training phase of the machine learning can be performed during device development (e.g., prior to widespread distribution), and the results of the training can be incorporated into device firmware. Thus, it is not necessary for users to perform device training. In some embodiments, the device may be able to collect feedback during ordinary operation, e.g., recording relevant intervals of motion-sensor data in instances where the user executes the deliberate raise gesture or operates a manual control, which may indicate that a natural raise gesture detection algorithm produced a false negative. The device may be able to execute training algorithms in the background to refine its own algorithms and parameters based on such recorded data. In some embodiments, a device manufacturer can aggregate such data across a large set of devices and use the information to update the gesture-detection algorithms and/or parameters. (To protect user privacy, the aggregation can be done anonymously and can be limited to the motion-sensor data and an indication that the data may correspond to a false negative.)

The present disclosure uses terms such as "approximately" and "substantially" to qualify certain measurements, such as stability in focus pose. Those skilled in the art will appreciate that most users cannot hold their arms perfectly still and that these terms are used to indicate that allowances may be made for the effects of natural user instability as well as the inherent accuracy of the various motion sensors. Other terms such as horizontal, vertical, and parallel may be similarly qualified, to indicate that physical perfection is unnecessary. Further, terms such as "in the line of sight" as used herein generally refer to assumptions about the orientation of the user's head relative to the device, and such assumptions might not always match the ground truth of whether the user's eyes are or are not directed toward the device.

Further, while the description makes specific references to wearable devices and wrist-wearable devices, embodiments of the invention are not limited to wearable or wrist-wearable devices. For instance, the algorithms and modules described above can be implemented in other portable devices, such as mobile phones, tablets, or the like, that a user might pick up and hold during interaction with the device. Algorithms and/or modules as described above, when implemented in a handheld device, can detect changes in the orientation of the device consistent with being picked up and held in a user's line of sight (or conversely changes consistent with being put down or put away), and detection of such changes can be used to trigger changes in device state (e.g., activating a display or other user interface component, waking a processor from a sleep state, etc.).

Embodiments of the present invention can be realized using any combination of dedicated components and/or programmable processors and/or other programmable devices. The various processes described herein can be implemented on the same processor or different processors in any combination. Where components are described as being configured to perform certain operations, such configuration can be accomplished, e.g., by designing electronic circuits to perform the operation, by programming programmable electronic circuits (such as microprocessors) to perform the operation, or any combination thereof. Further, while the embodiments described above may make reference to specific hardware and software components, those skilled in the art will appreciate that different combinations of hardware and/or software components may also be used and that particular operations described as being implemented in hardware might also be implemented in software or vice versa.

Computer programs incorporating various features of the present invention may be encoded and stored on various computer readable storage media; suitable media include magnetic disk or tape, optical storage media such as compact disk (CD) or DVD (digital versatile disk), flash memory, and other non-transitory media. (It is understood that "storage" of data is distinct from propagation of data using transitory media such as carrier waves.) Computer readable media encoded with the program code may be packaged with a compatible electronic device, or the program code may be provided separately from electronic devices (e.g., via Internet download or as a separately packaged computer readable storage medium).

Certain embodiments relate to methods for detecting a raise gesture in a device, such as a wrist-wearable device or other wearable device, which can have a user interface component having an active state and an inactive state, a motion sensor to detect motion of the device, and at least a first processor. For example, the first processor can determine, based on a set of motion sensor data samples corresponding to a time interval, a starting pose corresponding to a beginning of the time interval. The first processor can determine, based at least in part on the starting pose, a set of criteria for identifying a possible raise gesture using the set of motion sensor data samples. The first processor can further determine a possible raise gesture based at least in part on whether the set of motion sensor data samples satisfies the selected set of criteria. The first processor can further determine a detected raise gesture in the event that the possible raise gesture is followed by at least a minimum period of dwell time in a focus pose. The first processor can notify another component of the device when a possible raise gesture is identified and when a detected raise gesture is identified.

In some embodiments, the other component can include a user interface component. The user interface component can be activated in response to being notified of the possible raise gesture or in response to being notified of the detected raise gesture. In some embodiments, the user interface component can transition from an inactive state to a partially active state in response to being notified of the possible raise gesture and from the partially active state to an active state in response to being notified of the detected raise gesture.

In some embodiments, the other component can include an applications processor. The applications processor can, for example, transition from a sleep state to a wake state in response to being notified of the possible raise gesture and can activate a user interface component of the device in response to being notified of the possible raise gesture or in response to being notified of the detected raise gesture.

A starting pose can be determined in various ways. In some embodiments, determining the starting pose can include comparing one or more oldest motion sensor data samples in the set of motion sensor data samples to each of a plurality of canonical starting poses and selecting one (or more) of the canonical starting poses based on the comparison. In some embodiments, if more than one canonical starting pose is selected, the starting pose can be defined as a blend of the selected canonical starting poses. In some embodiments, determining the starting pose can include identifying a current user activity using an activity classifier and determining the starting pose based at least in part on the current user activity.

The set of criteria for identifying a possible raise gesture can be determined in various ways. For example, determining the set of criteria for identifying a possible raise gesture can include accessing a lookup table using the determined starting pose and extracting the set of criteria from the lookup table. Where the starting pose is defined as a blend of two or more selected canonical staring poses, determining the set of criteria for identifying a possible raise gesture can include accessing a lookup table using each of the selected canonical starting poses, extracting a set of criteria corresponding to each of the selected canonical starting poses from the lookup table, and blending the extracted sets of criteria.

In some embodiments, the set of criteria for identifying a possible raise gesture can depend on the available motion sensor data. For instance, if the motion sensor data includes accelerometer data, the selected set of criteria for identifying a possible raise gesture can include any or all of: a criterion based on an accrued tilt determined from the accelerometer data during the time interval; a criterion based on an amount of lifting of the device, the amount of lifting determined from the accelerometer data during the time interval; and/or a criterion based on smoothness of the motion during the time interval. As another example, if the motion sensor data includes gyroscope data from a gyroscopic sensor, the selected set of criteria for identifying a possible raise gesture can include a criterion based on an accrued rotation about an axis substantially parallel to a user's forearm, the accrued rotation being determined from the gyroscope data during the time interval. In some embodiments where the motion sensor data includes both gyroscope data from a gyroscopic sensor and accelerometer data from an accelerometer, the gyroscope data can be used to identify the possible raise gesture while the accelerometer data is used to identify the detected raise gesture.

The possible raise gesture can be determined in various ways. For example, determining the possible raise gesture can include determining, based on the set of motion sensor data samples, an ending pose corresponding to an end of the time interval and determining whether the ending pose corresponds to the focus pose. In some embodiments, determining the possible raise can include determining whether a motion from the starting pose to an ending pose corresponding to an end of the time interval slows or stops by the end of the time interval.

The focus pose can be defined in various ways. In some embodiments, the focus pose is defined based at least in part on the starting pose. In some embodiments, the focus pose can be defined as corresponding to a range of orientations of the device, and the minimum period of dwell time in the focus pose can be determined based at least in part on a location of a current orientation of the device relative to the range of orientations corresponding to the focus pose. In some embodiments where the focus pose is defined as corresponding to a range of orientations of the device, an ending pose of the possible raise gesture can be identified and a dwell time in the ending pose determined; the range of orientations corresponding to the focus pose can be dynamically adjusted based at least in part on the dwell time in the ending pose, for example, such that the range increases with an increase in the dwell time.

In some embodiments, the criteria for determining a possible raise gesture can be selectable within a range from lenient to strict. Likewise, a definition of the focus pose (e.g., a range of orientations of the device corresponding to the focus pose) can be adjustable within a range from lenient to strict. The user may be able to select or adjust the leniency or strictness.

In some embodiments, subsequently to determining the detected raise gesture, a gesture classifier can be used to confirm the detected raise gesture. For example, a confidence score can be assigned to the detected raise gesture, and features of interest can be input into the gesture classifier. In embodiments where the motion sensor data includes accelerometer data, features of interest can include, for example, any or all of: accelerometer data samples corresponding to a time window of interest; a smoothness parameter based on a standard deviation of changes between consecutive accelerometer data samples; an accrued tilt relative to an axis parallel to a user's forearm (e.g., for a wrist-wearable device); a starting orientation of the device at a beginning of a time window of interest (e.g., a time during which the detected raise gesture occurred); and/or an ending orientation of the device at an ending of a time window of interest. In embodiments where the motion sensor data includes gyroscope data samples from a gyroscopic sensor, features of interest can include, for example, any or all of: individual gyroscope data samples corresponding to a time window of interest; a smoothness parameter based on a standard deviation of changes between consecutive gyroscope data samples; an accrued rotation relative to an axis parallel to a user's forearm; a starting orientation of the device at a beginning of the time window of interest; and/or an ending orientation of the device at an ending of the time window of interest.

The gesture classifier, which can include, e.g., a Bayesian classifier implementing a linear discriminant analysis, can compute, from the features of interest, a probability that the detected raise gesture is a true raise gesture, the probability computed from the features of interest. Based on the confidence score and the probability, a determination can be made as to whether to confirm the raise gesture. For example, a threshold value for the probability can be selected, with the selection based at least in part on the confidence score, and the determination can be made based on whether the probability exceeds the threshold value. In some embodiments, determining whether to confirm the detected raise gesture can include determining whether to wait for additional motion sensor data prior to either confirming or disconfirming the raise gesture. In some embodiments, the gesture classifier can be previously trained to distinguish a natural raise gesture from at least one other similar gesture.

In some embodiments, a user interface component of the device can be activated in response to confirmation by the gesture classifier, or a user interface component of the device can be inactivated in the event that the gesture classifier disconfirms an identified detected raise gesture.

In addition to detecting a raise gesture, in some embodiments, the device can also detect preheat events. For example, the first processor (or another processor) can execute a preheat detection algorithm to detect initiation of the raise gesture, where the preheat detection algorithm executes concurrently with performing the determining, selecting, and identifying acts associated with detecting a natural raise gesture. The processor can notify the other component (e.g., an applications processor) of a preheat event in the event that initiation of the raise gesture is detected. A preheat algorithm can include, for example, analyzing a set of one or more recent motion sensor data samples to detect a possible initiation of a raise gesture; and in the event that a possible initiation of a raise gesture is not detected, repeating the analyzing for a subsequent motion sensor data sample; and in the event that a possible initiation of a raise gesture is detected, evaluating each of a sequence of subsequent motion sensor data samples as either consistent or inconsistent with a raise gesture; the other component can be notified of the preheat event in the event that a first threshold number of motion sensor data samples consistent with a raise gesture is reached before a second threshold number of motion sensor data samples inconsistent with a raise gesture is reached. The other component (e.g., an applications processor) can transition from a sleep state to a wake state in response to the preheat event. In some embodiments, in the event that the notification of the preheat event is not followed by a notification of a detected raise gesture within a timeout period, the other component can transition from the wake state back to the sleep state. In some embodiments, initiation of the raise gesture can be detected at a time sufficiently early to allow the applications processor to complete the transition to the wake state by the time the detected raise gesture is identified. In some embodiments, the notification of the preheat event does not affect an inactive user interface component of the device.

Such methods can be implemented in various devices. For example, the device can have user interface components such as any or all of a display (which can be a touch screen display or other display), a microphone, a speaker, and/or a button. The device can have various motion sensors, such as an accelerometer and/or a gyroscopic sensor. Detection of a raise gesture as described herein can be performed in a primary applications processor or in a coprocessor as desired.

Some devices can include a user interface component having an active state and an inactive state, a motion sensor operable to generate motion sensor data indicative of motion of the device, and a motion processing unit coupled to the user interface component and the motion sensor. The motion processing unit can include a natural detection module that incorporates: a starting pose estimation unit to receive motion sensor data and to estimate a starting pose based on the motion sensor data; a possible raise gesture determining unit to receive motion sensor data, to determine whether the received data satisfy criteria for a possible raise gesture, and to generate a notification of a possible raise gesture in the event that the criteria are satisfied; and a detected raise gesture determining unit to receive the notification of the possible raise gesture from the possible raise gesture determining unit, to monitor additional accelerometer data to determine whether a condition is met for a detected raise gesture, and to generate a notification of a detected raise gesture in the event that the condition is met. In some embodiments, the motion processing unit can also include a criteria determining unit to determine criteria for detecting a possible raise gesture based at least in part on the starting pose estimated by the starting pose estimation unit and to provide the criteria to the possible raise gesture determining unit. In some embodiments, the motion processing unit can also include a confirmation unit to perform gesture confirmation based on motion sensor data associated with a detected raise gesture and to generate a notification of a confirmed or disconfirmed raise gesture. In some embodiments, the natural detection module can be configured to identify a gesture state from a set of gesture states that includes a null state, a possible raise gesture state, and a detected raise gesture state. For example, in some embodiments, the possible raise gesture state can be identified based at least in part on a starting pose determined from the motion senor data and a set of criteria for a change from the starting pose to an ending pose, the set of criteria being selected based at least in part on the starting pose. In some embodiments, the detected raise gesture state can be identified based at least in part on a dwell time in a focus pose.

Certain embodiments relate to methods for detecting a deliberate raise gesture in a device, such as a wrist-wearable device, which can have a user interface component having an active state and an inactive state, a motion sensor (e.g., an accelerometer and/or a gyroscopic sensor) to detect motion of the device, and at least a first processor. For example, the first processor can collect a set of motion sensor data samples from a motion sensor of the device, the set of motion sensor data samples corresponding to a time interval. The first processor can detect a first impulse peak and a second impulse peak in the motion sensor data samples, the first and second impulse peaks each indicating movement in a direction corresponding to a rotation of a wrist of a user wearing the device (e.g., on the assumption that the device is being worn on the user's wrist), the first and second impulse peaks being separated in time by a period less than a timeout period. The first processor can detect a raise gesture (e.g., a deliberate raise gesture) based at least in part on detecting the first and second impulse peaks and can notify another component of the device in the event that a raise gesture is detected. In some embodiments, the first processor can further determine that, following the second impulse peak, the device is held in an approximately stable position for at least a minimum dwell time, with the raise gesture being detected based in part on detecting the first and second impulse peaks and in part on determining that the device is held in the approximately stable position. In some embodiments, the first processor can also determine, based on the motion sensor data samples, whether the device is in a primed position at a beginning of the time interval. The primed position can be determined, e.g., based at least in part on determining whether the device is held still for a minimum period of time and/or on determining an orientation of the device and comparing the orientation to an assumed orientation assumed to position the device in a line of sight of a user operating the device. In some embodiments, determining whether the device is in a primed position can be based at least in part on information about a current activity of a user operating the device.

Impulse peaks can be detected in various ways. For instance, in embodiments where the motion sensor includes an accelerometer, detecting the first and second impulse peaks can be based at least in part on a jerk determined from accelerometer data samples.

Detection of a raise gesture based on impulse peaks can be used, e.g., to transition an applications processor from a sleep state to a wake state in response to being notified of the raise gesture and/or to transition a user interface component from an inactive state to an active state in response to being notified of the raise gesture.

Such methods can be implemented in various devices. For example, the device can have user interface components such as any or all of a display (which can be a touch screen display or other display), a microphone, a speaker, and/or a button. The device can have various motion sensors, such as an accelerometer and/or a gyroscopic sensor. Detection of a deliberate raise gesture as described herein can be performed in a primary applications processor or in a coprocessor as desired.

Some devices can include a user interface component having an active state and an inactive state, a motion sensor operable to generate motion sensor data indicative of motion of the device, and a motion processing unit coupled to the user interface component and the motion sensor. The motion processing unit can include a deliberate detection module that incorporates: a priming detection unit to receive motion sensor data and to determine from the motion sensor data whether the user's arm is primed to execute a deliberate raise gesture; an impulse peak detection unit to receive additional motion sensor data and detect the presence of a target number of impulse peaks based on the additional motion sensor data; and a stability detection unit to receive further motion sensor data and determine whether the further motion sensor data indicates that the device position has stabilized following detection of the target number of impulse peaks by the impulse peak detection unit.

Certain embodiments relate to methods for detecting a preheat event corresponding to an initiation of a raise gesture in a device, such as a wrist-wearable device or other wearable device, which can have a user interface component having an active state and an inactive state, a motion sensor to detect motion of the device, and at least a first processor. For example, a motion sensor (e.g., an accelerometer) of the device can be operated to collect data samples at a sampling rate. A first processor in the device can detect a possible initiation of a raise gesture based at least in part on a most recent data sample. In the event that a possible initiation of a raise gesture is not detected, the first processor can repeat the analyzing for a subsequent data sample. In the event that a possible initiation of a raise gesture is detected, the first processor can evaluate each of a sequence of subsequent data samples as either consistent or inconsistent with a raise gesture. The first processor can notify another component of the device of a preheat event in the event that a first threshold number of subsequent data samples consistent with a raise gesture is reached before a second threshold number of subsequent data samples inconsistent with a raise gesture is reached. In some embodiments, in the event that the second threshold number of subsequent data samples inconsistent with a raise gesture is reached before the first threshold number of subsequent data samples consistent with the raise gesture is reached, the detection process can return to an initial state in which a possible initiation of a raise gesture has not been detected and repeat the detecting of a possible initiation of a raise gesture.

In some embodiments, the other component can include an applications processor. The applications processor can, for example, transition from a sleep state to a wake state in response to the notification of the preheat event. This can occur without affecting a state of a user interface component of the device. In some embodiments, the applications processor can transition from the wake state to the sleep state in the event that the notification of the preheat event is not followed by a notification of a raise gesture within a timeout period.

Possible initiation of a raise gesture can be detected in various ways. For example, two most recent data samples can be compared to detect a change in position or orientation of the device, and it can be determined whether the detected change is in a direction consistent with initiation of a raise gesture. In some embodiments, detecting a possible initiation of a raise gesture can be based at least in part on a starting pose determined from the data samples.

In some embodiments where the device is a wrist wearable device with an accelerometer, detecting a possible initiation of a raise gesture can include: determining a change in a first component of an acceleration vector, the first component being in a direction approximately parallel to a forearm of a user wearing the device; determining a change in a second component of the acceleration vector, the second component being in a direction orthogonal to the first direction and in a plane of a display of the device; and detecting the possible initiation of the raise gesture based on a combination of the changes in the first component and the second component.

Evaluating subsequent data samples can be performed in various ways. For example, the evaluation can be based at least in part on any or all of: evaluation of whether a change in one or both of a position or an orientation of the device, as determined from the data samples, is consistent with continuing a raise gesture; a measurement of a smoothness of the motion based on the data samples; a starting pose at a time when the possible initiation of the raise gesture was detected; and/or a trajectory of the device inferred from the data samples.

In some embodiments, subsequently to notifying the other component of the preheat event, the first processor can continue to evaluate each of a sequence of subsequent data samples as either consistent or inconsistent with a raise gesture and can notify the other component of a loss of preheat event in the event that the subsequent data samples become inconsistent with a raise gesture.

Such methods can be implemented in various devices. For example, the device can have user interface components such as any or all of a display (which can be a touch screen display or other display), a microphone, a speaker, and/or a button. The device can have various motion sensors, such as an accelerometer and/or a gyroscopic sensor. Detection of a preheat event as described herein can be performed in a primary applications processor or in a coprocessor as desired.

Some devices can include a user interface component having an active state and an inactive state, a motion sensor operable to generate motion sensor data indicative of motion of the device, and a motion processing unit coupled to the user interface component and the motion sensor. The motion processing unit can include a preheat detection module that incorporates: a possible gesture start determination unit to receive motion sensor data samples and to determine, based on the motion sensor data, whether a possible gesture start has occurred; a sample evaluation unit to receive motion sensor data samples and to evaluate each motion sensor data sample to determine whether it is consistent or inconsistent with a continuation of a possible raise gesture; a counter unit to maintain a first counter to count samples that are determined by the sample evaluation unit to be consistent with a continuation of a possible raise gesture and a second counter to count samples that are determined by the sample evaluation unit to be inconsistent with a continuation of a possible raise gesture; and a preheat determination unit to receive the first and second counter values from the counter unit and to determine whether a preheat event has occurred.

Certain embodiments relate to methods for detecting a loss-of-focus event in a device, such as a wrist-wearable device or other wearable device, which can have a user interface component having an active state and an inactive state, a motion sensor (e.g., an accelerometer and/or a gyroscopic sensor) to detect motion of the device, and at least a first processor. For example, the first processor can establish the device is in a focus state, where the focus state includes a user interface component of the device being in an active state. The first processor can receive a sequence of motion sensor data samples (e.g., accelerometer data samples and/or gyroscope data samples) from a motion sensor of the device. The first processor can detect a change in an orientation (e.g., change in a tilt angle) of the device based on the motion sensor data samples. The first processor can identify a loss-of-focus gesture based at least in part on the change in the orientation. The first processor can notify another component of the device when the loss-of-focus gesture is detected.

In some embodiments where the motion sensor data samples include accelerometer data samples from an accelerometer and gyroscope data samples from a gyroscopic sensor, the first processor can select whether to use accelerometer data samples or gyroscope data samples, the selection being based at least in part on a current activity of the user.

Change in orientation can be detected in various ways. For example, detecting the change in the orientation can include determining a reference tilt angle while the device is in the focus state and determining a net change in the tilt angle relative to the reference tilt angle, where the change in the orientation includes the net change in the tilt angle. The reference tilt angle can be determined, e.g., based at least in part on an orientation of the device determined based on motion sensor data samples representing a beginning of a time window. In addition or instead, the reference tilt angle is determined based at least in part on an accrued tilt associated with a previously detected raise gesture. In the latter case, the loss-of-focus gesture can be identified in the event that the change in the tilt angle corresponds to a loss of more than a threshold amount of the accrued tilt.

Other techniques for identifying loss of focus can be implemented. For example, the loss-of-focus gesture can be identified in the event that the change in the orientation exceeds a threshold and/or in the event that the change in the orientation continuously exceeds a threshold for at least a minimum amount of time. In some embodiments, a duration of the focus state can be determined, and the minimum amount of time can be based at least in part on the duration of the focus state; for instance, the minimum amount of time can increase as the duration of the focus state increases. In some embodiments, identifying the loss-of-focus gesture can be based in part on the change in the orientation and in part on a current activity of a user, which can be determined, e.g., using an activity classifier.

Such methods can be implemented in various devices. For example, the device can have user interface components such as any or all of a display (which can be a touch screen display or other display), a microphone, a speaker, and/or a button. The device can have various motion sensors, such as an accelerometer and/or a gyroscopic sensor. Detection of a loss-of-focus gesture as described herein can be performed in a primary applications processor or in a coprocessor as desired.

Some devices can include a user interface component having an active state and an inactive state, a motion sensor operable to generate motion sensor data indicative of motion of the device, and a motion processing unit coupled to the user interface component and the motion sensor. The motion processing unit can include a loss-of-focus detection module that incorporates: an orientation determining unit to receive motion sensor data and to determine an orientation for the device based on the motion sensor data; an orientation change detection unit to determine, based at least in part on the orientation determined by the orientation determining unit, whether a change in orientation has occurred; an arm position estimation unit to receive motion sensor data and to determine from the data an estimated arm position of an arm on which the device is presumed to be worn; and a focus determination unit to receive orientation change information from the orientation change detection unit, to receive the estimated arm position from the arm position estimation unit, and to determine, based at least in part on the received orientation change information and estimated arm position, whether loss of focus has occurred.

Certain embodiments relate to methods for detecting various raise gestures (including any combination of natural raise gestures, deliberate raise gestures, preheat events, and/or loss-of-focus gestures, e.g., as described above) in a device, such as a wrist-wearable device or other wearable device, which can have a user interface component having an active state and an inactive state, a motion sensor to detect motion of the device, and one or more processors. Motion sensor data can be received from a motion sensor of the device. The motion sensor data can be processed using a set of gesture detection modules (including, e.g., any one or more of the natural raise gesture detection modules, deliberate raise gesture detection modules, and/or preheat detection modules described above) to detect one or both of a raise gesture indicative of a user moving the device into a presumed line of sight or a preheat event indicative of initiation of the raise gesture. An applications processor of the device can be notified in the event that a preheat event is detected, and the applications processor can transition from a sleep state to a wake state in response to the notification of the preheat event. A user interface component of the device can be notified in the event that the raise gesture is detected, and the user interface component can transition from an inactive state to an active state in response to the notification of the raise gesture. In some embodiments, the applications processor transitions from the sleep state to the wake state in response to the notification of the raise gesture in the event that the raise gesture is detected prior to detecting the preheat event. In some embodiments, subsequently to detecting the raise gesture, the set of detection modules can be disabled and a loss-of-focus detection module (e.g., as described above) can be enabled.

Certain embodiments relate to methods that can be executed in a device, such as a wrist-wearable device or other wearable device, which can have a user interface component having an active state and an inactive state, a motion sensor to detect motion of the device, and one or more processors. A null state can be established in which an applications processor of the device is in a sleep state and a user interface component of the device is in an inactive state. A coprocessor of the device can execute a set of gesture detection algorithms including one or more raise gesture detection algorithms to detect a raise gesture (e.g., natural or deliberate raise gestures as described above) and a preheat detection algorithm to detect an initiation of the raise gesture (e.g., as described above). The preheat detection algorithm can generate a preheat event in the event that the initiation of the raise gesture is detected. At least one of the raise gesture detection algorithms can generate a raise gesture event in the event that the raise gesture is detected. The applications processor can be transitioned from the sleep state to a wake state in response to the preheat event. The user interface component can be transitioned from the inactive state to an active state in response to the raise gesture event. In some embodiments, in the event that the raise gesture detection algorithm generates the raise gesture event before the preheat detection algorithm generates the preheat event, the applications processor can be transitioned from the sleep state to a wake state in response to the raise gesture event. In some embodiments, the preheat detection algorithm can be disabled when the applications processor is in the wake state and can be reenabled in the event that the applications processor transitions from the wake state to the sleep state. In some embodiments, all of the raise gesture detection algorithms can be disabled when the user interface component is in the active state, and at least one of the raise gesture detection algorithm can be reenabled in the event that the user interface component transitions from the active state to the inactive state.

In some embodiments, the raise gesture detection algorithms can include one or more natural raise gesture detection algorithms, such as a first natural raise gesture detection algorithm to detect a raise gesture in a low-dynamic environment and/or a second natural raise gesture detection algorithm to detect a raise gesture in a high-dynamic environment. In some embodiment where both the first and second natural raise gesture detection algorithms are included, one of the first or second natural raise gesture detection algorithms can be selected to be executed at a given time, the selection being based at least in part on a current user activity, which can be determined, e.g., using an activity classifier and/or a data quality analysis of accelerometer data. In some embodiments, a deliberate raise gesture detection algorithm can be used in combination with either or both of the first and second natural raise gesture detection algorithms.

In some embodiments, a first one of the one or more raise gesture detection algorithms can generate multiple different raise gesture events including a possible raise gesture event and a detected raise gesture event. Where this is the case, transitioning the user interface component to the active state can occur in response to the detected raise gesture event. In some embodiments, the user interface component can be transitioned to a partially active state in response to the possible raise gesture event and transitioned to a fully active state in response to the detected raise gesture event. In some embodiments, the applications processor can transition from the sleep state to the wake state in the event that a possible raise gesture event is detected before a preheat event is detected.

In some embodiments, a first one of the one or more raise gesture detection algorithms can generate multiple different raise gesture events including a possible raise gesture event, a detected raise gesture event, and a confirmed raise gesture event. Where this is the case, transitioning the user interface component to the active state can occur in response to the confirmed raise gesture event.

In some embodiments, in response to the raise gesture event, a loss-of-focus detection algorithm can be executed to detect a loss-of-focus event (e.g., as described above). In response to detecting the loss-of-focus event, the user interface component can be transitioned from the active state to the inactive state.

In some embodiments, after detecting the raise gesture event, a dwell time of the device in a focus pose can be determined and a presentation of information at the user interface component can be modified based at least in part on the dwell time. For example, a presented information item can be changed from a first information item to a second information item; additional information about an initially presented information item can be presented; or an initially presented information item can cease to be presented.

Such methods can be implemented in various devices, including wrist-wearable devices and other wearable devices. For example, the device can have a user interface component having an active state and an inactive state; an applications processor coupled to the user interface component, the applications processor having a sleep state and a wake state; a coprocessor coupled to the applications processor; and a motion sensor (e.g., accelerometer and/or gyroscopic sensor) to detect motion of the device, the being motion sensor coupled to the coprocessor. The coprocessor can be configured to process motion sensor data received from the motion sensor using various processing algorithms (some or all of which can be concurrently operable) to detect gesture related events including preheat events and raise gestures (including any or all of the algorithms described above) and to notify the applications processor of the preheat events and raise gestures. The applications processor can be configured to transition from the sleep state to the wake state in response to a notification of a preheat event and to instruct the user interface component to transition from the inactive state to the active state in response to a notification of a raise gesture. In some embodiments, the applications processor can be further configured to transition from the sleep state to the wake state in the event that a notification of a raise gesture is received while the applications processor is in the sleep state.

Various combinations of processing algorithms can be used, depending in part on available motion sensors. For instance, in some embodiments where the motion sensor includes an accelerometer and a gyroscopic sensor, the processing algorithms can include a low-dynamic detection algorithm to detect a natural raise gesture based on data from the accelerometer and a high-dynamic detection algorithm to detect a natural raise gesture based at least in part on data from the gyroscopic sensor. In some embodiments, the coprocessor can be configured to determine a current activity of the user as either a low-dynamic activity or a high-dynamic activity and to disable one of the low-dynamic detection algorithm or the high-dynamic detection algorithm based on the current activity of the user. Determining the current activity of the user can be based at least in part on an activity classifier and/or a data quality analysis performed on accelerometer data samples.

In some embodiments, the processing algorithms can include a loss-of-focus algorithm to detect a loss-of-focus event corresponding to a user moving a device out of a focus pose, and the coprocessor can be further configured to notify the applications processor when the loss-of-focus event is detected. In some embodiments, the applications processor can be further configured to transition the user interface to the inactive state in response to the notification of the loss-of-focus event. In some embodiments, the coprocessor can be configured to enable the loss-of-focus algorithm and disable all of the gesture detection algorithms in response to detecting the raise gesture and to enable at least two of the gesture detection algorithms and disable the loss-of-focus algorithm in response to detecting the loss-of-focus event.

The user interface component can include, for example, a display that can be powered off when the user interface component is in the inactive state and powered on when the user interface component is in the active state. As another example, the user interface component can include a touch screen display that can be powered off when the user interface component is in the inactive state and powered on when the user interface component is in the active state.

In some embodiments, at least one of the processing algorithms can be capable of detecting a possible raise gesture, and the coprocessor can be further configured to notify the applications processor of a possible raise gesture. The applications processor can be configured to instruct the user interface component to transition from the inactive state to a partially active state in response to a notification of a raise gesture. For example, the user interface component can include a display that can be powered off when the user interface component is in the inactive state, powered on in a dimmed state when the user interface component is in the partially active state, and powered on in a normal brightness state when the user interface component is in the active state.

In some embodiments, the device can include a user input control operable to manually activate the user interface component. The coprocessor can be configured to receive a notification in the event that the user input control is operated to manually activate the user interface component. (As described above, this can be used for tuning, training, or other experience-based modifications to the gesture detection algorithms.)

Any combination of processing algorithms can be used, including any or all of: an algorithm to detect a natural raise gesture; an algorithm to detect a natural raise gesture in a low-dynamic environment; an algorithm to detect a natural raise gesture in a high-dynamic environment; an algorithm to detect a preheat event; an algorithm to detect a deliberate raise gesture (e.g., a jiggle gesture as described above); and/or an algorithm to detect a loss-of-focus gesture.

Certain embodiments of the present invention relate to devices that can include a user interface component having an active state and an inactive state, a motion sensor (e.g., an accelerometer and/or a gyroscopic sensor) operable to generate motion sensor data indicative of motion of the device, one or more gesture detection modules, each of the gesture detection modules being operable to determine a gesture state of the device based at least in part on the motion sensor data, and wake control logic coupled to the one or more gesture detection modules. The wake control logic can be configured to receive gesture state information from the one or more gesture detection modules and to send notifications to the user interface component based on the received gesture state information. In some embodiments, the wake control logic can also be configured to selectively enable or disable different ones of the gesture detection modules based at least in part on the received gesture state information.

In some embodiments, the device can also include an applications processor coupled to the user interface component, the applications processor having a sleep state and a wake state.

The wake control logic can be configured to send notifications to the applications processor based on the received gesture state information. In some embodiments, the wake control logic can be configured to send the notifications to the user interface component via the applications processor. In some embodiments, the applications processor can be configured to transition from a sleep state to a wake state in response to a first notification from the wake control logic, the first notification indicating detection of a preheat event by one of the gesture detection modules. The applications processor can be further configured to transition from a sleep state to a wake state in response to a second notification from the wake control logic, the second notification indicating detection of a raise gesture by one of the gesture detection modules.

In some embodiments, the user interface component can be configured to transition from a sleep state to a wake state in response to a second notification from the wake control logic, the second notification indicating detection of a raise gesture by one of the gesture detection modules.

The gesture detection modules can include any or all of the gesture detection modules described above. For example, the gesture detection modules can include a preheat detection module operable to detect a preheat event corresponding to a beginning of a raise gesture. The preheat detection module can include: a possible gesture start determination unit to receive motion sensor data samples and to determine, based on the motion sensor data, whether a possible gesture start has occurred; a sample evaluation unit to receive motion sensor data samples and to evaluate each motion sensor data sample to determine whether it is consistent or inconsistent with a continuation of a possible raise gesture; a counter unit to maintain a first counter to count samples that are determined by the sample evaluation unit to be consistent with a continuation of a possible raise gesture and a second counter to count samples that are determined by the sample evaluation unit to be inconsistent with a continuation of a possible raise gesture; and a preheat determination unit to receive the first and second counter values from the counter unit and to determine whether a preheat event has occurred.

As another example, the gesture detection modules can include a natural detection module operable to detect a natural raise gesture. The natural detection module can include: a starting pose estimation unit to receive motion sensor data and to estimate a starting pose based on the motion sensor data; a possible raise gesture determining unit to receive motion sensor data, to determine whether the received data satisfy criteria for a possible raise gesture, and to generate a notification of a possible raise gesture in the event that the criteria are satisfied; and a detected raise gesture determining unit to receive the notification of the possible raise gesture from the possible raise gesture determining unit, to monitor additional accelerometer data to determine whether a condition is met for a detected raise gesture, and to generate a notification of a detected raise gesture in the event that the condition is met. In some embodiments, natural detection module can also include a criteria determining unit to determine criteria for detecting a possible raise gesture based at least in part on the starting pose estimated by the starting pose estimation unit and to provide the criteria to the possible raise gesture determining unit. In addition or instead, some embodiments, the natural detection module can also include a confirmation unit to perform gesture confirmation based on motion sensor data associated with a detected raise gesture and to generate a notification of a confirmed or disconfirmed raise gesture. In some embodiments, the natural detection module can be configured to identify a gesture state from a set of gesture states that includes a null state, a possible raise gesture state, and a detected raise gesture state. The possible raise gesture state can be identified, e.g., based at least in part on a starting pose determined from the motion senor data and a set of criteria for a change from the starting pose to an ending pose, the set of criteria being selected based at least in part on the starting pose. The detected raise gesture state can be identified, e.g., based at least in part on a dwell time in a focus pose.

As another example, the gesture detection modules can include a low-dynamic natural detection module operable to detect a natural raise gesture in a low-dynamic environment and a high-dynamic natural detection module operable to detect a natural raise gesture in a high-dynamic environment.

As another example, the gesture detection modules can include a deliberate detection module operable to detect a deliberate raise gesture. The deliberate detection module can include: a priming detection unit to receive motion sensor data and to determine from the motion sensor data whether the user's arm is primed to execute a deliberate raise gesture; an impulse peak detection unit to receive additional motion sensor data and detect the presence of a target number of impulse peaks based on the additional motion sensor data; and a stability detection unit to receive further motion sensor data and determine whether the further motion sensor data indicates that the device position has stabilized following detection of the target number of impulse peaks by the impulse peak detection unit.

As another example, the gesture detection modules can include a loss-of-focus detection module operable to detect a transition of the device out of a focus state. The loss-of-focus detection module can include: an orientation determining unit to receive motion sensor data and to determine an orientation for the device based on the motion sensor data; an orientation change detection unit to determine, based at least in part on the orientation determined by the orientation determining unit, whether a change in orientation has occurred; an arm position estimation unit to receive motion sensor data and to determine from the data an estimated arm position of an arm on which the device is presumed to be worn; and a focus determination unit to receive orientation change information from the orientation change detection unit, to receive the estimated arm position from the arm position estimation unit, and to determine, based at least in part on the received orientation change information and estimated arm position, whether loss-of-focus has occurred.

In some embodiments, the device can also include an activity classifier module operable to determine a current activity of a user based at least in part on motion sensor data from the motion sensor.

In some embodiments, the device can also include a gesture classifier module operable to confirm a raise gesture detected by at least one of the gesture detection modules.

Thus, although the invention has been described with respect to specific embodiments, it will be appreciated that the invention is intended to cover all modifications and equivalents within the scope of the following claims.

What is claimed is:

1. A method executed in a wearable device, the method comprising:
    obtaining, by a motion coprocessor of the wearable device, a set of motion sensor data samples from a motion sensor of the wearable device, the set of motion sensor data samples being obtained while an applications processor of the wearable device is in a sleep state and a user interface component of the wearable device is in an inactive state;
    analyzing, by the motion coprocessor, the set of motion sensor data samples using one or more detection processes to detect a raise gesture;
    in response to detecting the raise gesture, waking, by the motion coprocessor, the applications processor from the sleep state;
    executing, by the applications processor, a confirmation process on at least a portion of the set of motion sensor data samples to confirm the detected raise gesture;
    determining, by the applications processor, whether the user interface component should be activated, the determination being based at least in part on a result of the confirmation process; and
    in response to determining that the user interface component should be activated, activating, by the applications processor, the user interface component.

2. The method of claim 1 wherein analyzing the set of motion sensor data samples to identify the raise gesture includes concurrently executing at least two different detection processes to detect a natural raise gesture.

3. The method of claim 2 wherein the at least two different detection processes include:
    a preheat detection process that detects an initiation of a raise gesture; and
    a raise-gesture detection process that detects a complete raise gesture,
    wherein the motion coprocessor wakes the applications processor from the sleep state in response to detecting either the initiation of the raise gesture or the complete raise gesture.

4. The method of claim 3 wherein the raise-gesture detection process includes:
    selecting a set of criteria for detecting a raise gesture based on a starting pose determined from the set of motion sensor data samples; and
    detecting the raise gesture based on determining that the set of motion sensor data samples satisfies the selected set of criteria.

5. The method of claim 3 wherein the preheat detection process includes:
    detecting a possible initiation of a raise gesture based at least in part on a first one of the motion sensor data samples; and
    in response to detecting the possible initiation of the raise gesture:
        sequentially evaluating each motion sensor data sample subsequent to the first motion sensor data sample as either consistent or inconsistent with a raise gesture; and
        identifying the initiation of the raise gesture in the event that a first threshold number of subsequent motion sensor data samples consistent with a raise gesture is reached before a second threshold number of subsequent motion sensor data samples inconsistent with a raise gesture is reached.

6. The method of claim 1 wherein the confirmation process includes applying a gesture classifier that has been trained using a machine-learning process to distinguish a raise gesture from one or more other motion types.

7. The method of claim 6 wherein the gesture classifier is a Bayesian classifier.

8. A wearable device comprising:
    a motion sensor to detect motion of the wearable device;
    a motion coprocessor coupled to the motion sensor;
    an applications processor coupled to the motion coprocessor, the applications processor having a sleep state and a wake state;
    a user interface component coupled to the applications processor, the user interface component having an active state and an inactive state,
    wherein the motion coprocessor is configured to:
        obtain, from the motion sensor, a set of motion sensor data samples while the applications processor is in the sleep state and the user interface component is in the inactive state;
        analyze the set of motion sensor data samples using one or more detection processes to detect a raise gesture; and
        wake the applications processor from the sleep state in response to detecting the raise gesture; and
    wherein the applications processor is configured to:
        execute a confirmation process on at least a portion of the set of motion sensor data samples to confirm the detected raise gesture;
        determine, based at least in part on a result of the confirmation process, whether the user interface component should be activated; and
        activate the user interface component in response to determining that the user interface component should be activated.

9. The wearable device of claim 8 wherein the user interface component includes a display that is powered off when the user interface component is in the inactive state and powered on when the user interface component is in the active state.

10. The wearable device of claim 8 wherein the user interface component includes a touch-screen display that is powered off when the user interface component is in the inactive state and powered on when the user interface component is in the active state.

11. The wearable device of claim 8 wherein the motion sensor includes an accelerometer and a gyroscope and wherein the motion coprocessor is further configured to:
    determine whether a user of the wearable device is engaged in a high-dynamic activity or a low-dynamic activity;
    obtain the set of motion sensor data samples from both the accelerometer and the gyroscope in response to determining that the user of the wearable device is engaged in a high-dynamic activity; and obtain the set of motion sensor data samples from only the accelerometer in response to determining that the user of the wearable device is engaged in a low-dynamic activity.

12. The wearable device of claim 8 wherein the motion coprocessor is further configured such that analyzing the set of motion sensor data samples to identify the raise gesture includes concurrently executing at least two different detection processes to detect a natural raise gesture.

13. The wearable device of claim 12 wherein the at least two different detection processes include:
    a preheat detection process that detects initiation of a raise gesture; and
    a raise-gesture detection process that detects a complete raise gesture,
    wherein the motion coprocessor is further configured to wake the applications processor from the sleep state in response to detecting either the initiation of the raise gesture or the complete raise gesture.

14. A computer-readable storage medium having stored therein program instructions that, when executed by a motion coprocessor and an applications processor in a wearable device, cause the wearable device to perform a method comprising:
    obtaining, by the motion coprocessor, a set of motion sensor data samples from a motion sensor of the wearable device, the set of motion sensor data samples being obtained while the applications processor is in a sleep state and a user interface component of the wearable device is in an inactive state;
    analyzing, by the motion coprocessor, the set of motion sensor data samples using one or more detection processes to detect a raise gesture;
    in response to detecting the raise gesture, waking, by the motion coprocessor, the applications processor from the sleep state;
    executing, by the applications processor, a confirmation process on at least a portion of the set of motion sensor data samples to confirm the detected raise gesture;
    determining, by the applications processor, whether the user interface component should be activated, the determination being based at least in part on a result of the confirmation process; and
    in response to determining that the user interface component should be activated, activating, by the applications processor, the user interface component.

15. The computer-readable storage medium of claim 14 wherein analyzing the set of motion sensor data samples to identify the raise gesture includes concurrently executing at least two different detection processes to detect a natural raise gesture.

16. The computer-readable storage medium of claim 15 wherein the at least two different detection processes include:
    a preheat detection process that detects initiation of a raise gesture; and
    a raise-gesture detection process that detects a complete raise gesture,
    wherein the motion coprocessor wakes the applications processor from the sleep state in response to detecting either the initiation of the raise gesture or the complete raise gesture.

17. The computer-readable storage medium of claim 16 wherein the raise-gesture detection process includes:
    selecting a set of criteria for identifying a raise gesture based on a starting pose determined from the set of motion sensor data samples; and
    detecting the raise gesture based on determining that the set of motion sensor data samples satisfies the selected set of criteria.

18. The computer-readable storage medium of claim 16 wherein the preheat detection process includes:
    detecting a possible initiation of a raise gesture based at least in part on a first one of the motion sensor data samples; and
    in response to detecting the possible initiation of the raise gesture:
        sequentially evaluating each motion sensor data sample subsequent to the first motion sensor data sample as either consistent or inconsistent with a raise gesture; and
        identifying the initiation of the raise gesture in the event that a first threshold number of subsequent motion sensor data samples consistent with a raise gesture is reached before a second threshold number of subsequent motion sensor data samples inconsistent with a raise gesture is reached.

19. The computer-readable storage medium of claim 14 wherein the confirmation process includes applying a gesture classifier that has been trained using a machine-learning process to distinguish a raise gesture from one or more other motion types.

20. The computer-readable storage medium of claim 19 wherein the gesture classifier is a Bayesian classifier.

\* \* \* \* \*